United States Patent
Kim et al.

(10) Patent No.: US 12,262,252 B2
(45) Date of Patent: Mar. 25, 2025

(54) METHOD AND APPARATUS FOR PERFORMING HANDOVER PROCEDURE IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 17/766,058

(22) PCT Filed: Sep. 29, 2020

(86) PCT No.: PCT/KR2020/013359
§ 371 (c)(1),
(2) Date: Apr. 1, 2022

(87) PCT Pub. No.: WO2021/066532
PCT Pub. Date: Apr. 8, 2021

(65) Prior Publication Data
US 2022/0369171 A1   Nov. 17, 2022

(30) Foreign Application Priority Data

Oct. 2, 2019 (KR) .................. 10-2019-0122659
Nov. 1, 2019 (KR) .................. 10-2019-0138766

(51) Int. Cl.
*H04W 36/00* (2009.01)
*H04W 36/08* (2009.01)
(Continued)

(52) U.S. Cl.
CPC ........ *H04W 36/0011* (2013.01); *H04W 36/08* (2013.01); *H04W 36/185* (2023.05); *H04W 36/302* (2023.05)

(58) Field of Classification Search
CPC ............. H04W 36/0011; H04W 36/08; H04W 36/185; H04W 36/302; H04W 36/0079; H04W 36/0077; H04W 36/0058
See application file for complete search history.

(56) References Cited

U.S. PATENT DOCUMENTS

| 7,272,120 B2 | 9/2007 | Rajkotia |
| 11,943,670 B2 * | 3/2024 | Kim .................. H04W 74/0833 |

(Continued)

FOREIGN PATENT DOCUMENTS

CN   1784873 A   6/2006

OTHER PUBLICATIONS

Qualcomm Incorporated; Control Plane handling and procedures to support Make-Before-Break (MBB) HO; 3GPP TSG-RAN WG2 Meeting #105bis; R2-1903643; Revision of R2-1900358; XP051692907; Apr. 8-12, 2019; Xi'an, China.
(Continued)

*Primary Examiner* — Ahmed Elallam
(74) *Attorney, Agent, or Firm* — Jefferson IP Law, LLP

(57) ABSTRACT

An operating method of a user equipment (UE) in a wireless communication system according to an embodiment of the disclosure may include receiving configuration information from a source base station (BS), determining, based on the configuration information, whether Dual Active Protocol Stack (DAPS) handover is configured for at least one bearer, based on a result of the determining, maintaining a link to the source BS, performing the DAPS handover on a target BS, suspending a Signaling Radio Bearer (SRB) configured for the source BS, and establishing a SRB for the target BS, when it is determined that the DAPS handover fails, determining whether a radio link failure (RLF) occurs in the link to the source BS, and based on a result of the determining, when the RLF does not occur in the link to the source BS, (Continued)

resuming the SRB configured for the source BS and reporting the failure of the DAPS handover.

16 Claims, 14 Drawing Sheets

(51) Int. Cl.
*H04W 36/18* (2009.01)
*H04W 36/30* (2009.01)

(56) References Cited

U.S. PATENT DOCUMENTS

| | | | |
|---|---|---|---|
| 2009/0017826 | A1 | 1/2009 | Shaheen |
| 2019/0297537 | A1 | 9/2019 | Tsai et al. |
| 2020/0314714 | A1* | 10/2020 | Jung .................. H04W 76/27 |
| 2021/0105675 | A1* | 4/2021 | Kim .................. H04W 76/27 |
| 2021/0136829 | A1* | 5/2021 | Kim .................. H04W 36/0083 |
| 2022/0159530 | A1* | 5/2022 | Kim .................. H04W 36/305 |

OTHER PUBLICATIONS

Ericsson; Corrections to make before break mobility; 3GPP TSG-RAN WG2 Meeting #98; R2-1705485; XP051665855; May 15-19, 2017; Hangzhou, China.

Samsung; Physical Layer Aspects for Mobility Enhancements; 3GPP TSG RAN WG1 #96; R1-1902249; XP051599944; Feb. 25-Mar. 1, 2019; Athens, Greece.

CATT; Some Considerations on CP of DAPS-RUDI; 3GPP TSG RAN WG2 Meeting #107; R2-1908921; XP051766739; Aug. 26-30, 2019; Prague, Czech.

OPPO; Discussion on failure handling of handover; 3GPP TSG-RAN2 Meeting #103bis; R2-1813796; XP051523286; Oct. 8-12, 2018; Chengdu, China.

European Search Report dated Oct. 20, 2022; European Appln. No. 20872183.7-1216/4044670 PCT/KR2020013359.

Nokia et al.; 3GPP TSG RAN WG2 Meeting #107; R2-1909038; Aug. 26-30, 2019; Prague, Czech Republic.

Vivo; Discussion on the RLF and HOF for DAPS; 3GPP TSG-RAN WG2 Meeting #107; R2-1909775; revision of R2-1905975; Aug. 26-30, 2019; Prague, Czech Republic.

Huawei et al.; Considerations on RLM for DAPS; 3GPP TSG-RAN WG2 Meeting #107; R2-1910589; Aug. 26-30, 2019; Prague, Czech Republic.

OPPO; Discussion on RLM for LTE mobility enhancement; 3GPP TSG-RAN WG2 Meeting #107; R2-1909668; revision of R2-1905633; Aug. 26-30, 2019; Prague, Czech Republic.

International Search Report with Written Opinion and English translation dated Jan. 8, 2021; International AppIn No. PCT/KR2020/013359.

Samsung Electronics et al., Introduction of T312 in NR, R2-1911445, 3GPP TSG-RAN WG2 Meeting #107, Aug. 16, 2019, Prague, Czech Republic.

Chinese Office Action dated Mar. 7, 2024, Chinese Application No. 202080069905.8.

Japanese Office Action Sep. 10, 2024, in Japanese Application No. 2022-520830.

Japanese Office Action dated Feb. 4, 2025, issued in Japanese Application No. 2022-520830.

\* cited by examiner

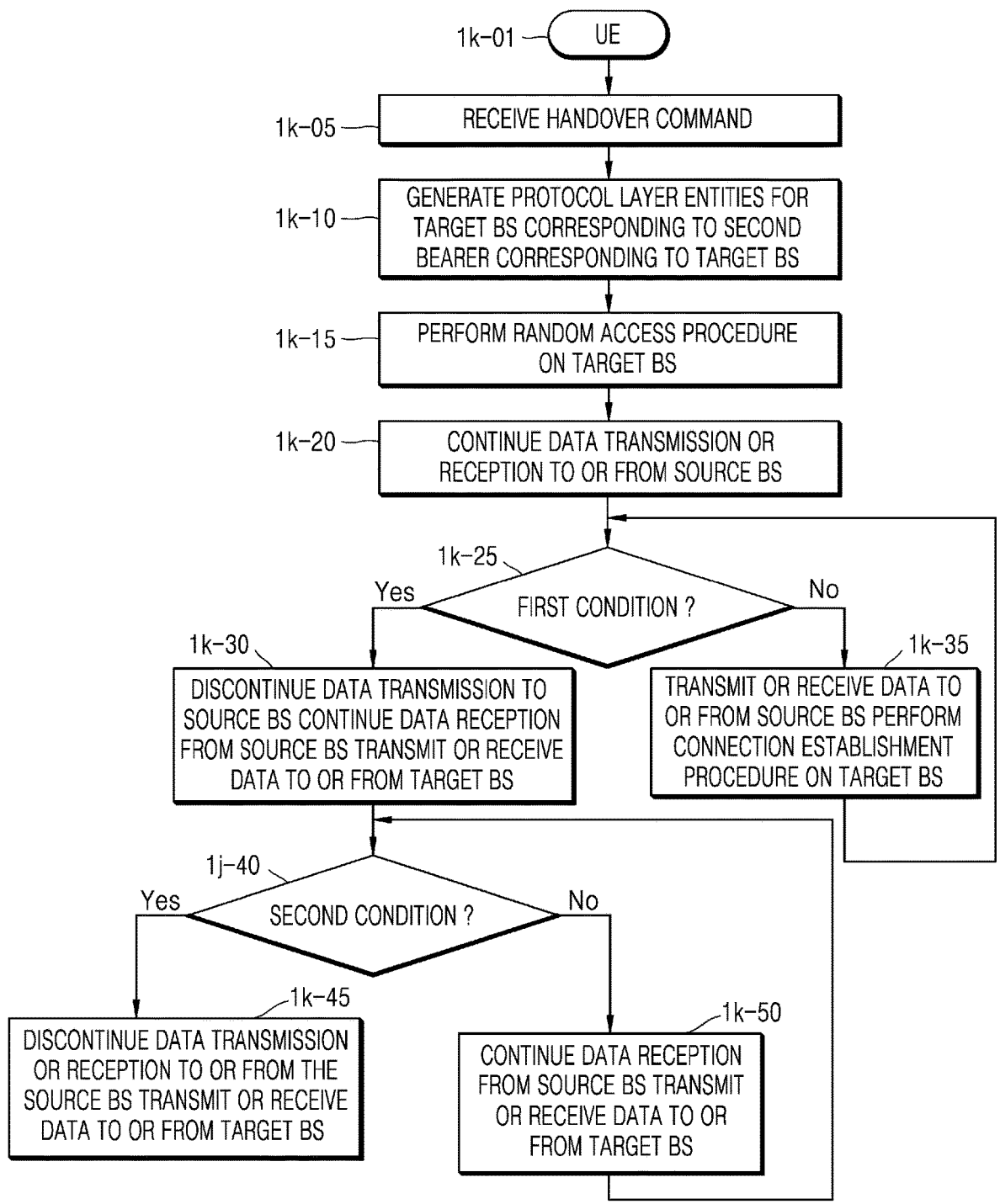

METHOD AND APPARATUS FOR PERFORMING HANDOVER PROCEDURE IN WIRELESS COMMUNICATION SYSTEM

TECHNICAL FIELD

The disclosure relates to a method and apparatus for performing a handover procedure in a wireless communication system.

BACKGROUND ART

In order to meet significantly increasing demand with respect to wireless data traffic due to the commercialization of $4^{th}$ generation (4G) communication systems and the increase in multimedia services, evolved $5^{th}$ generation (5G) system or pre-5G communication system are developed. For this reason, 5G or pre-5G communication systems are called 'beyond 4G network' communication systems or 'post long term evolution (post-LTE)' systems.

In order to increase a data rate, implementation of 5G communication systems in an ultra-high frequency or millimeter-wave (mmWave) band (e.g., a 60 GHz band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

Furthermore, to improve network functions for 5G communication systems, various technologies such as evolved small cells, advanced small cells, cloud Radio Access Networks (Cloud-RAN), ultra-dense networks, Device-To-Device communication (D2D), wireless backhaul, moving networks, cooperative communication, Coordinated Multi-Points (CoMP), interference cancellation, or the like have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), sparse code multiple access (SCMA), or the like have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, Machine-To-Machine (M2M) communication, and Machine-Type Communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication technologies such as sensor networks, M2M communication, MTC, or the like are being implemented by using techniques including beamforming, MIMO, array antennas, or the like. Application of Cloud-RAN as the above-described big data processing technology may be an example of convergence of 5G communication technology and IoT technology.

Because various services may be provided due to the aforementioned technical features and the development of wireless communication systems, in particular, methods for seamlessly supporting a service related to handover of a user equipment (UE) are required.

DESCRIPTION OF EMBODIMENTS

Technical Problem

Embodiments provide an apparatus and method for effectively providing a service in a mobile communication system.

Solution to Problem

An operating method of a user equipment (UE) in a wireless communication system according to an embodiment of the disclosure may include receiving configuration information from a source base station (BS), determining, based on the configuration information, whether Dual Active Protocol Stack (DAPS) handover is configured for at least one bearer, based on a result of the determining, maintaining a link to the source BS, performing the DAPS handover on a target BS, suspending a Signaling Radio Bearer (SRB) configured for the source BS, and establishing a SRB for the target BS, when it is determined that the DAPS handover fails, determining whether a radio link failure (RLF) occurs in the link to the source BS, and based on a result of the determining, when the RLF does not occur in the link to the source BS, resuming the SRB configured for the source BS and reporting the failure of the DAPS handover.

The operating method may further include starting T304 timer in the DAPS handover, and starting T310 timer when an out-of-synchronization (out-of-sync) signal is received.

The operating method may further include, when the DAPS handover is completed, stopping the T304 timer and the T310 timer.

The operating method may further include, when the T304 timer expires, determining that the DAPS handover fails and the RLF is not detected.

The operating method may further include, with respect to a SRB for which the DAPS handover is configured, releasing the SRB for the target BS and reconfiguring a SRB from which the DAPS handover is released, and with respect to a SRB for which the DAPS handover is not configured, recovering configuration used by the source BS before the DAPS handover.

The operating method may further include, when the DAPS handover is released from the SRB for which the DAPS handover was configured, maintaining a security key and header compression context.

A user equipment (UE) in a wireless communication system may include a transceiver, and at least one processor connected to the transceiver, wherein the at least one processor is configured to receive configuration information from a source base station (BS), determine, based on the configuration information, whether Dual Active Protocol Stack (DAPS) handover is configured for at least one bearer, based on a result of the determining, maintain a link to the source BS, perform the DAPS handover on a target BS, suspend a Signaling Radio Bearer (SRB) configured for the source BS, and establish a SRB for the target BS, when it is determined that the DAPS handover fails, determine whether a radio link failure (RLF) occurs in the link to the source BS, and based on a result of the determining, when the RLF does not occur in the link to the source BS, resume the SRB configured for the source BS and report the failure of the DAPS handover.

The at least one processor may be configured to start T304 timer in the DAPS handover, and start T310 timer when an out-of-synchronization (out-of-sync) signal is received.

The at least one processor may be configured to, when the DAPS handover is completed, stop the T304 timer and the T310 timer.

The at least one processor may be configured to, when the T304 timer expires, determine that the DAPS handover fails and the RLF is not detected.

The at least one processor may be configured to, with respect to a SRB for which the DAPS handover is configured, release the SRB for the target BS and reconfigure a SRB from which the DAPS handover is released, and with respect to a SRB for which the DAPS handover is not configured, recover configuration used by the source BS before the DAPS handover.

The at least one processor may be configured to, when the DAPS handover is released from the SRB for which the DAPS handover was configured, maintain a security key and header compression context.

An operating method of a source base station (BS) in a wireless communication system according to an embodiment of the disclosure may include transmitting, to a user equipment (UE), configuration information including information about whether Dual Active Protocol Stack (DAPS) handover is configured for at least one bearer, based on the configuration information, maintaining, by the UE, a link to the source BS, and when the UE performs the DAPS handover on a target BS, suspending, by the UE, a Signaling Radio Bearer (SRB) configured for the source BS, and establishing, by the UE, a SRB for the target BS, and when it is determined that the DAPS handover fails and a radio link failure (RLF) does not occur in the link to the source BS, resuming, by the UE, the SRB configured for the source BS.

The operating method may further include when it is determined that the DAPS handover fails, receiving a report about the failure of the DAPS handover from the UE.

A source base station (BS) in a wireless communication system may include a transceiver, and at least one processor connected to the transceiver, wherein the at least one processor is configured to transmit, to a user equipment (UE), configuration information including information about whether Dual Active Protocol Stack (DAPS) handover is configured for at least one bearer, based on the configuration information, maintain, by the UE, a link to the source BS, and when the UE performs the DAPS handover on a target BS, suspend, by the UE, a Signaling Radio Bearer (SRB) configured for the source BS, and establish, by the UE, a SRB for the target BS, and when it is determined that the DAPS handover fails and a radio link failure (RLF) does not occur in the link to the source BS, resume, by the UE, the SRB configured for the source BS.

Advantageous Effects of Disclosure

Embodiments provide an apparatus and method for effectively providing a service in a mobile communication system.

BRIEF DESCRIPTION OF DRAWINGS

FIG. 1K is a flowchart illustrating operations of a UE according to an embodiment of the disclosure.

MODE OF DISCLOSURE

Figure 1A:
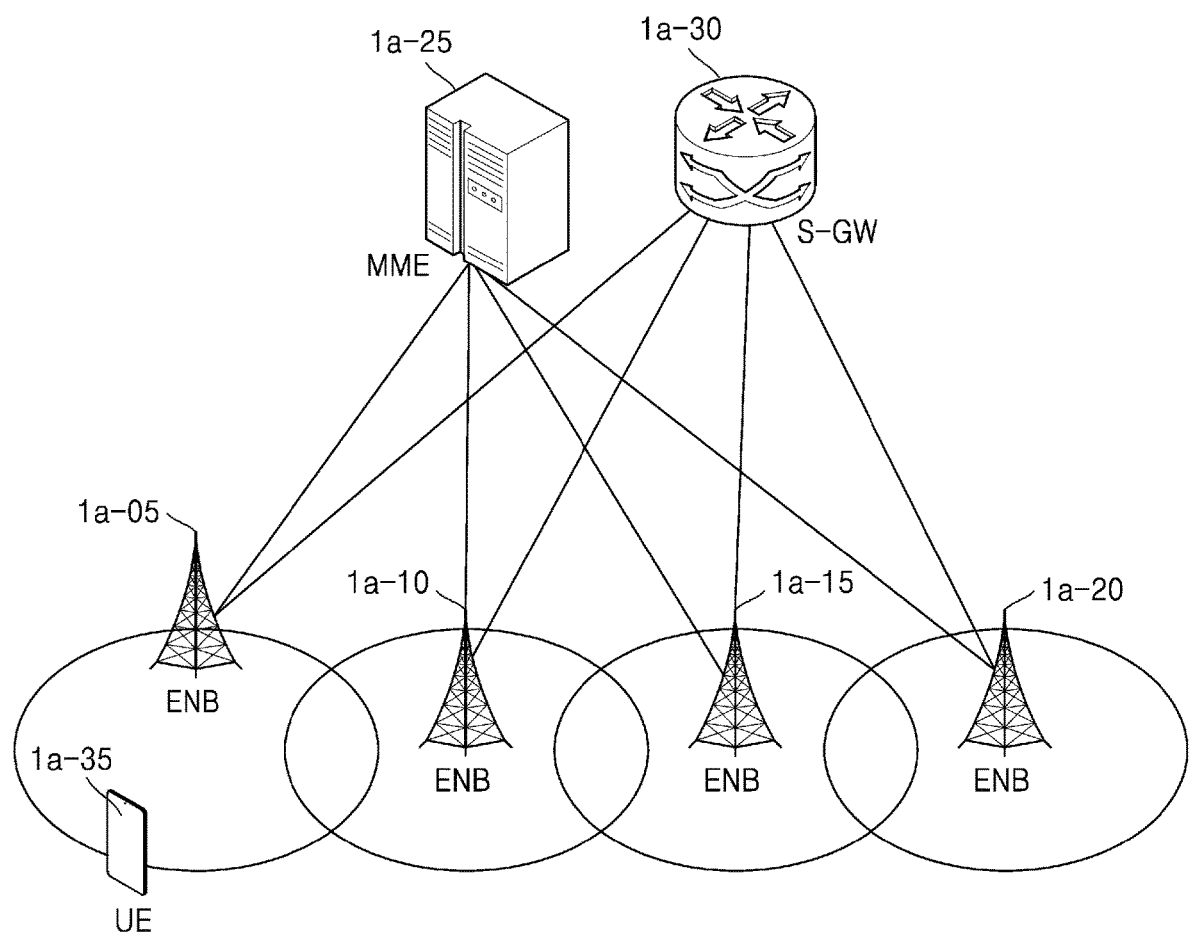
FIG. 1A is a diagram illustrating a configuration of a long term evolution (LTE) system, according to an embodiment of the disclosure.

Hereinafter, operation principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

In the following descriptions of the disclosure, well-known functions or configurations are not described in detail when it is deemed that they may unnecessarily obscure the essence of the disclosure. Hereinafter, embodiments of the disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of descriptions, the disclosure uses terms and names defined in the 3rd Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of descriptions. That is, a base station (BS) described by an eNB may represent a gNB.

The disclosure relates to a handover method and apparatus for minimizing a data transception interruption time due to handover or making the data transception interruption time become 0 ms in a next-generation mobile communication system.

In detail, efficient handover methods provided in the disclosure may have one or more features from among a plurality of features described below.

When a user equipment (UE) receives a handover command message (e.g., a handover command message or a Radio Resource Control (RRC) reconfiguration message) from a source BS, the UE performing data transmission or reception (uplink (UL) or downlink (DL) data transmission and reception) to or from the source BS via each of protocol layer entities (i.e., a Physical (PHY) layer entity, a Medium Access Control (MAC) layer entity, a Radio Link Control (RLC) layer entity, and a Packet Data Convergence Protocol (PDCP) layer entity) for a plurality of first bearers, the UE may configure protocol layer entities for a plurality of new second bearers (e.g., having a same bearer identifier) corresponding to the protocol layer entities for the plurality of first bearers, and may perform data transmission or reception (UL or DL data transmission and reception) without discontinuing but maintaining data transmission or reception (UL or DL data transmission and reception) to or from the source BS via the plurality of first bearers.

The protocol entities (a PHY layer entity, a MAC layer entity, a RLC layer entity, and a PDCP layer entity) for the plurality of second bearers which are newly configured after the UE receives the handover command message may be configured for data transmission and reception to and from a target BS, based on bearer configuration information or a plurality of pieces of protocol layer entity information included in the handover command message.

While the UE performs data transmission or reception (UL or DL data transmission and reception) to or from the source BS via the protocol layer entities for the plurality of first bearers, the UE may perform a random access procedure on the target BS via a protocol layer entity (e.g., the MAC layer entity) for the plurality of second bearers. The random access procedure may include transmission of a preamble, reception of a random access response, transmission of message3, reception of message4 (e.g., reception of contention resolution MAC control element (CE) or a UL transport resource), or the like.

While the UE performs data transmission or reception to or from the source BS via the protocol layer entities for the plurality of first bearers, the UE may complete the random access procedure with respect to the target BS via the protocol layer entity (e.g., the MAC layer entity) for the plurality of second bearers and may transmit a handover complete message to the target BS via the protocol layer entities for the plurality of second bearers.

While the UE performs data transmission or reception to or from the source BS via the protocol layer entities for the plurality of first bearers, the UE may complete the random access procedure on the target BS via the protocol layer entity (e.g., the MAC layer entity) for the plurality of second bearers, may transmit the handover complete message to the target BS via the protocol layer entities for the plurality of second bearers, and may perform data transmission and reception (UL or DL).

When the UE successfully completes the random access procedure with respect to the target BS and then initially receives a UL transport resource from the target BS, the UE may discontinue data transmission to the source BS via the protocol layer entities for the plurality of first bearers, may switch UL transmission, and may transmit data to the target BS via the plurality of second bearers.

When the UE receives the handover command message, the UE may maintain data transmission or reception (UL or DL data transmission and reception) to or from the source BS via the protocol layer entities for the plurality of first bearers, and may perform the random access procedure on the target BS via the protocol layer entities for the plurality of second bearers. Also, when the UE successfully completes the random access procedure and then initially receives the UL transport resource from the target BS, the UE may discontinue data transmission to the source BS via the protocol layer entities for the plurality of first bearers, and may perform UL data transmission only to the target BS via the protocol layer entities for the plurality of second bearers, and in this regard, the UE may continuously receive DL data from the source BS via the protocol layer entities for the plurality of first bearers, and may continuously receive DL data from the target BS via the protocol layer entities for the plurality of second bearers.

A first bearer and a second bearer may be configured for a second PDCP layer entity architecture, and in the second PDCP layer entity architecture, the first bearer (e.g., a RLC layer entity, a MAC layer entity, or a PHY layer entity) for the source BS and the second bearer (e.g., a RLC layer entity, a MAC layer entity, or a PHY layer entity) for the target BS are all connected to one PDCP layer entity. UL data may be transmitted via one bearer from among the first bearer or the second bearer via the PDCP layer entity. That is, before the UE performs a random access procedure on the target BS, successfully completes the random access procedure, and initially receives a UL transport resource from the target BS, the UE transmits the UL data via the first bearer, and when the UE performs the random access procedure on the target BS, successfully completes the random access procedure, and initially receives the UL transport resource from the target BS, the UE may discontinue data transmission via the first bearer, may switch the data transmission, and then may transmit the UL data to the target BS via the second bearer. However, the UE with the second PDCP layer entity architecture may receive DL data from the source BS or the target BS via the first bearer or the second bearer.

The disclosure provides a method and apparatus for performing an efficient handover procedure without a data transception interruption time, based on the aforementioned features. Also, the disclosure provides a method by which, when a UE performs an efficient handover method without a data transception interruption time, if the UE fails in handover, the UE can fall back to a source BS and reconfigure connection to the source BS. According to an embodiment of the disclosure, when the UE performs a handover procedure, the UE may maintain a link to the source BS, and even when the UE fails in handover, the UE can fall back by using a previous radio link to the source BS.

FIG. 1A is a diagram illustrating a configuration of an LTE system, according to an embodiment of the disclosure.

Referring to FIG. 1A, a radio access network (RAN) of the LTE system includes a plurality of eNBs (or nodes B or BSs) 1a-05, 1a-10, 1a-15, and 1a-20, a mobility management entity (MME) 1a-25, and a serving-gateway (S-GW) 1a-30. A UE (or a terminal) 1a-35 accesses an external network via the eNB 1a-05, 1a-10, 1a-15, or 1a-20 and the S-GW 1a-30.

In FIG. 1A, the eNB 1a-05, 1a-10, 1a-15, or 1a-20 may correspond to a legacy node B of a universal mobile telecommunications system (UMTS). The eNB may be connected to the UE 1a-35 through wireless channels and may perform complex functions compared to the legacy node B. All user traffic data including real-time services such as voice over Internet protocol (VoIP) may be serviced through shared channels in the LTE system, and thus an entity for collating status information, e.g., buffer status information of UEs, available transmission power status information, and channel state information and performing scheduling may be required and the eNB 1a-05, 1a-10, 1a-15, or 1a-20 may operate as such an entity. One eNB generally controls a plurality of cells. For example, the LTE system may use radio access technology such as Orthogonal Frequency Division Multiplexing (OFDM) in a bandwidth of 20 MHz to achieve a data rate of 100 Mbps. Furthermore, the eNB may also use adaptive modulation & coding (AMC) to determine a modulation scheme and a channel coding rate in accordance with a channel state of the UE. The S-GW 1a-30 is an entity for providing data bearers and may establish and release the data bearers under the control of the MME 1a-25. The MME 1a-25 is an entity for performing a mobility management function and various control functions on the UE and is connected to the plurality of eNBs.

Figure 1B:
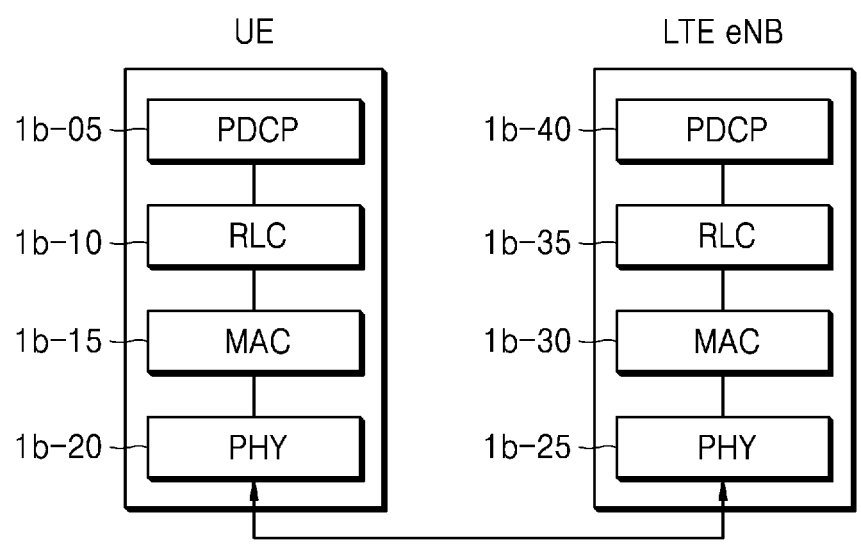
FIG. 1B is a diagram illustrating a radio protocol architecture of an LTE system, according to an embodiment of the disclosure.

FIG. 1B is a diagram illustrating a radio protocol architecture of an LTE system, according to an embodiment of the disclosure.

Referring to FIG. 1B, radio protocols of the LTE system may include Packet Data Convergence Protocol (PDCP) layers 1b-05 and 1b-40, RLC layers 1b-10 and 1b-35, and Medium Access Control (MAC) layers 1b-15 and 1b-30 respectively in a UE and an eNB. The PDCP layer 1b-05 or 1b-40 may perform, for example, IP header compression/decompression. Main functions of the PDCP layer 1b-05 or 1b-40 are summarized as shown below.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in DC (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC layer 1b-10 or 1b-35 may perform an automatic repeat request (ARQ) operation by reconfiguring Packet Data Convergence Protocol Packet Data Units (PDCP PDUs) to appropriate sizes. Main functions of the RLC layer may be summarized as shown below.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layer entities configured for one UE and may multiplex RLC PDUs into a MAC PDU and may demultiplex the RLC PDUs from the MAC PDU. Main functions of the MAC layer may be summarized as shown below.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1C:
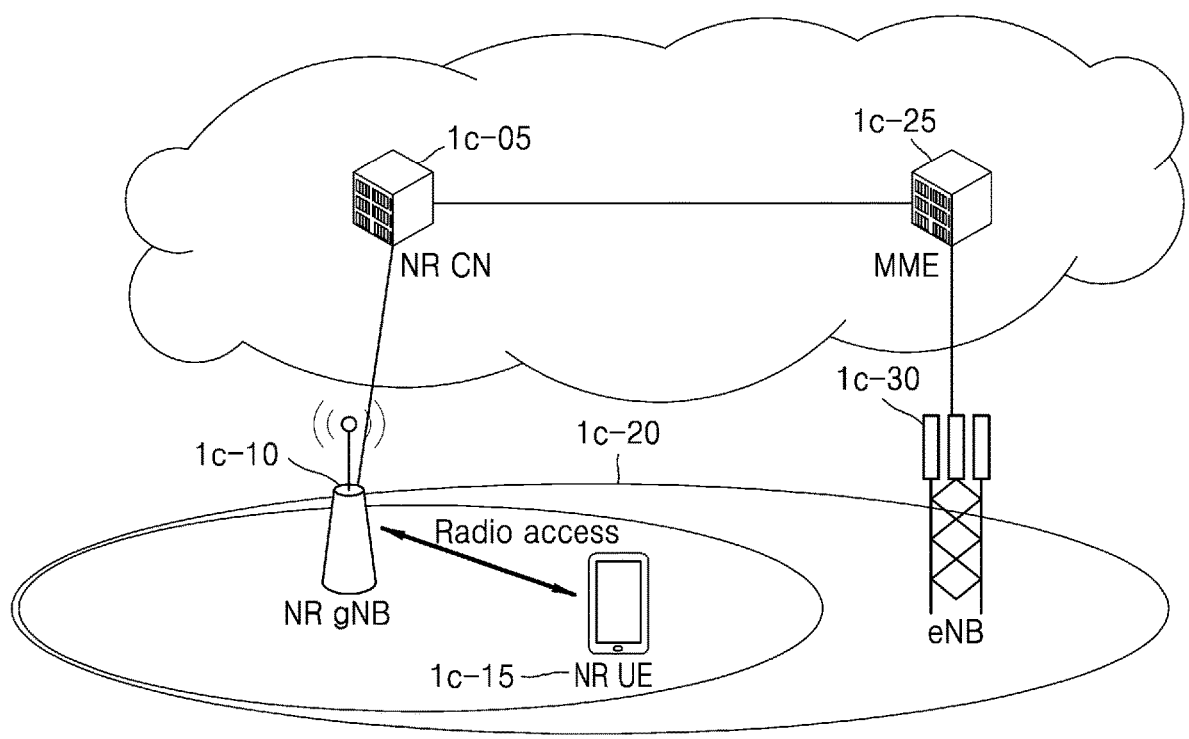
FIG. 1C is a diagram illustrating an architecture of a next-generation mobile communication system, according to an embodiment of the disclosure.

FIG. 1C is a diagram illustrating an architecture of a next-generation mobile communication system, according to an embodiment of the disclosure.

Referring to FIG. 1C, as illustrated, a radio access network of the next-generation mobile communication system (hereinafter, referred to as the NR or 5G communication system) includes a new radio node B (NR gNB or NR BS) 1c-10 and a new radio core network (NR CN) 1c-05. A NR UE (or terminal) 1c-15 may access an external network via the NR gNB 1c-10 and the NR CN 1c-05.

In FIG. 1C, the NR gNB 1c-10 may correspond to an eNB of the legacy LTE system. The NR gNB may be connected to the NR UE 1c-15 through radio channels and may provide superior services compared to a legacy node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. A bandwidth greater than the maximum bandwidth of the legacy LTE system may be used to achieve an ultra-high data rate, compared to the legacy LTE system, and OFDM may be used as a radio access technology and a beamforming technology may be additionally applied thereto. Furthermore, AMC may be applied to determine a modulation scheme and a channel coding rate in accordance with a channel state of the UE. The NR CN 1c-05 performs functions such as mobility support, bearer configuration, and quality of service (QoS) configuration. The NR CN is an entity for performing a mobility management function and various control functions on the NR UE and is connected to a plurality of BSs. Also, the NR or 5G communication system may cooperate with the legacy LTE system, and the NR CN may be connected to an MME 1c-25 through a network interface. The MME is connected to an eNB 1c-30 that is a legacy BS.

Figure 1D:
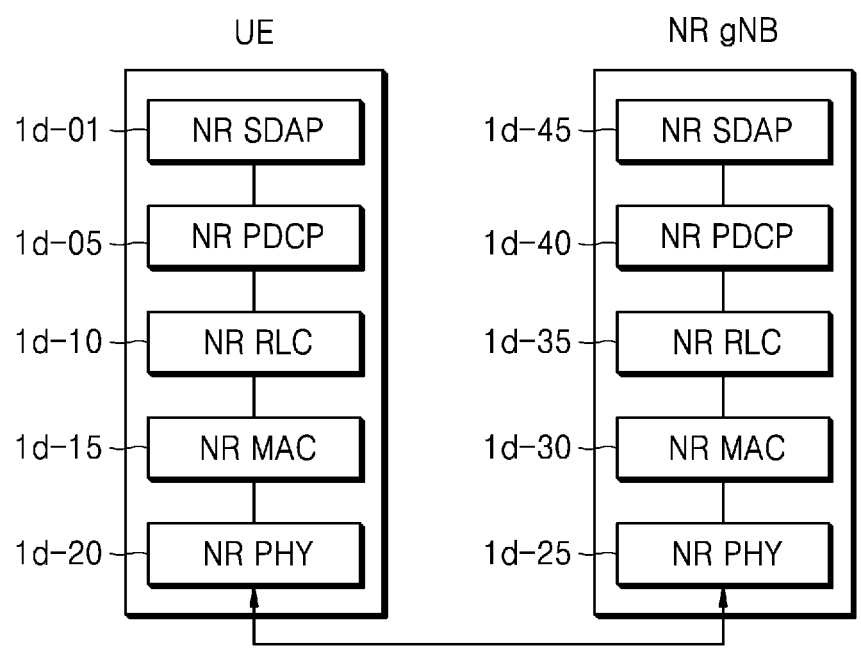
FIG. 1D is a diagram illustrating a radio protocol architecture of a next-generation mobile communication system, according to an embodiment of the disclosure.

FIG. 1D is a diagram illustrating a radio protocol architecture of the NR or 5G communication system, according to an embodiment of the disclosure.

Referring to FIG. 1D, the radio protocol architecture of the NR or 5G communication system may include NR Service Data Adaptation Protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.
  Transfer of user plane data
  Mapping between a QoS flow and a DRB for both DL and UL
  Marking QoS flow identifier (ID) in both DL and UL packets
  Reflective QoS flow to DRB mapping for the UL SDAP PDUs With regard to a SDAP layer entity, the UE may be configured with information about whether to use a header of the SDAP layer entity or to use functions of the SDAP layer entity, through a Radio Resource Control (RRC) message per PDCP layer entity, per bearer, or per logical channel. Also, when the SDAP header of the SDAP layer entity is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for appropriately supporting a service.

Main functions of the NR PDCP layer 1d-05 or 1d-40 may include some of the following functions.
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink.

The reordering function of the NR PDCP layer entity may include a function of reordering PDCP PDUs received from a lower layer, on a PDCP sequence number (SN) basis, and a function of delivering the reordered data to an upper layer in order. Alternatively, the reordering function of the NR PDCP layer entity may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC layer entity may indicate a function of delivering RLC SDUs received from a lower layer to an upper layer in order, and may include a function of reassembling the RLC SDUs and delivering the reassembled RLC SDU when a plurality of RLC SDUs segmented from one RLC SDU are received, and include a function of reordering received RLC PDUs on an RLC SN or PDCP SN basis. Also, the in-sequence delivery function of the NR RLC layer entity may include a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires. Furthermore, the NR RLC layer entity may process the RLC PDUs in order of reception (regardless of SNs, and in order of arrival) and may deliver the RLC PDUs to the PDCP layer entity in a manner of out-of-sequence delivery, and when it is a segment, the NR RLC layer entity may reassemble the segment with other segments stored in a buffer or subsequently received, into a whole RLC PDU and may transmit the RLC PDU to the DCP layer entity. The NR RLC layer may not have a concatenation function, and the concatenation function may be performed by the NR MAC layer or be replaced with a multiplexing function of the NR MAC layer.

The out-of-sequence delivery function of the NR RLC layer entity may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer may include some of the following functions.

Figure 1E:
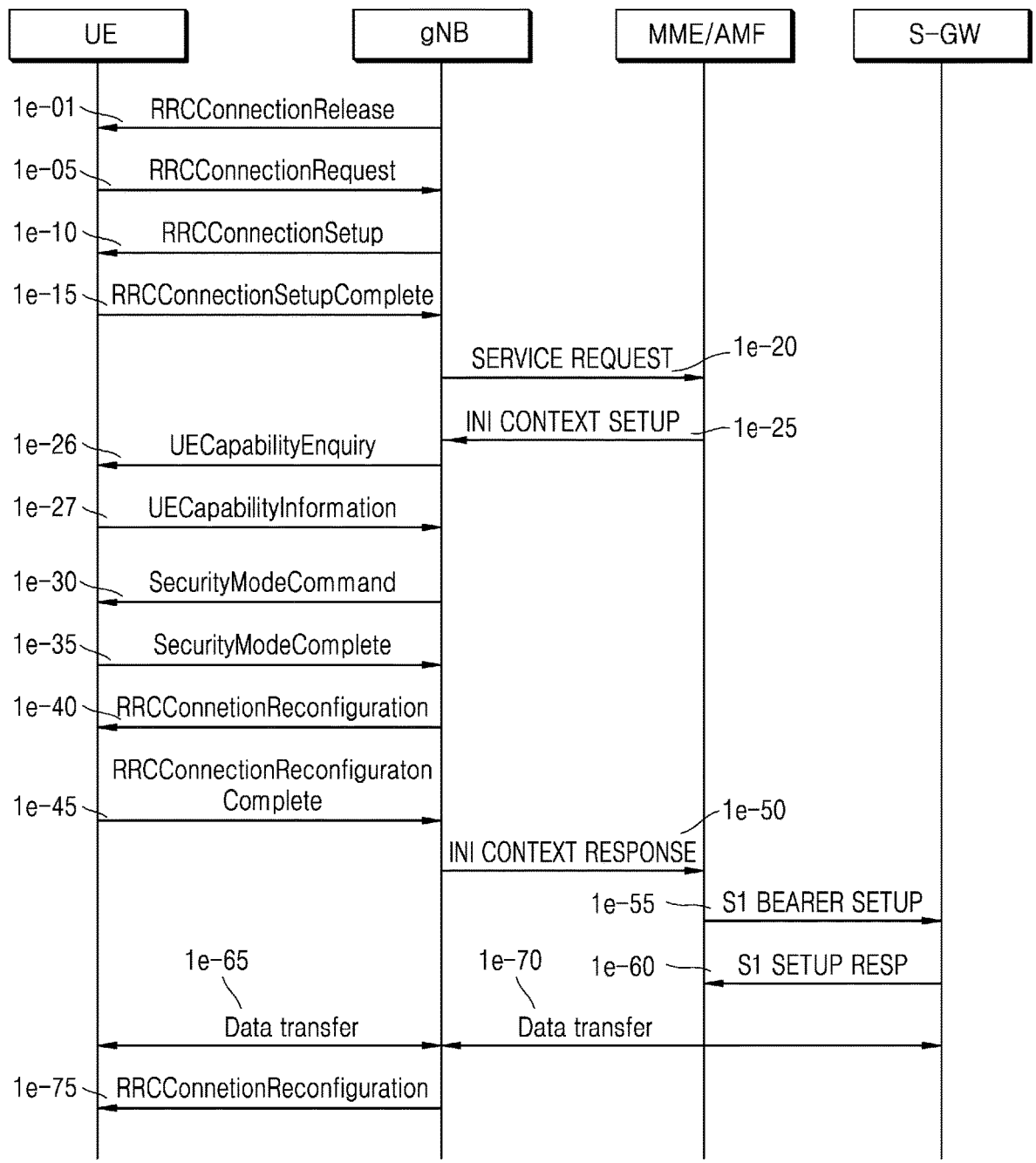
FIG. 1E is a diagram for describing a procedure in which a user equipment (UE) establishes connection with a network according to an embodiment of the disclosure.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer. FIG. 1E is a diagram for describing a procedure in which a UE establishes connection with a network, according to an embodiment of the disclosure.

In more detail, FIG. 1E is a diagram for describing a procedure in which a UE transitions from an RRC idle mode to an RRC connected mode and establishes connection with a network, according to the disclosure.

Referring to FIG. 1E, when the UE configured to transmit and receive data in the RRC connected mode does not transmit or receive data due to a predefined reason or for a predefined time, a gNB may transmit an RRCConnection-Release message to the UE so as to allow the UE to transit to the RRC idle mode (1e-01). Afterward, when the UE that is not currently configured for connection (hereinafter, also referred to as the idle-mode UE) has data to be transmitted, the UE may perform an RRC connection establishment procedure on the gNB. The UE establishes inverse direction transmission synchronization with the gNB through a random access procedure, and transmits an RRCConnection-Request message to the gNB (1e-05). The RRCConnection-Request message may include an identifier of the UE, an establishment cause or the like. The gNB transmits an RRCConnectionSetup message to allow the UE to establish RRC connection (1e-10).

The message may include configuration information for each service/bearer/RLC layer entity or each logical channel or each bearer, and whether to use ROHC for each bearer/logical channel, ROHC configuration information (e.g., a ROHC version, initial information, etc.), statusReportRequired information (information with which a BS indicates a PDCP Status report to a UE), and drb-ContinueROHC information (configuration information that indicates to continue and changelessly use ROHC configuration information) may be included in PDCP layer entity configuration information (pdcp-config) and transmitted. Also, the RRCConnectionSetup may include RRC connection configuration information. A bearer for RRC connection is called a Signaling Radio Bearer (SRB) and is used in transmission and reception of an RRC message that is a control message between the UE and the gNB.

The UE that established the RRC connection transmits an RRCConnectionSetupComplete message to the gNB (1e-15). The RRCConnectionSetupComplete message may include a control message such as a SERVICE REQUEST message for requesting, by the UE, an MME or an access and mobility management function (AMF) to configure a bearer for a certain service. The gNB transmits the SERVICE REQUEST message included in the RRCConnectionSetupComplete message to the MME or the AMF (1e-20), and the MME or the AMF may determine whether to provide the service requested by the UE. As a result of the determination, when the service requested by the UE is to be provided, the MME or the AMF transmits an INITIAL CONTEXT SETUP REQUEST message to the gNB (1e-25). The INITIAL CONTEXT SETUP REQUEST message may include QoS information to be applied in configuring a Data Radio Bearer (DRB), security information (e.g., a security key, a security algorithm, or the like) to be applied to the DRB, or the like.

When the gNB does not receive UE capability information from the MME or the AMF, the gNB may transmit a UE capability information request message to the UE so as to identify the UE capability information (1e-26). When the UE receives the UE capability information request message, the UE may configure, generate, and report a UE capability information message to the gNB (1e-27). The UE capability information message may include information about which types of handover methods are supported by the UE. For example, the UE may report UE capability to the gNB via an indicator indicating whether or not the UE supports an efficient handover method (i.e., a Dual Active Protocol Stack (DAPS) handover method) proposed in the disclosure. When the gNB identifies the UE capability information, the gNB may indicate handover to the UE by defining an indicator indicating which handover type is indicated in a handover command message, according to each of handover methods For example, the gNB may indicate the efficient handover method (the DAPS handover method) proposed in the disclosure to the UE, or may configure the DAPS handover method for the UE according to each bearer (DRB or SRB). When the gNB configures the DAPS handover method for the UE, the gNB may also indicate other handover methods to prevent data loss or data delay which may occur in handover. For example, the handover method the BS may configure the UE with the DAPS handover method may include a conditional handover method or a handover method without a random access procedure. The conditional handover method may be a method by which a plurality of target cells and a plurality of conditions are configured for the UE and, when the UE satisfies a configured condition in a cell selection or reselection procedure, the UE performs a handover procedure on one target cell.

The UE may perform a handover procedure on a target gNB according to the handover method indicated in the handover command message.

In order to configure security with the UE, the gNB exchanges a SecurityModeCommand message (1e-30) and a SecurityModeComplete message (1e-35). When security configuration is complete, the gNB transmits an RRCConnectionReconfiguration message to the UE (1e-40).

The message may include configuration information for each service/bearer/RLC layer entity or each logical channel or each bearer, and whether to use ROHC for each bearer/logical channel, ROHC configuration information (e.g., a ROHC version, initial information, etc.), statusReportRequired information (information with which a BS indicates a PDCP Status report to a UE), and drb-ContinueROHC information (configuration information that indicates to continue and changelessly use ROHC configuration information) may be included in PDCP layer entity configuration information (pdcp-config) and transmitted. Also, the message may include RRC connection configuration information. A bearer for RRC connection is called a SRB and is used in transmission and reception of an RRC message that is a control message between the UE and the gNB.

The message includes configuration information of a DRB in which user data is to be processed, and the UE configures the DRB by using the information and transmits an RRCConnectionReconfigurationComplete message to the gNB (1e-45). When configuration of the DRB with respect to the UE is complete, the gNB transmits an INITIAL CONTEXT SETUP COMPLETE message to the MME or the AMF (1e-50), and upon reception, the MME or the AMF may exchange an S1 BEARER SETUP message and an S1 BEARER SETUP RESPONSE message with an S-GW to configure an S1 bearer (1e-055 and 1e-60). The S1 bearer refers to a link for data transmission, which is configured between the S-GW and the gNB, and corresponds to the DRB in a one-to-one manner. After the above procedure is completed, the UE transmits or receives data to or from the gNB through the S-GW (1e-65 and 1e-70). As such, general data transmission processes are largely include three steps of RRC connection establishment, security setting, and DRB configuration. Also, the gNB may transmit, to the UE, an RRCConnectionReconfiguration message to renew, add, or change the configuration for a certain reason (1e-75).

In the disclosure, a bearer may include a SRB and a DRB where the SRB stands for a signaling radio bearer and the DRB stands for a data radio bearer. The SRB is mainly used to transmit and receive an RRC message of an RRC layer entity, and the DRB is mainly used to transmit and receive a plurality of items of user plane data. A UM DRB indicates a DRB configured to use a RLC layer entity operating in an unacknowledged mode (UM), and an acknowledged mode (AM) DRB indicates a DRB configured to use a RLC layer entity operating in an AM.

Figure 1F:
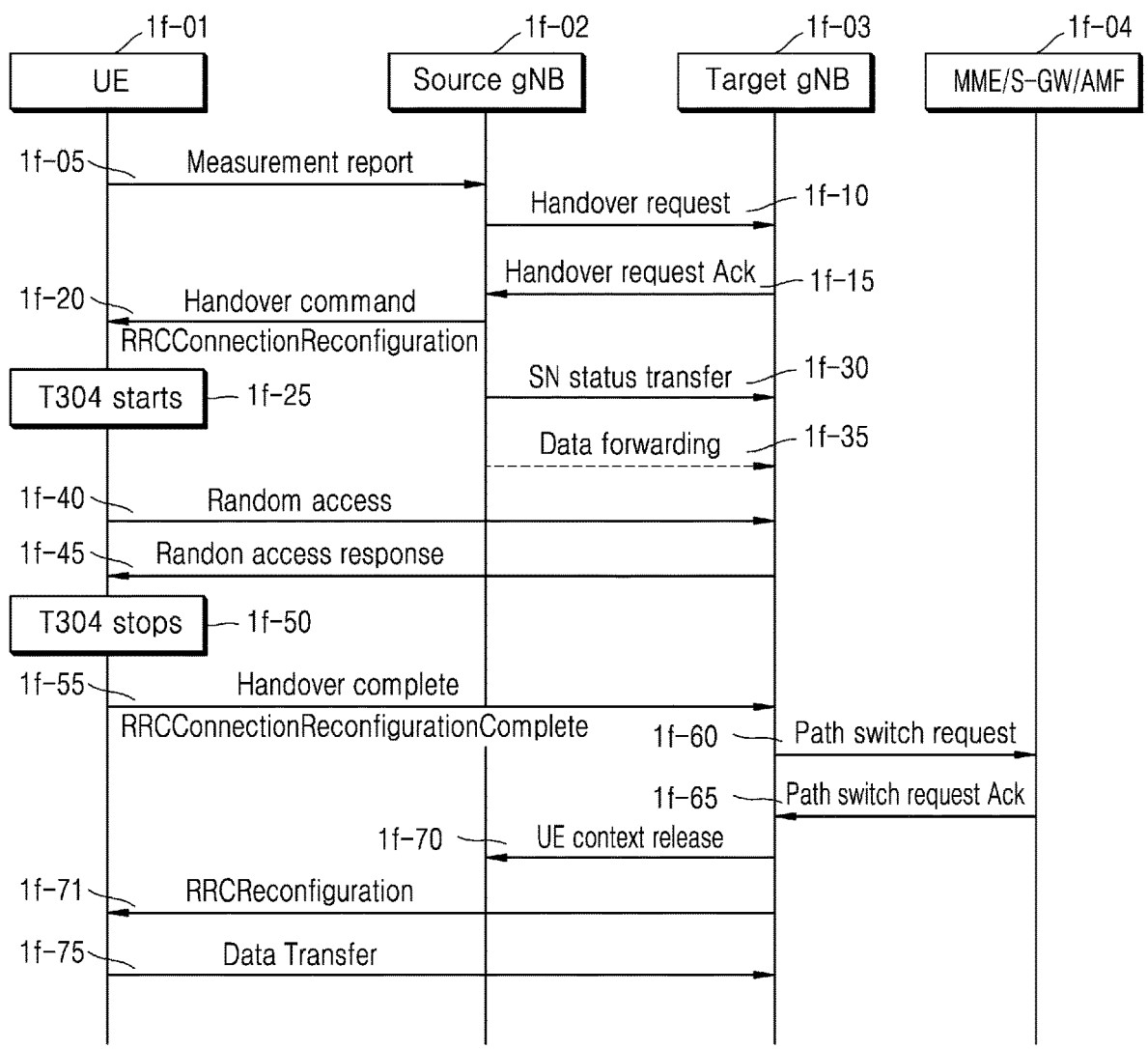
FIG. 1F is a diagram illustrating signaling procedures in which a UE performs handover in a next-generation mobile communication system according to an embodiment of the disclosure.

FIG. 1F is a diagram illustrating signaling procedures in which a UE performs handover in a next-generation mobile communication system according to an embodiment of the disclosure. A UE 1f-01 in an RRC connected mode state performs a cell measurement report to a current source BS (source gNB) 1f-02 in a periodic manner or when a particular event is satisfied (1f-05). The source BS determines, based on the cell measurement report, whether the UE is to perform handover to an adjacent cell. The handover refers to switching a source BS to another BS (or another cell in a same BS), the source BS providing a service to the UE in a connected mode state. When the source BS determines handover, the source BS requests the handover by transmitting a handover request message (e.g., a handover preparation information message) to a target BS (target gNB) 1f-03 that is a new BS to provide a service to the UE (1f-10). When the target BS accepts the handover request, the target BS transmits a handover request acknowledgement (Ack) message (e.g., a handover command message) to the source BS (1f-15). Upon receiving the handover request Ack message, the source BS transmits, to the UE, the handover command message (an RRCReconfiguration message included in a Dedicated Control Channel (DCCH) of the handover request Ack message) (1f-20). The source BS extracts the handover command message from a message received from the target and transmits the handover command message to the UE by using an RRC Connection Reconfiguration message (1f-20).

The disclosure provides an embodiment of determining a DAPS handover method by using two messages when the source BS transmits the handover preparation information message (1f-10), and in response thereto, the target BS transmits the handover command message (1f-15) to the source BS.

Embodiment 1 of performing a DAPS handover procedure according to an embodiment of the disclosure will now be described.

In Embodiment 1, an entity for determining the DAPS handover method may be the source BS. Also, in Embodiment 1, when the source BS requests the target BS for DAPS handover, the target BS may indicate or perform the DAPS handover.

The source BS may define a new indicator in the handover preparation information message, and the indicator may indicate that the source BS is to perform the DAPS handover procedure and may request the DAPS handover procedure. The handover preparation information message may include current bearer configuration information of the UE, security key information, cell group configuration information, UE capability information, or the like. The source BS may pre-share a capability of the target BS and thus may identify in advance whether the target BS supports the DAPS handover method, and may indicate that the source BS is to perform the DAPS handover method on the target BS. Accordingly, the source BS may indicate, to the target BS, that the source BS may perform early data forwarding fast or in advance, and may indicate the target BS to prepare to receive data forwarding and perform processing. The source BS may request the DAPS handover method request with respect to each bearer (DRB or SRB).

In a case where the target BS receives the handover preparation information message and identifies that an indicator requesting the DAPS handover method is included in the handover preparation information message, when the target BS configures an RRCReconfiguration message to indicate the UE with handover, the target BS may add, to the RRCReconfiguration message, an indicator indicating the DAPS handover method, and may configure the RRCReconfiguration message including bearer configuration information or bearer configuration information or security key information or cell group configuration information or system information required for the UE to perform the DAPS handover method. The target BS may add the configured RRCReconfiguration message to a DL-DCCH message of a handover command message and may transmit the handover command message to the source BS. The target BS may perform indication of the DAPS handover method with respect to each bearer (DRB or SRB).

When the source BS receives the handover command message, the source BS may extract the RRCReconfiguration message included in the handover command message or may transmit the RRCReconfiguration message to the UE, thereby indicating handover. The source BS may identify the indicated DAPS handover method for each bearer, and may perform the DAPS handover method for each bearer (DRB or SRB).

Embodiment 2 of performing a DAPS handover procedure according to an embodiment of the disclosure will now be described.

In Embodiment 2, an entity for determining a DAPS handover method may be the target BS. Also, in Embodiment 2, in a case where the source BS requests, by an indicator, the target BS for the DAPS handover method, the target BS may reject or accept the request or may indicate another handover method via a handover command message indicating the other handover method for the source BS.

The source BS may define a new indicator in the handover preparation information message, and the indicator may indicate that the source BS is to perform the DAPS handover procedure and may request the DAPS handover procedure. The handover preparation information message may include current bearer configuration information of the UE, security key information, cell group configuration information, UE capability information, or the like. The source BS may pre-share a capability of the target BS and thus may identify in advance whether the target BS supports the DAPS handover method, and may indicate that the source BS is to perform the DAPS handover method on the target BS. Accordingly, the source BS may indicate, to the target BS, that the source BS may perform early data forwarding fast, and may indicate the target BS to prepare to receive data forwarding and perform processing. The source BS may request the DAPS handover method request with respect to each bearer (DRB or SRB).

In a case where the target BS receives the handover preparation information message and identifies that an indicator requesting the DAPS handover method is included in the handover preparation information message, the target BS may reject or accept the request for the DAPS handover method or may indicate another handover method, based on whether the target BS can support the DAPS handover method, an amount of current transport resources, or scheduling. The target BS may add, to a handover command message, an indicator to reject or accept the request for the DAPS handover method, or an indicator to indicate the other handover method, and may transmit the handover command message. When the target BS configures an RRCReconfiguration message to indicate handover to the UE, if the target BS accepts the DAPS handover request, the target BS may add an indicator to indicate the DAPS handover method. If the target BS rejects the DAPS handover request, when the target BS configures an RRCReconfiguration message to indicate handover to the UE, the target BS may configure the RRCReconfiguration message by including an indicator indicating another handover method, and including bearer configuration information or security key information or cell group configuration information or system information which is required for the UE to perform the DAPS handover method or the other handover method. The target BS may add the configured RRCReconfiguration message to a DL-DCCH message of the handover command message and may deliver the message to the source BS. The target BS may perform indication of the DAPS handover method with respect to each bearer (DRB or SRB).

When the source BS receives the handover command message, the source BS may identify the indicator included in the handover command message and thus may identify whether the request for the DAPS handover method is accepted, and when the request for the DAPS handover method is accepted, the source BS may perform the DAPS handover procedure and may extract the RRCReconfiguration message included in the handover command message or may transmit the RRCReconfiguration message to the UE, thereby indicating handover. However, when the source BS identify the indicator included in the handover command message, if the request for the DAPS handover method is rejected or the other handover method is indicated, the source BS may perform the other handover method indicated by the target BS. Then, the source BS may extract the RRCReconfiguration message included in the handover command message or may transmit the RRCReconfiguration message to the UE, thereby indicating handover. According to another embodiment of the disclosure, even when the handover command message does not include a separate indicator, the source BS may check the RRCReconfiguration message included in the handover command message so as to identify which handover method is indicated by the target BS and to identify whether the request for the DAPS handover method is accepted, and may perform a handover method (e.g., the DAPS handover method or the other handover method) indicated by the RRCReconfiguration message. The source BS may identify the indicated DAPS handover method for each bearer and may perform the DAPS handover method for each bearer (DRB or SRB).

Embodiment 3 of performing a DAPS handover procedure according to an embodiment of the disclosure will now be described.

In Embodiment 3, an entity for determining a DAPS handover method may be the target BS. Also, in Embodiment 3, the target BS may identify capability of the UE, and may determine a handover method (e.g., the DAPS handover method) according to whether the target BS can support the DAPS handover method, or an amount of current transport resources or scheduling.

The source BS may include, in a handover preparation information message, current bearer configuration information of the UE or security key information or cell group configuration information or UE capability information, and may transmit the handover preparation information message to request the target BS for handover. The source BS may pre-share capability of the target BS and thus may identify in advance whether the target BS supports the DAPS handover method, and when the target BS indicates that the target BS is to perform the DAPS handover procedure, the source BS may perform early data forwarding fast or in advance.

The target BS may receive the handover preparation information message and may determine a handover method (e.g., the DAPS handover) according to capability information of the UE or whether the target BS can support the DAPS handover method or an amount of current transport resources or scheduling. When the target BS determines the DAPS handover method, the target BS may include an indicator indicating the DAPS handover method in a handover command message and may transmit the message. When the target BS configures an RRCReconfiguration message to indicate handover to the UE, if the target BS determines DAPS handover, the RRCReconfiguration message may include an indicator indicating the DAPS handover method, and if the target BS determines another handover method other than the DAPS handover, the RRCReconfiguration message may include an indicator indicating the other handover method. Also, the target BS may configure the RRCReconfiguration message by including bearer configuration information or bearer configuration information or security key information or cell group configuration information or system information which is required for the UE to perform the DAPS handover method or the other handover method. The target BS may add the configured RRCReconfiguration message to a DL-DCCH message of the handover command message and may deliver the message to the source BS. The target BS may perform indication of the DAPS handover method with respect to each bearer (DRB or SRB).

When the source BS receives the handover command message, the source BS may identify the indicator included in the handover command message and thus may identify whether the DAPS handover is determined, and when the DAPS handover is determined, the source BS may perform the DAPS handover method and may extract the RRCReconfiguration message included in the handover command message or may transmit the RRCReconfiguration message to the UE, thereby indicating handover. However, when the source BS identifies the indicator included in the handover command message, if the DAPS handover method is not determined or the other handover method is indicated, the source BS may perform the other handover method indicated by the target BS. Then, the source BS may extract the RRCReconfiguration message included in the handover command message or may transmit the RRCReconfiguration message to the UE, thereby indicating handover. In another method, even when the handover command message does not include a separate indicator, the source BS may check the RRCReconfiguration message included in the handover command message so as to identify which handover method is indicated by the target BS and to identify whether determination of the DAPS handover method is performed, and when the other handover method is indicated, may perform the indicated handover method. The source BS may identify the indicated DAPS handover method for each bearer and may perform the DAPS handover method for each bearer (DRB or SRB).

A new embodiment may be performed by combining methods of Embodiment 1, Embodiment 2, or Embodiment 3 of performing the DAPS handover procedure according to an embodiment of the disclosure.

A BS may indicate, by the RRCReconfiguration message, a handover method (the DAPS handover method) according to an embodiment of the disclosure to the UE, or in another method, the BS may configure the DAPS handover method for each bearer (DRB or SRB) of the UE. For example, a new indicator indicating the efficient handover method (the DAPS handover method) may be defined in bearer configuration information or PDCP configuration information or RLC configuration information for each bearer identifier or each logical channel identifier in the RRC message, and the BS may indicate, by using the identifier, an efficient handover message for each bearer or logical channel identifier to the UE. When the BS configures the DAPS handover method for the UE, the BS may also indicate other handover methods to prevent data loss or data delay which may occur in handover. For example, the handover method the BS may configure the UE with the DAPS handover method may include a conditional handover method or a handover method without a random access procedure. The conditional handover method may be a method by which a plurality of target cells and a plurality of conditions are configured for the UE and, when the UE satisfies a configured condition in a cell selection or reselection procedure, the UE performs a handover procedure on one target cell. When the UE receives the message, the UE discontinues or continues data transmission and reception to and from the source BS by using the configured handover method, and starts T304 timer. When the UE cannot succeed in handover to the target BS for a preset time (e.g., when T304 timer expires), the UE returns to its default configuration and transitions to an RRC idle state. Also, an RRC connection re-establishment procedure may be triggered, and in another method, when an efficient handover method is configured and a link to the source BS is active, the UE may fall back and report its handover failure to the source BS. The source BS provides a sequence number (SN) status of UL/DL data for each bearer (e.g., for each RLC UM bearer or each RLC AM bearer), and when DL data or UL data is present, the source BS transmits the DL data or the UL data to the target BS (**1*f*-30 and 1*f*-35). The UE attempts a random access to a target cell indicated by the source BS (1*f*-40). The random access is performed to notify switching of the UE to the target cell via the handover and simultaneously to match UL synchronization. For the random access, the UE transmits, to the target cell, a preamble that corresponds to a preamble ID provided by the source BS or corresponds to a randomly-selected preamble. After transmission of the preamble and after an elapse of a time period corresponding to a particular number of subframes, the UE monitors whether a Random Access Response (RAR) message is transmitted from the target cell. A time interval for monitoring is called an RAR window. When the RAR is received during a particular time (1*f*-45), the UE transmits a handover complete message in an RRC Reconfiguration Complete message to the target BS (1*f*-55). When the UE successfully receives the RAR from the target BS, the UE stops or ends T304 timer (1*f*-50). In order to switch a path of bearers which is configured for the source BS, the target BS requests a path switch (1*f*-60 and 1*f*-65), and indicates the source BS to discard UE context of the UE (1*f*-70). The target BS may transmit an RRC message (e.g., an RRCReconfiguration message 1*f*-71**) to the UE and may indicate, by using an indicator in the RRC message, the UE to release a link to the source BS. In another method, the target BS may transmit MAC control information or RLC control information or PDCP control information to the UE and thus may indicate the UE to release a link to the source BS. Therefore, the UE attempts, at a start point of the RAR window, to receive data from the target BS, and after the RAR message is received, the UE transmits the RRC Reconfiguration Complete message and receives a DL transport resource or a UL transport resource, thereby starting data transmission and reception to and from the target BS.

The UE may configure a plurality of first bearers with the source BS and may perform data transmission and reception (UL or DL data transmission and reception) via protocol layer entities (a PHY layer entity, a MAC layer entity, a RLC layer entity, a PDCP layer entity or the like) for each of the plurality of first bearers, and however, for convenience of descriptions, it is assumed that the UE has one bearer. That is, it is obvious that embodiments of the disclosure are applicable to a case where the UE has a plurality of bearers.

Figure 1G:
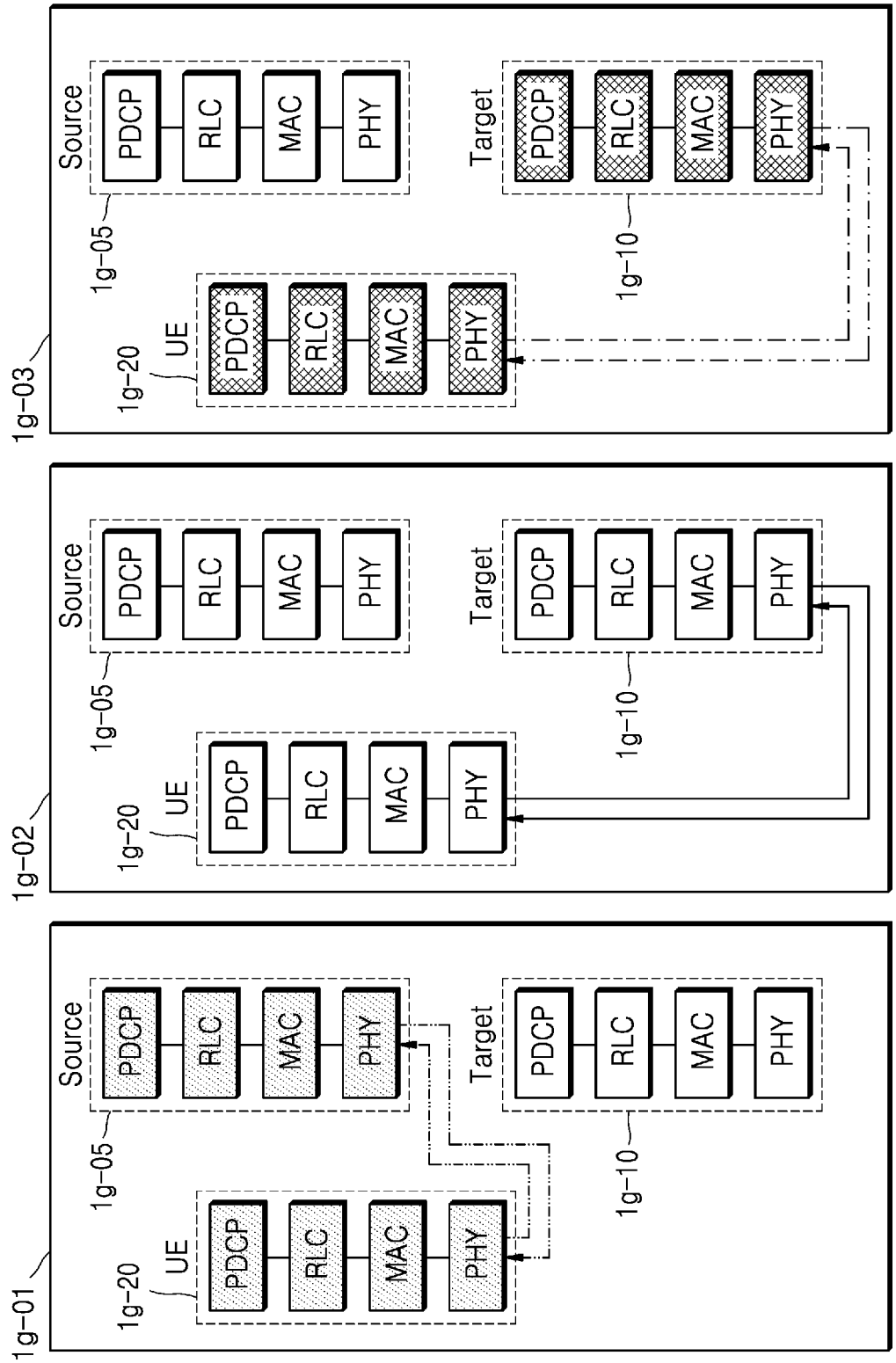
FIG. 1G is a diagram for describing Embodiment 1 of a handover method for minimizing a data interruption time due to handover, according to an embodiment of the disclosure.

FIG. 1G is a diagram for describing Embodiment 1 of a handover method for minimizing a data interruption time due to handover, according to an embodiment of the disclosure.

Referring to FIG. 1G, in operation 1g-01, when a UE 1g-20 transmits or receives data to or from a source BS 1g-05 and then receives a handover command message from the source BS 1g-05, the UE 1g-20, based on a handover method indicated by the handover command message (e.g., an RRCReconfiguration message), may release a link to the source BS 1g-05, may perform a random access procedure on a target BS 1g-10, and may perform a handover procedure. In another method, to minimize a data interruption time occurring in handover based on the indicated handover method, the UE may continuously transmit and receive data to and from the source BS 1g-05.

In operation 1g-02, when the UE 1g-20 performs the random access procedure on the target BS 1g-10 according to the handover method indicated by the handover command message or transmits a preamble or initially transmits data in a UL transport resource by using a PUCCH or PUSCH transport resource, the UE 1g-20 may discontinue data transmission and reception (UL data transmission and DL data reception) to and from the source BS 1g-05.

In operation 1g-03, the UE 1g-20 may complete the random access procedure with respect to the target BS 1g-10, may transmit a handover complete message, and may start data transmission and reception (UL data transmission and DL data reception) to and from the target BS 1g-10.

Figure 1H:
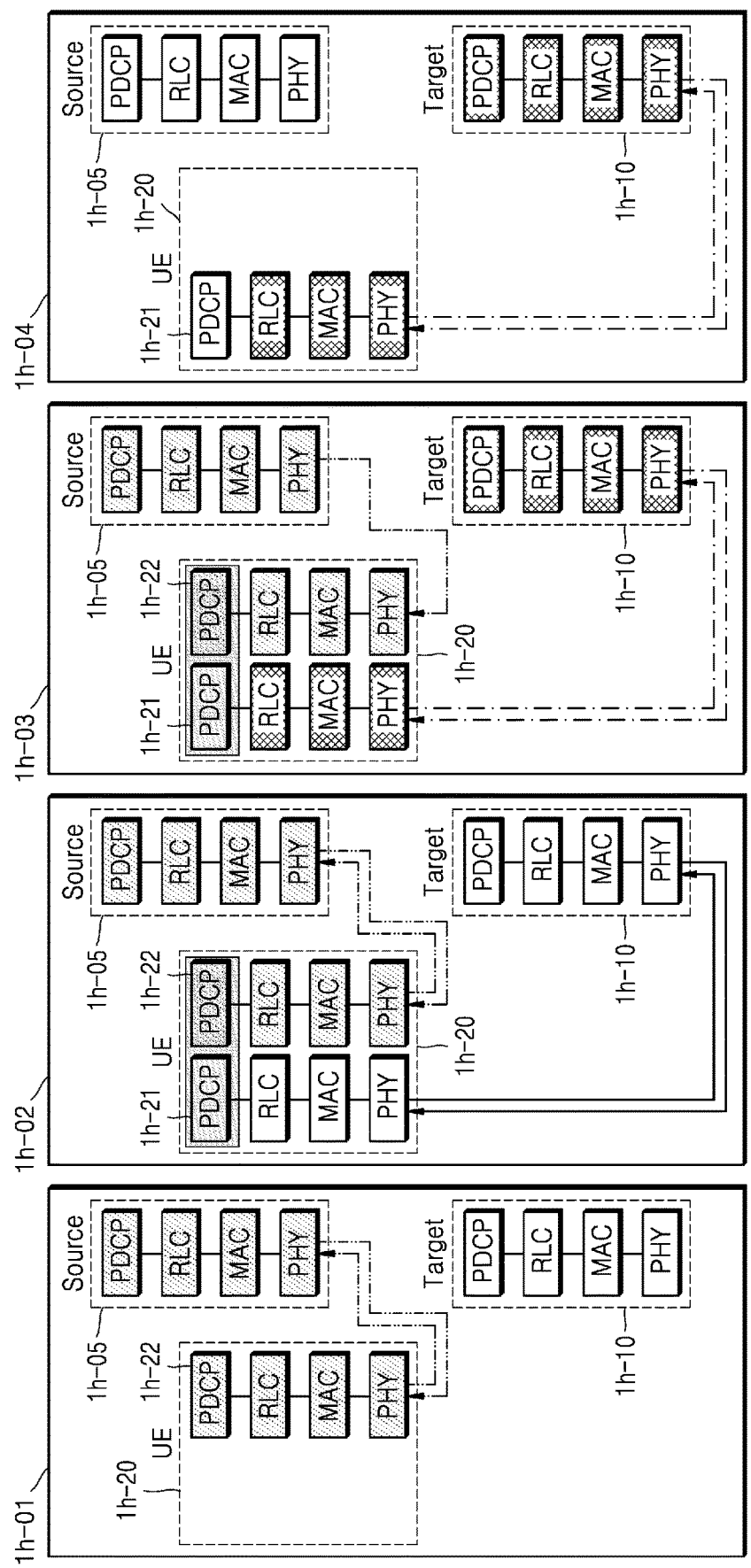
FIG. 1H is a diagram for describing Embodiment 2 of a handover method for minimizing a data interruption time due to handover, according to an embodiment of the disclosure.

FIG. 1H is a diagram for describing Embodiment 2 of a handover method for minimizing a data interruption time due to handover, according to an embodiment of the disclosure.

In operation 1h-01, when a UE 1h-20 receives a handover command message from a source BS 1h-05 while the UE 1h-20 transmits or receives data with the source BS 1h-05, if the handover command message indicates a handover method (e.g., a DAPS handover method) according to Embodiment 2 described above or indicates handover for each bearer, even when the UE 1h-20 has received the handover command message, the UE 1h-20 may continuously transmit and receive data to and from the source BS 1h-05 via protocol layer entities 1h-22 for a first bearer so as to minimize a data interruption time occurring in handover. Also, when an RRC layer entity identifies, in the received handover command message, an indication with respect to the handover method (e.g., the DAPS handover method) according to Embodiment 2 of the disclosure, or identifies an identifier with respect to the DAPS handover method for each bearer, the RRC layer entity may transmit the indicator to a PDCP layer entity corresponding to each bearer or a bearer for which the DAPS handover method is indicated, and when the PDCP layer entity receives the indicator, the PDCP layer entity may switch from a first PDCP layer entity architecture 1i-11 or 1i-12 to a second PDCP layer entity architecture 1i-20. To this end, the UE 1h-20 may receive a handover command message (an RRCReconfiguration message) from a BS. Also, when the UE 1h-20 switches to the second PDCP layer entity architecture according to configuration included in the received handover command message, the UE 1h-20 may pre-configure or pre-set up protocol layer entities (a PHY layer entity or a MAC layer entity or a RLC layer entity or a PDCP layer entity) 1h-21 of a second bearer for a target BS 1h-10, may derive and update a security key for the target BS 1h-10, and may configure header (or data) compression context for the target BS 1h-10. Also, in a case where the UE 1h-20 receives the handover command message, and the handover command message indicates the DAPS handover method according to an embodiment of the disclosure or indicates the DAPS handover method for particular bearers, or a case where a PDCP reordering timer value is newly set, when the UE 1h-20 switches the first PDCP layer entity architecture or function 1i-11 or 1i-12 to the second PDCP layer entity architecture or function 1i-20 with respect to each bearer or a bearer for which the DAPS handover method is indicated, the UE 1h-20 may update a variable for reordering to a PDCP SN or a COUNT value which is predicted to be received next time, may stop a reordering timer, and may restart the reordering timer. Then, when the handover command message (e.g., the RRCReconfiguration message) is received, an RRC layer entity of the UE may start a first timer (e.g., T304). The first timer may stop when the UE performs a random access procedure on the target BS so as to perform handover and then the random access procedure is successfully completed (e.g., when a first condition proposed in the disclosure is satisfied), and if the handover fails and thus the first timer expires, when a link to the source BS is active, the UE may fall back and report its handover failure to the source BS and may attempt link recovery, and when a link to the source BS is inactive, the UE may perform an RRC connection re-establishment procedure.

According to the handover command message, a second bearer may be configured and established to have a same identifier as a first bearer, such that a data interruption time does not occur in each bearer. Also, in Embodiment 2, a PDCP layer entity for the first bearer and a PDCP layer entity for the second bearer may logically operate as one PDCP layer entity, and detailed descriptions about the operation will be provided with reference to FIG. 1I. In Embodiment 2, when the UE 1h-20 is configured to transmit UL data to both the source BS 1h-05 and the target BS 1h-10, to avoid a coverage lessening problem due to insufficient transmission power of the UE 1h-20 or to prevent link selection by which, when the UE 1h-20 transmits UL data, the UE 1h-20 has to determine to which BS the UE 1h-20 has to request a transport resource and to transmit the UL data, the UE 1h-20 may transmit the UL data to only one of the source BS 1h-05 and the target BS 1h-10. In detail, in Embodiment 2, when the UE does not have capability (dual uplink transmission) of simultaneously transmitting UL data to different BSs on different frequencies or a same frequency, the UE may transmit the UL data to only one BS from among the source BS and the target BS within one time unit. Therefore, the UE 1h-20 may perform a scheduling request to only one BS from among the source BS 1h-05 or the target BS 1h-10, may transmit a report (e.g., a buffer status report) about a size of a plurality of items of data to be transmitted by the PDCP layer entity to only one BS from among the source BS 1h-05 or the target BS 1h-10, may receive a UL transport resource, and thus may transmit UL data to only one BS. Also, even when the UE 1h-20 receives a handover command message from the source BS 1h-05, the UE may prevent data loss due to retransmission of HARQ by continuing data transmission and reception. Also, in the above descriptions, an MAC layer entity for the first bearer may not be reset to continue retransmission of HARQ. Also, a RLC layer entity in an AM mode may continuously perform data transmission for RLC retransmission.

In another method, when the handover command message indicates, for each bearer, Embodiment 2 (the DAPS handover method) of the efficient handover method proposed in the disclosure, the UE may continuously transmit or receive data to or from the source BS with respect to only a PDCP layer entity or a RLC layer entity or a MAC layer entity, which corresponds to a bearer or a logical channel identifier for which Embodiment 2 (the DAPS handover method) is indicated in the handover command message, or with respect to only data corresponding to the bearer or the logical channel identifier. Also, when the first condition proposed in the disclosure is satisfied (e.g., when UL data transmission is switched to the target BS), the UE may continuously transmit or receive RLC control data (a RLC status report) or PDCP control data (a ROHC feedback or a PDCP status report) or HARQ retransmission to or from the source BS with respect to only the PDCP layer entity or the RLC layer entity or the MAC layer entity, which corresponds to the bearer or the logical channel identifier for which Embodiment 2 (the DAPS handover method) is indicated in the handover command message. Also, when the handover command message indicates, for each bearer, Embodiment 2 (the DAPS handover method) of the efficient handover method proposed in the disclosure, the UE may discontinue transmission or reception of data to or from the source BS with respect to a PDCP layer entity or a RLC layer entity or a MAC layer entity, which corresponds to a bearer or a logical channel identifier for which Embodiment 2 (the DAPS handover method) is not indicated in the handover command message.

Then, the UE 1h-20 may receive the handover command message, when the handover command message indicates the DAPS handover method or indicates the DAPS handover method for particular bearers or newly configures QoS flow and bearer mapping information, the UE 1h-20 may switch a first SDAP layer entity architecture or function 1j-10 to a second SDAP layer entity architecture or function 1j-20 with respect to each bearer or a bearer for which the DAPS handover method according to an embodiment of the disclosure is indicated. Also, the second SDAP layer entity architecture may be configured in such a manner that an existing first QoS flow and existing bearer mapping information for the source BS 1h-05 are maintained to process UL data to be transmitted to the source BS 1h-05 and DL data to be received from the source BS 1h-05, and a second QoS flow and the bearer mapping information that are newly configured in the handover command message may be configured for the target BS 1h-10, and may be used to process UL data to be transmitted to the target BS 1h-10 and DL data to be received from the target BS 1h-10. That is, in the second SDAP layer entity architecture according to an embodiment of the disclosure, the first QoS flow and the bearer mapping information for the source BS 1h-05 or the second QoS flow and the bearer mapping information for the target BS 1h-10 are maintained such that data for the source BS 1h-05 and data for the target BS 1h-10 may be separately processed. A SDAP layer entity in the second SDAP layer entity architecture may identify whether data received from a lower layer is data received from the source BS 1h-05 or data received from the target BS 1h-10, via information indicated by a 1-bit indicator of a SDAP header or a 1-bit indicator of a PDCP header or the PDCP layer entity. When the source BS 1h-05 or the target BS 1h-10 indicates the UE with the DAPS handover method with respect to each bearer by using a handover command message, the source BS 1h-05 or the target BS 1h-10 may always indicate the DAPS handover method with respect to a default bearer (default DRB), and by doing so, when data occurs in a new QoS flow that does not correspond to a QoS flow and bearer mapping information when a DAPS handover procedure is performed, the source BS 1h-05 or the target BS 1h-10 may indicate the UE to always transmit UL data via the default bearer. When the DAPS handover method is not configured for the default bearer, UL data transmission with respect to the new QoS flow occurred in handover is unavailable such that a data interruption time may occur.

In another method, when a handover command message (e.g., an RRCReconfiguration message) is received, Embodiment 2 (the DAPS handover method) is indicated, and SDAP layer entity configuration information or a second QoS flow and bearer mapping information for the target BS are configured in the RRC message, the UE may apply the SDAP layer entity configuration information or the second QoS flow and the bearer mapping information when the first condition proposed in the disclosure is satisfied. Also, when the handover command message indicates Embodiment 2 (the DAPS handover method) for each bearer, the UE may maintain and apply only a first QoS flow and bearer mapping information which correspond to a bearer for which Embodiment 2 is indicated when the UE maintains the first QoS flow and the bearer mapping information for the source BS, and the UE may release or does not apply a first QoS flow and bearer mapping information which correspond to a bearer for which Embodiment 2 is not indicated. Also, when the SDAP layer entity configuration information or the second QoS flow and the bearer mapping information for the target BS are configured in the RRC message, the UE may apply the SDAP layer entity configuration information or the second QoS flow and the bearer mapping information to data transmission or reception to or from the target BS when the first condition proposed in the disclosure is satisfied.

In operation 1h-02, when the UE 1h-20 performs, via the protocol layer entities for the second bearer, the random access procedure on the target BS 1h-10 indicated by the handover command message, the UE 1h-20 may continue data transmission or reception (UL data transmission or DL data reception) to or from the source BS 1h-05 via the protocol layer entities for the first bearer. In operation 1h-02, the UE 1h-20 may perform a cell selection procedure or a cell reselection procedure, and may perform a random access procedure on a target cell indicated by a handover command message (an RRCReconfiguration message) received from the source BS 1h-05.

In operation 1h-03, when the first condition is satisfied, the UE 1h-20 may discontinue UL data transmission to the source BS 1h-05 via the protocol layer entities 1h-22 for the first bearer, and may transmit the UL data to the target BS 1h-10 via the protocol layer entities 1h-21 for the second bearer, and may continuously receive DL data from the source BS 1h-05 and the target BS 1h-10 via the protocol layer entities for the first and second bearers. In operation 1h-03, the UE 1h-20 may satisfy the first condition and thus may switch UL transmission from the source BS 1h-05 to the target BS 1h-10, and in detail, the UE 1h-20 may transmit UL data to the source BS 1h-05 via the first bearer until the UE 1h-20 satisfies the first condition, and when the UE 1h-20 satisfies the first condition, the UE 1h-20 may discontinue transmission of the UL data to the source BS 1h-05 via the first bearer, and may start transmission of the UL data to the target BS 1h-10 via the second bearer. In detail, in the second PDCP layer entity architecture proposed in the disclosure, in a case where the PDCP layer entity transmits UL data via the first bearer and satisfies the first condition and thus receives an indicator from a lower layer (when the MAC layer entity succeeds in a random access procedure on the target BS) or an upper layer (when a first timer expires in the RRC layer entity), the PDCP layer entity may discontinue transmission of the UL data via the first bearer, may switch to the second bearer, and may start transmission of the UL data via the second bearer. Also, as in the PDCP layer entity structure proposed with reference to FIG. 1I, a receiving PDCP layer entity 1h-21 for the second bearer and a receiving PDCP layer entity 1h-22 for the first bearer may operate as one entity, and the receiving PDCP layer entity 1h-21 may continuously receive data from the source BS 1h-05 or the target BS 1h-10 without interruption by using stored transceived data or SN information or information such as header compression and decompression context. The first condition may be one of conditions below. The first conditions below propose a UL data transmission switching time point at which a transport resource may be maximally and efficiently used, and a data interruption time may be minimized.

It may be determined that the UE 1h-20 satisfies the first condition when the UE successfully completes a random access procedure on the target BS via the layer entities (e.g., a MAC layer entity) for the second bearer or when the UE successfully completes the random access procedure on the target BS 1h-10 via the layer entities (e.g., the MAC layer entity) for the second bearer and receives allocation of a first UL transport resource from the target BS 1h-10 or when a UL transport resource is first indicated to the UE 1h-20.

For example, when the UE 1h-20 receives a handover command message from the source BS 1h-05 and receives an indication of a random access to the target BS 1h-10, if the indicated random access is a Contention Free Random Access (CFRA) (e.g., if a predefined preamble or a UE-cell identifier (e.g., Cell-Radio Network Temporary Identifier (C-RNTI) is allocated), it may be determined that the random access procedure is successfully completed when the UE 1h-20 transmits the predefined preamble to a cell of the target BS and receives a RAR message, and therefore, when the UE 1h-20 receives a first UL transport resource allocated or included or indicated in the RAR message, it may be determined that the first condition is satisfied. In another method, when the UE first receives a UL transport resource after the UE receives the RAR message, it may be determined that the first condition is satisfied.

When the UE 1h-20 receives a handover command message from the source BS 1h-05 and receives an indication of a random access to the target BS 1h-10, if the indicated random access is a Contention-Based Random Access (CBRA) (e.g., if a predefined preamble or a UE-cell identifier (e.g., C-RNTI) is not allocated), the UE 1h-20 may transmit a preamble (e.g., a random preamble) to a cell of the target BS 1h-10 and may receive a RAR message. Here, when the UE 1h-20 transmits message3 (e.g., a handover complete message) by using a UL transport resource allocated or included or indicated in the RAR message, and receives, from the target BS 1h-10 and via message4, a Contention resolution MAC CE indicating resolution of contention or receives a UL transport resource via a PDCCH corresponding to a C-RNTI of the UE, the UE 1h-20 may determine that the random access procedure to the target BS 1h-10 is successfully completed, and thus, when the UE monitors the PDCCH and first receives or is first indicated with the UL transport resource via the PDCCH corresponding to the C-RNTI of the UE, it may be determined that the first condition is satisfied. In another method, when a size of the UL transport resource allocated in the RAR message is sufficient and thus the UE 1h-20 can transmit message3 and additionally transmit UL data, the UE 1h-20 may determine that the UE 1h-20 first receives a UL transport resource and thus may determine that the first condition is satisfied. That is, when the UE 1h-20 receives a RAR message, the UE 1h-20 may determine that the UE 1h-20 first receives the UL transport resource and thus may determine that the first condition is satisfied.

If a handover method (RACH-less handover) that does not request a random access procedure is also indicated in the handover command message received by the UE 1h-20, if the handover command message includes a UL transport resource with respect to the target BS 1h-10, when the UE 1h-20 transmits message3 (e.g., a handover complete message or a RRCReconfiguration-Complete message) by using the UL transport resource of the target BS 1h-10, and receives, from the target BS 1h-10, a UE Identity Confirmation MAC CE via message4 or receives a UL transport resource via a PDCCH corresponding to a C-RNTI of the UE, the UE 1h-20 may determine that a random access procedure is successfully completed and the first condition is satisfied. In another method, after the random access procedure is successfully completed, when the UE 1h-20 monitors a PDCCH and receives a first UL transport resource via the PDCCH corresponding to the C-RNTI of the UE 1h-20, the UE 1h-20 may determine that the first condition is satisfied.

If the handover command message does not include the UL transport resource with respect to the target BS 1h-10, when the UE 1h-20 performs PDCCH monitoring on the target BS 1h-10 (or a cell) and receives a UL transport resource via the PDCCH corresponding to the C-RNTI of the UE 1h-20 or transmits message3 (e.g., a handover complete message or a RRCReconfigurationComplete message) by using the UL transport resource, and receives a UE Identity Confirmation MAC CE from the target BS or receives a UL transport resource via the PDCCH corresponding to the C-RNTI of the UE, the UE 1h-20 may determine that a random access procedure is successfully completed and the first condition is satisfied. In another method, after the random access procedure is successfully completed, when the UE 1h-20 performs PDCCH monitoring and receives a first UL transport resource via the PDCCH corresponding to the C-RNTI of the UE 1h-20, the UE 1h-20 may determine that the first condition is satisfied.

According to an embodiment of the disclosure, provided is a method of switching UL data from the source BS to the target BS, the method being performed when the DAPS handover method is performed. A MAC layer entity or an RRC layer entity for the target BS corresponding to a second bearer may identify or detect whether the first condition is satisfied, by one of methods below, and a new method may be applied by combining the methods below.

First method: For example, when an RRCReconfiguration message received by the UE indicates DAPS handover, the UE may configure the MAC layer entity for the target BS corresponding to the second bearer, and the MAC layer entity may perform a random access procedure and may identify whether the first condition is satisfied. When the first condition is satisfied, the MAC layer entity may indicate, by using an indicator, an upper layer (e.g., a PDCP layer entity) to switch UL data transmission from the source BS via a first bearer to the target BS via the second bearer in the DAPS handover method.

Second method: For example, when an RRCReconfiguration message received by the UE indicates DAPS handover, the UE may configure the MAC layer entity for the target BS corresponding to the second bearer, and the MAC layer entity may perform a random access procedure and may identify whether the first condition is satisfied. When the first condition is satisfied, the MAC layer entity may indicate, to an upper layer (e.g., an RRC layer entity), that the first condition is satisfied. Also, the upper layer (e.g., the RRC layer entity) may indicate, by using an indicator, a lower layer (e.g., the PDCP layer entity) to switch UL data transmission from the source BS via the first bearer to the target BS via the second bearer in the DAPS handover method. When the first condition proposed in the disclosure is satisfied or a random access procedure on the target BS is successfully performed, the upper layer (e.g., the RRC layer entity) stops a first timer, and thus, when the first timer stops, the RRC layer entity may indicate, by using an indicator, the PDCP layer entity to switch the UL data transmission.

Third method: When an RRCReconfiguration message received by the UE indicates DAPS handover, the UE may configure the MAC layer entity for the target BS corresponding to the second bearer. Here, in a case where an indicator indicating that the RRC layer entity of the UE performs DAPS handover is delivered to a lower layer (e.g., the MAC layer entity), the MAC layer entity may perform a random access procedure and may identify whether the first condition is satisfied. When the first condition is satisfied, the MAC layer entity may indicate, by using an indicator, an upper layer (e.g., the PDCP layer entity) to switch UL data transmission from the source BS via the first bearer to the target BS via the second bearer in the DAPS handover method.

Fourth method: When an RRCReconfiguration message received by the UE indicates DAPS handover, the UE may configure the MAC layer entity for the target BS corresponding to the second bearer. Here, in a case where an indicator indicating that the RRC layer entity of the UE performs DAPS handover is delivered to a lower layer (e.g., the MAC layer entity), the MAC layer entity may perform a random access procedure and may identify whether the first condition is satisfied. When the first condition is satisfied, the MAC layer entity may indicate, to an upper layer (e.g., the RRC layer entity), that the first condition is satisfied. In a case where the indicator is identified, the upper layer (e.g., the RRC layer entity) may stop the first timer when the first condition proposed in the disclosure is satisfied or the random access procedure on the target BS is successfully performed. The upper layer (e.g., the RRC layer entity) may indicate, by using an indicator, a lower layer (e.g., the PDCP layer entity) to switch UL data transmission from the source BS via the first bearer to the target BS via the second bearer in the DAPS handover method.

When the PDCP layer entity receives (e.g., when the DAPS handover method is indicated) an indicator indicating that the first condition is satisfied or an indicator indicating switching UL data transmission from the source BS to the target BS, from the upper layer (e.g., the RRC layer entity) or the lower layer (e.g., the MAC layer entity) according to the first method or the second method or the third method or the fourth method, the PDCP layer entity may perform an operation below to efficiently perform switching of UL data transmission, and may perform one or more operations from among operations below to prevent data loss due to the UL data transmission. The operations below may be applied to the PDCP layer entity connected to an AM DRB or a UM DRB (a RLC layer entity operating in an AM mode or a RLC layer entity operating in a UM mode). If the PDCP layer entity has data to be transmitted to a buffer before the first condition is satisfied or before the indicator indicating that the first condition is satisfied is received, the PDCP layer entity may indicate, to the MAC layer entity for the source BS corresponding to the first bearer, that there is the data to be transmitted by indicating a size or amount (e.g., a PDCP data volume) of the data to be transmitted, and may perform UL data transmission to the source BS. Then, the MAC layer entity for the source BS corresponding to the first bearer may perform a scheduling request or a buffer status report procedure to receive allocation of a UL transport resource from the source BS. However, when the first condition is satisfied or the PDCP layer entity receives the indicator indicating that the first condition is satisfied, switching of UL data transmission to the target BS may be performed as below.

In order to switch UL data transmission from the first bearer for the source BS to the second bearer for the target BS, the PDCP layer entity may indicate, to the MAC layer entity for the first bearer, that a size or amount of data to be transmitted is 0 (or none). That is, the PDCP layer entity may indicate, to the MAC layer entity for the first bearer, that a data volume (a PDCP data volume) of the PDCP layer entity is 0, thereby indicating that there is no more data to be transmitted (even when the buffer actually stores a plurality of items of data to be transmitted, in order to switch UL data transmission, the PDCP layer entity may indicate, to the MAC layer entity for the source BS corresponding to the first bearer, that there is no more data to be transmitted). However, in a case where the handover method (the DAPS handover method) of Embodiment 2 as proposed in the disclosure is indicated or the handover method (the DAPS handover method) of Embodiment 2 is indicated for a bearer, when RLC control data (RLC status report) or PDCP control data (PDCP status report or ROHC feedback) is generated, a data volume corresponding to the RLC control data or the PDCP control data may be indicated for the MAC layer entity, and data transmission to the source BS may be performed.

The PDCP layer entity connected to an AM DRB (that is a RLC layer entity operating in an AM mode) may discard all pre-stored PDCP PDUs (e.g., PDCP SDUs are not discarded to prevent loss of original data), and may perform a procedure below on a plurality of items of data (the PDCP SDUs of the buffer) in ascending order of COUNT values (or PDCP SNs) allocated before the first condition is satisfied or the indicator indicating that the first condition is satisfied is received, the ascending order starting from first data (e.g., a PDCP SDU) for which successful delivery is not acknowledged by lower layers (e.g., the RLC layer entity for the source BS corresponding to the first bearer). In detail, the PDCP layer entity connected to the AM DRB (that is the RLC layer entity operating in the AM mode) may perform, based on header context for the target BS, a new header compression procedure on a plurality of items of data (PDCP PDUs of the buffer), may re-perform an integrity procedure or a ciphering procedure by applying security keys for the target BS, may configure a PDCP header, and may transfer the PDCP header to its lower layer entity (the RLC layer entity for the target BS corresponding to the second bearer), thereby performing retransmission or transmission. That is, accumulated retransmission of data starting from first data for which successful delivery is not acknowledged may be performed. In another method, when retransmission of data is performed, retransmission may be performed only on a plurality of items of data for which successful delivery is not acknowledged by lower layers (e.g., the RLC layer entities for the source BS corresponding to the first bearer). In more detail, the PDCP layer entity connected to the AM DRB (or the RLC layer entity operating in the AM mode) may discard all of stored PDCP PDUs to be transmitted to the source BS via a first protocol layer entity previously connected to the PDCP layer entity (e.g., PDCP SDUs may not be discarded to prevent loss of original data), and may perform a procedure below only on a plurality of items of data (e.g., the PDCP SDUs) for which successful delivery is not acknowledged by lower layers (e.g., the RLC layer entities) that are the first protocol layer entity for the source BS, based on COUNT values (or PDCP SNs) allocated before the first condition is satisfied or the indicator indicating that the first condition is satisfied is received. In detail, the PDCP layer entity connected to the AM DRB (or the RLC layer entity operating in the AM mode) may perform, by applying header compression (or data compression) protocol context or security key corresponding to the target BS, a new header or data compression procedure on a plurality of items of data (e.g., the PDCP SDUs) for which successful delivery is not acknowledged, may re-perform an integrity procedure or a ciphering procedure, may configure a PDCP header, and may configure and transfer the PDCP header to its lower layer entity that is a second protocol layer entity, thereby performing retransmission or transmission to the target BS. That is, to prevent waste of transport resources, the plurality of items of data for which successful delivery is not acknowledged are only selectively retransmitted. The transmission or the retransmission operation described above may be performed after lower layers (e.g., transmission or receiving RLC layer entity or MAC layer entity) that are the first protocol layer entity for transmitting data to the source BS are released. When the transmission or retransmission procedure is extended to a UM DRB, the PDCP layer entity connected to a RLC layer entity operating in a UM mode may regard data that is not transmitted to a lower layer entity yet, data for which PDCP discard timer is not expired, or a plurality of items of data to which PDCP SNs (or COUNT values) are already allocated, as a plurality of items of data received or newly received from an upper layer entity, may not restart a PDCP discard timer with respect to each data, and may perform header (or data) compression on the plurality of items of data by using header (or data) compression context or a security key for the target BS, or may perform ciphering or an integrity protection procedure, may generate and concatenate a PDCP header with the plurality of items of data, and then may perform transmission or retransmission, and may process data in ascending order of COUNT values allocated before the procedure is triggered and then may perform transmission or retransmission. A window state variable of the PDCP layer entity connected to the UM DRB or the AM DRB may not be reset and may be changelessly maintained and used.

When the PDCP layer entity has data to be transmitted to the buffer, the PDCP layer entity may indicate, to the MAC layer entity for the target BS corresponding to the second bearer, that there is the data to be transmitted by indicating a size or volume (e.g., a PDCP data volume) of the data to be transmitted, and may perform switching of UL data transmission to the target BS. Then, the MAC layer entity for the target BS corresponding to the second bearer may perform a scheduling request or a buffer status report procedure to receive allocation of a UL transport resource from the target BS.

In Embodiment 2 of the handover method (e.g., the DAPS handover method) according to an embodiment of the disclosure, even after the UE receives a handover command message (e.g., an RRCReconfiguration message), the UE may continuously receive DL data from the source BS or the target BS via the protocol layer entities for the source BS corresponding to the first bearer or for the target BS corresponding to the second bearer. In order to allow the UE to seamlessly receive DL data from the source BS (or the target BS) or to allow the source BS (or the target BS) to seamlessly transmit DL data, for AM bearers, the UE may be allowed to continuously perform UL transmission of a RLC status report, not data, on the source BS (or the target BS) via the protocol layer entities for the first bearer (or the second bearer). That is, even when the first condition is satisfied and thus the UE switches UL data transmission to the target BS, when the UE has to transmit the RLC status report, HARQ ACK or NACK, or PDCP control data (a PDCP ROHC feedback or a PDCP status report) to the source BS, the UE may be allowed to transmit data via the first bearer for the source BS. In a case of the AM bearers, when data is transmitted to a transmitting end and then successful delivery is not indicated by using a RLC status report (i.e., when the RLC status report is not received), data cannot be continuously transmitted thereafter. In detail, referring to FIG. 1H, in operation 1h-03 in Embodiment 2, even when the UE 1h-20 satisfies the first condition and discontinues UL data transmission to the source BS 1h-05 via the protocol layer entities 1h-22 for the first bearer, performs switching to the target BS 1h-10 and then starts UL data transmission to the target BS 1h-10 via the protocol layer entities 1h-21 for the second bearer, the UE 1h-20 may continuously transmit HARQ ACK or HARQ NACK information, a RLC status report (ACK or NACK information), or PDCP control data (e.g., a PDCP status report or PDCP ROHC feedback information) via the protocol layer entities for the first bearer (or the second bearer) so as to seamlessly receive DL data from the source BS 1h-05 (or the target BS 1h-10) or to allow the source BS 1h-05 (or the target BS 1h-10) to smoothly transmit DL data. Also, referring to FIG. 1H, in operation 1h-03 in Embodiment 2, even when the UE 1h-20 satisfies the first condition and thus discontinues UL data transmission to the source BS 1h-05 via the protocol layer entities 1h-22 for the first bearer, performs switching to the target BS 1h-10, and then starts UL data transmission to the target BS 1h-10 via the protocol layer entities 1h-21 for the second bearer, the UE 1h-20 may continuously perform data transmission due to HARQ retransmission by the MAC layer entity or data transmission due to retransmission by the RLC layer entity in the AM mode so as to prevent loss of data to the source BS 1h-05. When the UE 1h-20 satisfies the first condition and discontinues UL data transmission to the source BS 1h-05 via the protocol layer entities 1h-22 for the first bearer, performs switching to the target BS 1h-10, and then starts UL data transmission to the target BS 1h-10 via the protocol layer entities 1h-21 for the second bearer, the source BS 1h-05 or the target BS 1h-10 may allocate a transport resource to the UE 1h-20 at different time points so as to prevent collision between a UL transport resource to the target BS 1h-10 and a UL transport resource to the source BS 1h-05. When the UL transport resource to the target BS 1h-10 collides with and thus overlaps the UL transport resource to the source BS 1h-05, the UE 1h-20 may perform data transmission to the source BS 1h-05 by giving priority to the UL transport resource to the source BS 1h-05 so as to maintain transmission of DL data or continuously receive the DL data from the source BS 1h-05 without a problem. In another method, when a UL transport resource to the target BS 1h-10 collides with and thus overlaps a UL transport resource to the source BS 1h-05, the UE 1h-20 may perform data transmission to the target BS 1h-10 by giving priority to the UL transport resource to the target BS 1h-10 so as to maintain transmission of DL data from the target BS 1h-10.

In detail, when the UE 1h-20 receives a handover command message in which handover (the DAPS handover method) corresponding to Embodiment 2 is indicated or is indicated for each bearer, until the first condition is satisfied, the UE 1h-20 or the bearer for which the DAPS handover is indicated may perform a scheduling request via a first protocol layer entity, may receive a UL transport resource by transmitting a buffer status report to the source BS 1h-05, may transmit UL data, and may receive DL data from the source BS 1h-05. However, when the first condition is satisfied, the UE 1h-20 does not transmit data to the source BS 1h-05 anymore, may perform a scheduling request via a second protocol layer entity by switching a UL to the target BS 1h-10, may receive a UL transport resource by transmitting a buffer status report to the target BS 1h-10, and may transmit UL data to the target BS 1h-10. However, the UE 1h-20 may continuously receive DL data from the source BS 1h-05, and, even after UL transmission is switched, the UE 1h-20 may continuously transmit HARQ ACK or HARQ NACK, a RLC status report, or PDCP control data (e.g., a PDCP status report or ROHC feedback information) which corresponds to the DL data. Also, the UE 1h-20 may continuously receive DL data from the source BS 1h-05 or the target BS 1h-10 even when the first condition is satisfied.

When a second condition is satisfied in operation 1h-04, the UE 1h-20 may discontinue DL data reception from the source BS 1h-05 via the protocol layer entities 1h-22 for the first bearer or may release a link to the source BS 1h-05. The second condition may be one of conditions below. Also, the PDCP layer entity 1h-21 for the second bearer may continuously perform data transmission or reception without interruption to or from the target BS 1h-10 by using transceived data stored in the PDCP layer entity 1h-22 for the first bearer or SN information or information such as header compression and decompression context.

When the UE 1h-20 performs a random access procedure on the target BS 1h-10 via layer entities 1h-21 for the second bearer and receives a RAR, the UE 1h-20 may determine that the second condition is satisfied.

When the UE 1h-20 performs a random access procedure on the target BS 1h-10 via the layer entities for the second bearer, receives a RAR, and configures and transmits a handover complete message to the target BS 1h-10, the UE 1h-20 may determine that the second condition is satisfied.

When the UE 1h-20 performs a random access procedure on the target BS 1h-10 via the layer entities for the second bearer, and first transmits data on a PUCCH or PUSCH UL transport resource or first receives the PUCCH or PUSCH UL transport resource, the UE 1h-20 may determine that the second condition is satisfied.

When the source BS 1h-05 configures a separate timer for the UE 1h-20 by an RRC message, and the separate timer expires, the UE 1h-20 may determine that the second condition is satisfied.

The timer may start when the UE 1h-20 receives a handover command message from the source BS 1h-05 or when the UE 1h-20 starts a random access (transmits a preamble) to the target BS 1h-10 or when the UE 1h-20 receives a RAR from the target BS 1h-10 or when the UE 1h-20 transmits a handover complete message to the target BS 1h-10 or when the UE 1h-20 first transmits data on a PUCCH or PUSCH UL transport resource.

When the UE 1h-20 performs a random access procedure on the target BS 1h-10 via protocol layer entities for a second bearer, receives a RAR, configures and transmits a handover complete message to the target BS 1h-10, and then identifies acknowledgement with respect to successful delivery of the handover complete message by a MAC layer entity (HARQ ACK) or a RLC layer entity (RLC ACK), the UE 1h-20 may determine that the second condition is satisfied.

When the UE 1h-20 performs a random access procedure on the target BS 1h-10 via the protocol layer entities for the second bearer, receives a RAR or configures and transmits a handover complete message to the target BS 1h-10 and then first receives allocation of a UL transport resource from the target BS 1h-10 or first receives an indication of the UL transport resource, the UE 1h-20 may determine that the second condition is satisfied.

When the source BS 1h-05 performs a handover procedure, the source BS 1h-05 may determine when to discontinue transmission of DL data to the UE 1h-20 or when to release a link to the UE 1h-20. For example, when to discontinue transmission of DL data to the UE 1h-20 or when to release a link to the UE 1h-20 may be determined when a certain timer expires (the timer can start after handover is indicated) or when the source BS 1h-05 receives, from the target BS 1h-10, an indication indicating that the UE 1h-20 has successfully performed handover to the target BS 1h-10. When the UE 1h-20 does not receive DL data from the source BS 1h-05 for a certain time period, the UE 1h-20 may determine that the second condition is satisfied, and may determine that a link to the source BS 1h-05 is released and thus may release the link.

The UE 1h-20 may receive, from the target BS 1h-10, an indication indicating to release a link to the source BS 1h-05. For example, when the UE 1h-20 receives an RRC message (e.g., an RRCReconfiguration message) or a MAC CE or a RLC control PDU or a PDCP control PDU, the UE 1h-20 may determine that the second condition is satisfied.

When the UE 1h-20 receives, from the source BS 1h-05, an indication (e.g., an RRC message (e.g., an RRCReconfiguration message)) indicating to release the link to the source BS 1*h*-05 or a MAC CE or a RLC control PDU or a PDCP control PDU, the UE 1*h*-20 may determine that the second condition is satisfied.

When the UE 1*h*-20 does not receive DL data from the source BS 1*h*-05 for a certain time period, the UE 1*h*-20 may determine that the second condition is satisfied.

When the UE successfully completes a random access procedure on the target BS via the layer entities (e.g., the MAC layer entity) for the second bearer or when the UE successfully completes the random access procedure on the target BS 1*h*-10 via the layer entities for the second bearer and then receives allocation of a first UL transport resource from the target BS 1*h*-10 or when the UE 1*h*-20 first receives an indication of a UL transport resource, the UE 1*h*-20 may determine that the second condition is satisfied.

For example, when the UE 1*h*-20 receives a handover command message from the source BS 1*h*-05 and receives an indication of a random access to the target BS 1*h*-10, if the indicated random access is a CFRA (e.g., if a predefined preamble or a UE-cell identifier (e.g., C-RNTI) is allocated), it may be determined that the random access procedure is successfully completed when the UE 1*h*-20 transmits the predefined preamble to a cell of the target BS 1*h*-10 and receives a RAR message, and therefore, when the UE 1*h*-20 receives a first UL transport resource that is allocated or included or indicated in the RAR message, the UE 1*h*-20 may determine that the second condition is satisfied. In another method, when the UE 1*h*-20 first receives a UL transport resource after the RAR is received, the UE 1*h*-20 may determine that the second condition is satisfied.

When the UE 1*h*-20 receives a handover command message from the source BS 1*h*-05 and receives an indication of a random access to the target BS 1*h*-10, if the indicated random access is a CBRA (e.g., if a predefined preamble or a UE-cell identifier (e.g., C-RNTI) is not allocated), the UE may transmit a preamble (e.g., a random preamble) to a cell of the target BS, may receive a RAR message, and may transmit message3 (e.g., a handover complete message) by using a UL transport resource allocated or included or indicated in the RAR message. Also, when the UE receives, from the target BS and via message4, a Contention resolution MAC CE indicating resolution of contention or receives a UL transport resource via a PDCCH corresponding to a C-RNTI of the UE, the UE may determine that the random access procedure on the target BS is successfully completed, and thus, when the UE monitors the PDCCH and first receives or is first indicated with the UL transport resource via the PDCCH corresponding to the C-RNTI of the UE, the UE may determine that the second condition is satisfied. In another method, when a size of the UL transport resource allocated in the RAR message is sufficient and thus the UE can transmit the message3 and additionally transmit UL data, the UE may determine that the UE first receives a UL transport resource and thus may determine that the second condition is satisfied. That is, when the UE receives a RAR, the UE may determine that the UE first receives the UL transport resource and thus may determine that the second condition is satisfied.

If a handover method (RACH-less handover) that does not request a random access procedure is also indicated in the handover command message received by the UE, if the handover command message includes a UL transport resource with respect to the target BS, when the UE transmits message3 (e.g., a handover complete message or a RRCReconfigurationComplete message) by using the UL transport resource of the target BS, receives, from the BS, a UE Identity Confirmation MAC CE via a message4, or receives a UL transport resource via a PDCCH corresponding to a C-RNTI of the UE, the UE may determine that a random access procedure is successfully completed and may determine that the second condition is satisfied. In another method, after the random access procedure is successfully completed, when the UE performs PDCCH monitoring and thus receives a first UL transport resource via the PDCCH corresponding to the C-RNTI of the UE, the UE may determine that the second condition is satisfied.

If the handover command message does not include the UL transport resource with respect to the target BS, when the UE performs PDCCH monitoring on the target BS (or a cell) and receives a UL transport resource via the PDCCH corresponding to the C-RNTI of the UE or transmits message3 (e.g., a handover complete message or a RRCReconfigurationComplete message) by using the UL transport resource and receives a UE Identity Confirmation MAC CE from the BS or receives a UL transport resource via the PDCCH corresponding to the C-RNTI of the UE, the UE may determine that a random access procedure is successfully completed and may determine that the second condition is satisfied. In another method, after the random access procedure is successfully completed, when the UE performs PDCCH monitoring and thus receives a first UL transport resource via the PDCCH corresponding to the C-RNTI of the UE, the UE may determine that the second condition is satisfied.

When the UE performs Embodiment 2 of the handover method (e.g., the DAPS handover method) according to an embodiment of the disclosure, if it is identified that the RRC layer entity or the MAC layer entity or the RLC layer entity of the UE for the source BS corresponding to the first bearer, and the RRC layer entity or the MAC layer entity or the RLC layer entity of the UE for the target BS corresponding to the second bearer satisfy the second condition, an indicator indicating that the second condition is satisfied may be indicated to a PDCP layer entity of the UE or a bearer which performs the DAPS handover method. When the PDCP layer entity of the UE receives, from a lower layer entity or an upper layer entity, the indicator indicating that the second condition is satisfied, one or more procedures below may be performed such that the handover procedure according to Embodiment 2 of the disclosure may be successfully completed.

The UE may release the first bearer for the source BS and may release a link to the source BS. Then, before the UE releases the first bearer for the source BS, the UE may perform a RLC re-establishment procedure on the RLC layer entity corresponding to the first bearer for the source BS (e.g., when a reordering timer is running, the UE may stop or reset the timer, and when received data is stored in a buffer, the UE may process and provide the stored data to the upper layer entity. Also, when data to be transmitted is present in the buffer, the UE may discard the data) or may reset the MAC layer entity.

When the UE releases a link to the source BS, in order to report, to the target BS, a reception status of a plurality of items of DL data received from the source BS, the UE may trigger a PDCP status report procedure, may configure a PDCP status report, and may transmit the PDCP status report to the target BS.

When the second condition is satisfied, the UE may switch from the second PDCP layer entity architecture or function 1*i*-20 to the first PDCP layer entity architecture or function 1*i*-11 or 1*i*-12 with respect to each bearer or a bearer for which the DAPS handover method is indicated, may reset a variable for reordering, may stop and reset the reordering timer, may perform a deciphering procedure or header (or data) decompression by applying a security key or header decompression context for the source BS to a plurality of items of data (e.g., a plurality of items of data received from the source BS) stored for reordering in the buffer, and then may discard the security key or the header decompression context for the source BS. Then, the plurality of items of processed data may be provided to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS. In another method, when the second condition is satisfied, the UE may switch from the second PDCP layer entity architecture or function 1*i*-20 to a third PDCP layer entity architecture or function 1*i*-30 with respect to each bearer or a bearer for which the DAPS handover method is indicated, and may not stop or reset but may continuously use the variable for reordering and the reordering timer. However, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS. Then, the plurality of items of processed data may be provided to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS. The UE 1*h*-20 may release QoS mapping information of the SDAP layer entity or security key information of the PDCP layer entity for the source BS or header (or data) compression context information for the source BS or the RLC layer entity or the MAC layer entity for the source BS.

When the second condition is satisfied when the UE performs the DAPS handover method, the UE may release first bearers for the source BS with respect to the second SDAP layer entity architecture and function 1*j*-20 that have been applied to each bearer or a bearer for which the DAPS handover method is indicated, and may switch back to the first SDAP layer entity architecture or function 1*j*-10. Also, when the second condition is satisfied, the UE may switch from the second SDAP layer entity architecture and function 1*j*-20 to the first SDAP layer entity architecture or function 1*j*-10 with respect to each bearer or a bearer for which the DAPS handover method is indicated, and may maintain the second bearer or the second QoS flow and the bearer mapping information for the target BS, and before the UE releases the first bearer or the first QoS flow and the bearer mapping information for the source BS, the UE may complete data processing by applying the first QoS flow and the bearer mapping information to a plurality of items of data received from the source BS (e.g., all data received from the source BS), and then may release the first QoS flow and the bearer mapping information or the first bearer. Then, the plurality of items of processed data may be provided to the upper layer in ascending order. That is, when the second condition is satisfied, the UE may process data (e.g., a process of reading SDAP header information and updating mapping information or configuring a SDAP header, or routing or providing the processed data to an upper layer entity or a lower layer entity which is appropriate based on the first QoS flow and the bearer mapping information) by applying the first QoS flow and the bearer mapping information for the source BS to a plurality of items of data stored in the buffer (e.g., a plurality of items of data received from the source BS), and then may discard the first QoS flow and the bearer mapping information for the source BS. The SDAP layer entity may define information indicated by a 1-bit indicator of a new SDAP header or a 1-bit indicator of a new PDCP header or SDAP control data (e.g., DL End marker) or the PDCP layer entity, and may identify which data is most recently received from the source BS, based on the information. Therefore, the SDAP layer entity may perform data processing on the data by applying the first QoS flow and the bearer mapping information for the source BS, the data being most recently received from the source BS, and then may discard the first QoS flow and the bearer mapping information for the source BS. Then, the SDAP layer entity may continuously maintain the second QoS flow and the bearer mapping information, and may process UL data or DL data with respect to the target BS, based on the second QoS flow and the bearer mapping information.

When the BS in FIG. 1F described above transmits the handover command message to the UE (1*f*-20), the BS may define indicators related to the aforedescribed embodiments in the handover command message (e.g., an RRCReconfiguration message) and may indicate, to the UE, which handover procedure corresponding to which embodiment is to be triggered, and the UE may perform a handover procedure according to a handover method indicated in the handover command message, may perform a handover method (the DAPS handover method) according to Embodiment 2 of the disclosure, and thus, may perform handover to the target BS while minimizing a data interruption time. In another method, the BS may define the indicators for respective bearers, the indicators being related to the aforedescribed embodiments, in the handover command message, and may further particularly indicate which embodiment is to be applied to which bearer in handover. For example, Embodiment 2 may be indicated to be applied only to the AM bearer for which the RLC layer entity operating in the AM mode is active, or may be applied to the UM bearer for which the RLC layer entity operating in the UM mode is active. Also, it is assumed that embodiments of the disclosure are applied to a DRB. However, when required (e.g., in a case where the UE maintains a SRB for the source BS and fails to perform handover to the target BS, and thus the UE can report a handover failure message via the SRB for the source BS or can recover a link), the aforedescribed embodiments may be applied to the SRB.

In embodiments of the disclosure, when the UE performs data transmission and reception to and from the source BS via the protocol layer entities for the first bearer and performs data transmission and reception to and from the target BS via the protocol layer entities for the second bearer, the MAC layer entity for the first bearer and the MAC layer entity for the second bearer may each operate a discontinuous reception (DRX) period, thereby reducing battery consumption in the UE. That is, even after the UE receives the handover command message, the UE may continuously apply the DRX period of the MAC layer entity that was applied when transmitting and receiving data via the protocol layer entities for the first bearer, and may discontinue the DRX period according to the first condition or the second condition. Also, the UE may manage, in response to indication from the target BS, whether to separately apply the DRX period to the MAC layer entity for the second bearer.

Also, the meaning that the UE discontinues UL transmission to the source BS and discontinues DL data reception from the source BS via the protocol layer entities for the first bearer may mean that the UE re-establishes or resets or releases the protocol layer entities (the PHY layer entity or the MAC layer entity or the RLC layer entity or the PDCP layer entity) for the first bearer.

In embodiments of the disclosure, for convenience of descriptions, it is described that the UE configures the first bearer for the source BS or the second bearer for the target BS, and embodiments of the disclosure may be equally applied to a case in which the UE configures a plurality of first bearers for the source BS or a plurality of second bearers for the target BS. Also, embodiments of the disclosure may be equally applied to a case in which a plurality of bearers for a plurality of target BSs are configured. For example, the UE may configure second bearers while performing a handover procedure on a first target BS, and when handover fails, the UE configures second bearers while performing a handover procedure on a second target BS, such that the UE may autonomously detect and determine cells satisfying a certain condition (e.g., a signal whose strength being equal to or greater than a certain value) from among a plurality of target BSs, may determine one cell and then may perform a handover procedure.

Figure 1I:
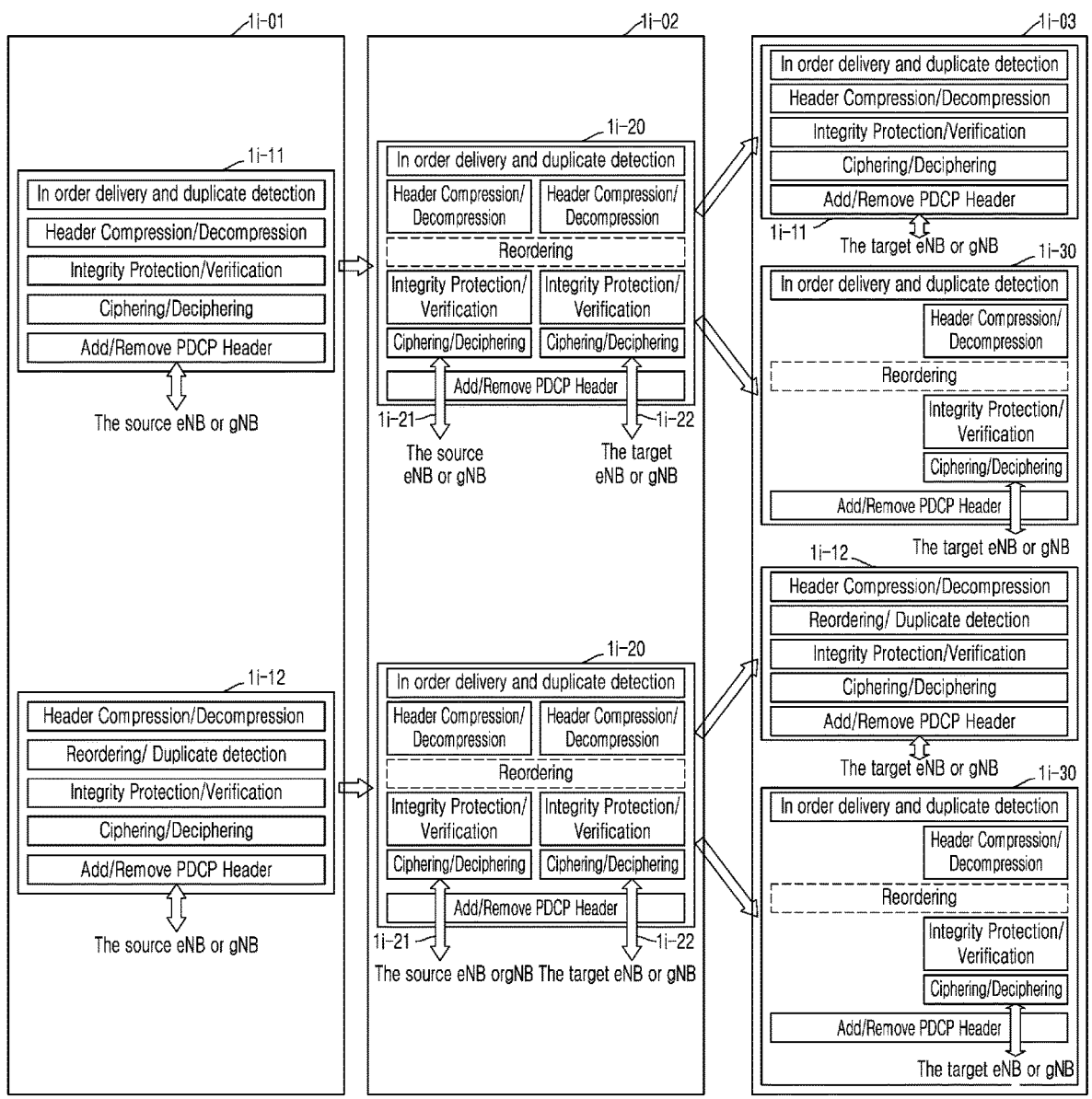
FIG. 1I is a diagram for describing architectures of an efficient Data Convergence Protocol (PDCP) layer entity to be applied to a Dual Active Protocol Stack (DAPS) handover method and Embodiment 2 of a handover method using the architectures, according to an embodiment of the disclosure.

FIG. 1I is a diagram for describing architectures of an efficient PDCP layer entity to be applied to a DAPS handover method and Embodiment 2 of a handover method using the architectures, according to an embodiment of the disclosure.

Referring to FIG. 1I, particular architecture and functions of the efficient PDCP layer entity to be applied to the DAPS handover method according to Embodiment 2 of the disclosure are provided. Here, when a DAPS handover procedure is performed, different PDCP layer entity architectures may be applied to respective bearers at different time points.

For example, before the UE receives a handover command message from a BS, the UE may process and transmit or receive data by applying the first PDCP layer entity architecture and functions 1*i*-11 or 1*i*-12 to each bearer (1*i*-01).

However, when the UE receives a handover command message from the BS, and the handover command message indicates the DAPS handover method proposed in the disclosure or indicates the DAPS handover method for particular bearers, the UE may process and transmit or receive data by applying the second PDCP layer entity architecture and functions 1*i*-20 to each bearer or bearers for which the DAPS handover method is indicated (1*i*-02). That is, when the UE receives the handover command message, and the handover command message indicates the DAPS handover method or indicates the DAPS handover method for particular bearers, the UE may switch from the first PDCP layer entity architecture or function 1*i*-11 or 1*i*-12, which is used for each bearer, to the second PDCP layer entity architecture or function 1*i*-20 with respect to each bearer or a bearer for which the DAPS handover method is indicated. In another method, when the first condition is satisfied, the UE may switch from the first PDCP layer entity architecture or function 1*i*-11 or 1*i*-12, which is used for each bearer, to the second PDCP layer entity architecture or function 1*i*-20 with respect to each bearer or a bearer for which the DAPS handover method is indicated (1*i*-02). Also, in a case where the UE receives the handover command message, and the handover command message indicates the DAPS handover method or indicates the DAPS handover method for particular bearers, or a case where a PDCP reordering timer value is newly set, when the UE switches from the first PDCP layer entity architecture or function 1*i*-11 or 1*i*-12 to the second PDCP layer entity architecture or function 1*i*-20 proposed in the disclosure with respect to each bearer or a bearer for which the DAPS handover method is indicated, the UE may update a variable for reordering to a PDCP SN or a COUNT value, which is predicted to be received next, and may stop and restart a reordering timer.

When the second condition is satisfied when the UE performs the DAPS handover method proposed in the disclosure, the UE may release, from first bearers for the source BS, the second PDCP layer entity architecture and function 1*i*-20 applied to each bearer or a bearer for which the DAPS handover method is indicated, and may switch back to the first PDCP layer entity architecture and function 1*i*-11 or 1*i*-12 and may apply the first PDCP layer entity architecture and function 1*i*-11 or 1*i*-12. When the second condition is satisfied, and the UE switches from the second PDCP layer entity architecture or function 1*i*-20 to the first PDCP layer entity architecture or function 1*i*-11 or 1*i*-12 with respect to each bearer or a bearer for which the DAPS handover method is indicated, the UE may reset the variable for reordering, and may stop and reset the reordering timer, and then, the UE may perform the deciphering procedure or header (or data) decompression by applying the security key or header decompression context for the source BS to the plurality of items of data (e.g., the plurality of items of data received from the source BS) stored for reordering in the buffer, and may discard the security key or the header decompression context for the source BS. The plurality of items of processed data may be provided to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS.

In another method, when the second condition is satisfied when the UE performs the DAPS handover method, the UE may release, from bearers for the source BS, the second PDCP layer entity architecture and function 1*i*-20 applied to each bearer or a bearer for which the DAPS handover method is indicated, and may switch to the third PDCP layer entity architecture or function 1i-30 and may apply the third PDCP layer entity architecture or function 1i-30. When the second condition is satisfied and thus the UE switches from the second PDCP layer entity architecture or function 1i-20 to the third PDCP layer entity architecture or function 1i-30 with respect to each bearer or a bearer for which the DAPS handover method is indicated, the UE may not stop or reset but may continuously use the variable for reordering and the reordering timer. However, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS. Then, the plurality of items of processed data may be provided to the upper layer in ascending order. That is, when the second condition is satisfied, the UE may perform the deciphering procedure or header (or data) decompression by applying the security key or header decompression context for the source BS to the plurality of items of data (e.g., the plurality of items of data received from the source BS) stored for reordering in the buffer, and then may discard the security key or the header decompression context for the source BS.

Referring to FIG. 1I, when the UE performs handover by applying, to respective bearers, the first PDCP layer entity architecture and function 1i-11 or 1i-12, the second PDCP layer entity architecture and function 1i-20, or the third PDCP layer entity architecture and function 1i-30, which are different from each other, at different time points, data loss may not occur and a data interruption time may be minimized.

The first PDCP layer entity architecture 1i-11 or 1i-12 of FIG. 1I may have a 1-1 PDCP layer entity architecture or a 1-2 PDCP layer entity architecture or a 1-3 PDCP layer entity architecture or a 1-4 PDCP layer entity architecture, and may have characteristics below.

- 1> (When it is the 1-1 PDCP layer entity architecture,) for example, when the UE applies the first PDCP layer entity architecture and function 1i-11 to a PDCP layer entity (e.g., E-UTRA PDCP layer entity or LTE PDCP layer entity) connected to an AM RLC layer entity (e.g., E-UTRA AM RLC layer entity), the UE may have characteristics below.
  - 2> The receiving PDCP layer entity may first perform detection of out-of-window data or duplicate data on a plurality of items of received data. (Retransmission may occur in RLC AM, and sizes of LTE RLC SN and PDCP SN may be different, such that the duplicate data or the out-of-window data may be received. In the above, window indicates a range of PDCP SNs or COUNT values, in which valid data is received.)
    - 3> Before the UE discards the out-of-window data or the duplicate data, the UE performs a deciphering procedure and a header decompression procedure and then performs a discard operation. (Because the data may include useful information (e.g., initialization and refresh (IR) packet or header compression information) for the header decompression procedure, the UE may check and then discard the data.)
  - 2> The UE may immediately decipher a plurality of items of data without ordering, the data being received without being discarded, and may perform a header decompression procedure. This is because the E-UTRA AM RLC layer entity performs ordering on the plurality of items of data and provides the plurality of items of data to the PDCP layer entity.
  - 2> Then, the plurality of items of data are provided to an upper layer in ascending order of COUNT values.
- 1> (When it is the 1-2 PDCP layer entity architecture,) for example, when the UE applies the first PDCP layer entity architecture and function 1i-11 to the PDCP layer entity (e.g., the E-UTRA PDCP layer entity or the LTE PDCP layer entity) connected to an UM RLC layer entity (e.g., E-UTRA UM RLC layer entity), the UE may have characteristics below.
  - 2> A procedure of detecting out-of-window data or duplicate data may not be performed. This is because the UM E-UTRA RLC layer entity does not perform a retransmission procedure.
  - 2> Then, the UE may immediately perform a deciphering procedure and then a header decompression procedure on the plurality of items of received data.
  - 2> Then, the UE may perform a reordering procedure and then may provide the plurality of items of data (e.g., in ascending order) to its upper layer.
- 1> (When it is the 1-3 PDCP layer entity architecture,) for example, when the UE applies the first PDCP layer entity architecture and function 1i-11 to the PDCP layer entity (e.g., the E-UTRA PDCP layer entity or the LTE PDCP layer entity) configured for a split bearer or a packet duplication bearer or a LTE WLAN Aggregation (LWA) bearer, the UE may always apply a reordering procedure and a reordering timer and may have characteristics below.
  - 2> The UE may be configured to first perform detection of out-of-window data or duplicate data on a plurality of items of received data. (Retransmission may occur in RLC AM or data may be received at different time points from different RLC layer entities, and sizes of LTE RLC SN and PDCP SN may be different, such that the out-of-window data or the duplicate data may be received.)
    - 3> The UE may perform a deciphering procedure. However, the UE may not perform a header decompression procedure. (It is because the E-UTRA PDCP layer cannot configure a header compression protocol for the split bearer or the LWA bearer.)
    - 3> When an integrity protection or verification procedure has been performed, if the integrity verification procedure fails, the received data may be discarded. If the integrity verification procedure fails, data may be discarded and the failure may be reported to an upper layer entity.
    - 3> The out-of-window data or the duplicate data is discarded.
  - 2> When the data is not discarded, the UE may immediately perform a deciphering procedure without reordering on a plurality of items of received data. Then, when the integrity protection or verification procedure is configured, integrity verification may be performed. When the integrity protection or verification procedure is performed, data may be discarded after the integrity protection or verification procedure is performed. When the integrity verification procedure fails, the data may be discarded and the failure may be reported to the upper layer entity.
  - 2> Afterward, reordering may be performed on a plurality of items of received data, and when PDCP SNs or COUNT values are sequentially aligned in ascending order without a gap therebetween, a header compression procedure (when the header compression procedure or a header decompression procedure is configured) may be performed on the data and the data may be provided to the upper layer in ascending order.

2> If a reordering timer is running,
   3> when data is provided to the upper layer entity, the data corresponding to COUNT value having the same value as a value obtained by subtracting 1 from a value where a variable for reordering maintains, or when the plurality of items of data are all provided to the upper layer entity without a gap between PDCP SNs (COUNT values),
      4> the UE stops and resets the reordering timer.

2> If the reordering timer is not running,
   3> when a buffer stores data that is not provided to the upper layer entity, or when there is a gap between PDCP SNs (COUNT values),
      4> the UE starts the reordering timer.
      4> Then, the UE updates the variable for reordering to a PDCP SN or a COUNT value which is predicted to be received next time.

2> If the reordering timer expires,
   3> when a header decompression procedure is configured for values of a plurality of items of stored data, the values being smaller than the variable for reordering, in ascending order of PDCP SNs or COUNT values, the header decompression procedure is performed and the data is provided to the upper layer entity.
   3> When a header decompression procedure is configured for values of a plurality of items of stored data, the values being equal to or greater than the variable for reordering, in ascending order of PDCP SNs or COUNT values, the header decompression procedure is performed on the data and the data is provided to the upper layer entity.
   3> Then, the UE updates a variable value of data, which is most recently provided to the upper layer, to a PDCP SN or a COUNT value of the data most recently provided to the upper layer.
   3> When a buffer stores data that is not provided to the upper layer entity, or when there is a gap between PDCP SNs (COUNT values),
      4> the reordering timer starts.
      4> Then, the UE updates the variable for reordering to a PDCP SN or a COUNT value which is predicted to be received next time.

1> (When it is the 1-4 PDCP layer entity architecture,) for example, when the UE applies the first PDCP layer entity architecture and function 1$i$-12 to a NR PDCP layer entity, the UE may always apply a reordering procedure and a reordering timer, and may have characteristics below.

2> The UE may first perform a deciphering procedure on a plurality of items of received data.

2> When an integrity protection or verification procedure is configured, the integrity protection or verification procedure may be performed on the received data, and when the integrity verification procedure fails, the data may be discarded and the failure may be reported to an upper layer entity.

2> The UE performs detection of out-of-window data or duplicate data on the received data. (The deciphering procedure may be performed and then the detection of out-of-window data or duplicate data may be performed. The UE may perform the deciphering procedure only when the integrity protection or verification procedure is configured, and then may perform the detection of out-of-window data or duplicate data, or when the integrity protection or verification procedure is not configured, the UE may perform the deciphering procedure only on a plurality of items of data on which the detection of out-of-window data or duplicate data is performed and that are not discarded.)
   3> The UE discards the out-of-window data or the duplicate data.

2> When the data is not discarded, the UE may perform reordering on a plurality of items of received data, and when PDCP SNs or COUNT values are sequentially aligned in ascending order without a gap therebetween, a header compression procedure may be performed (when the header compression procedure or a header decompression procedure is configured) and the data may be provided to the upper layer in ascending order.

2> Then, the data is provided to the upper layer, in ascending order of COUNT values.

2> If a reordering timer is running,
   3> when data is provided to the upper layer entity, the data corresponding to COUNT value having the same value as a value obtained by subtracting 1 from a value where a variable for reordering maintains or when the plurality of items of data are all provided to the upper layer entity without a gap between PDCP SNs (COUNT values) or when a value of a variable storing a PDCP SN or a COUNT value of data to be provided to the upper layer is equal to or greater than a value of a variable for reordering,
      4> the UE stops and resets the reordering timer.

2> If the reordering timer is not running,
   3> when a buffer stores data that is not provided to the upper layer entity or when there is a gap between PDCP SNs (COUNT values) or when a value of a variable storing a COUNT value of first data that is not provided to the upper layer is smaller than a value of a variable for reordering,
      4> the UE updates the variable for reordering to a PDCP SN or a COUNT value which is predicted to be received next time.
      4> The reordering timer starts.

2> If the reordering timer expires,
   3> when a header decompression procedure is configured for values of a plurality of items of stored data, the values being smaller than the variable for reordering, in ascending order of PDCP SNs or COUNT values, the header decompression procedure is performed on the data and the data is provided to the upper layer entity.
   3> When a header decompression procedure is configured for values of a plurality of items of stored data, the values being equal to or greater than the variable for reordering, in ascending order of PDCP SNs or COUNT values, the header decompression procedure is performed on the data and the data is provided to the upper layer entity.
   3> Then, the UE updates a variable value of first data, which is not provided to the upper layer, to a PDCP SN or a COUNT value of the first data that is not provided to the upper layer.

3> When a buffer stores data that is not provided to the upper layer or when there is a gap between PDCP SNs (COUNT values) or when a value of a variable storing the COUNT value of the first data that is not provided to the upper layer is smaller than the value of the variable for reordering, 4> the UE updates the variable for reordering to a PDCP SN or a COUNT value which is predicted to be received next time.

4> The reordering timer starts.

The second PDCP layer entity architecture 1$i$-20 of FIG. 1I may have a 2-1 PDCP layer entity architecture or a 2-2 PDCP layer entity architecture, which are proposed in the disclosure, and may have characteristics below.

The disclosure provides the second PDCP layer entity architecture 1$i$-20 which is efficient in handover. The second PDCP layer entity architecture may be applied to Embodiment 2 of the efficient handover method for minimizing a data interruption time, which is proposed in the disclosure.

In the second PDCP layer entity architecture, the UE may perform data transmission or reception from or to a source BS 1$i$-21 via protocol layer entities (e.g., a SDAP layer entity or a PDCP layer entity or a RLC layer entity or a MAC layer entity) for a first bearer, and may perform data transmission or reception from or to a target BS 1$i$-22 via protocol layer entities (e.g., a SDAP layer entity or a PDCP layer entity or a RLC layer entity or a MAC layer entity) for a second bearer.

The PDCP layer entity for the first bearer and the PDCP layer entity for the second bearer may each be configured in the UE but may logically operate as one PDCP layer entity as shown in 1$i$-20. In detail, by distinguishing between functions of a PDCP layer entity, one PDCP layer entity may be implemented as functions (e.g., an SN allocation function or a reordering function or an in-sequence delivery function or a duplicate detection function) of an upper PDCP layer entity and functions (e.g., a deciphering or ciphering function, a header (or data) compression or decompression function, an integrity protection or verification function, or a duplicate detection function) of two lower PDCP layer entitys respectively for the source BS and the target BS. Also, as proposed above, when the DAPS handover method is performed, the UE may be configured to transmit UL data transmission to the source BS, to switch to the target BS when the first condition is satisfied, and to continuously receive DL data from the source BS and the target BS. Therefore, only one header (or data) compression protocol context for the source BS or the target BS may be maintained and applied to a UL, and two contexts for the source BS or the target BS may be maintained and applied to a DL.

The 2-1 PDCP layer entity architecture (e.g., an E-UTRA PDCP layer entity for the DAPS handover method), based on the second PDCP layer entity architecture, may have characteristics below.

A function of an upper transmitting PDCP layer entity may serve to allocate PDCP SNs to a plurality of items of data received from an upper layer entity. Functions of two lower transmitting PDCP layer entities 1$i$-21 and 1$i$-22 respectively for the source BS and the target BS may serve to apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. When integrity protection is configured, the function of the lower transmitting PDCP layer entities 1$i$-21 and 1$i$-22 may serve to apply a ciphering procedure by applying an integrity protection procedure to a PDCP header and data (PDCP SDU), may provide the data to be transmitted to the source BS to a transmitting RLC layer entity for the first bearer, and may provide the data to be transmitted to the target BS to a transmitting RLC layer entity for the second bearer, thereby performing transmission. In order to accelerate a data processing speed, the functions of the two lower transmitting PDCP layer entities 1$i$-21 and 1$i$-22 may serve to perform parallel processing of header compression or integrity protection or a ciphering procedure, and the functions of the two lower transmitting PDCP layer entities may serve to perform the integrity protection or the ciphering procedure by using different security keys. Also, compression or integrity protection or a ciphering procedure on a plurality of items of different data may be performed by applying different compression contexts or different security keys or different security algorithms in a logically-one transmitting PDCP layer entity.

A function of a receiving PDCP layer entity which are the functions of the lower receiving PDCP layer entities 1$i$-21 and 1$i$-22 for the source BS or the target BS may each independently perform an out-of-window data detection or duplicate detection procedure on a plurality of items of data received from each of lower layer entities (e.g., a plurality of items of data received from two RLC layer entities respectively for the source BS and the target BS), based on PDCP SNs or COUNT values. In another method, for convenience of implementation, the out-of-window data detection or duplicate detection procedure may be performed on all received data, based on PDCP SNs or COUNT values, without distinguishing between the RLC layer entities. In another method, for more accurate duplicate detection, the out-of-window data detection may be performed on all received data, based on PDCP SNs or COUNT values, without distinguishing between the RLC layer entities, and the duplicate detection procedure may be independently performed on a plurality of items of data received from each of the RLC layer entities. In another method, when a plurality of items of data received from different BSs are overlapped each other, in order to prevent data loss for a header compression protocol, the out-of-window data detection may be performed on all received data, based on PDCP SNs or COUNT values, without distinguishing between the RLC layer entities, and the duplicate detection procedure may be performed on all data after a deciphering procedure or an integrity protection procedure or a header (or data) decompression procedure is received with respect to a plurality of items of data received from each of the RLC layer entities.

Sub-functions of the receiving PDCP layer entity may serve to immediately apply a deciphering procedure to a plurality of items of received data, by using separate header (or data) compression context or security key configured with each of the source BS and the target BS, and when integrity protection is configured, an integrity verification procedure may be applied to the PDCP header and the data (PDCP SDU).

In the 2-1 PDCP layer entity architecture, a header (or data) decompression procedure may be immediately performed, without reordering, on a plurality of items of data received from RLC layer entities for the source BS corresponding to the first bearer, and a header (or data) decompression procedure may be immediately performed, without reordering, on a plurality of items of data received from RLC layer entities for the target BS corresponding to the second bearer. Also, in order to distinguish between the data received from the RLC layer entities for the source BS corresponding to the first bearer and the data received from the RLC layer entities for the target BS corresponding to the second bearer, the 2-1 PDCP layer entity may define an indicator for each data, such that the UE may identify whether the data is received from the source BS or the target BS. In another method, the 2-1 PDCP layer entity may define a 1-bit indicator in a PDCP header or a SDAP header or a RLC header, such that the UE may identify whether the data is received from the source BS or the target BS. Also, the 2-1 PDCP layer entity may perform the duplicate detection procedure (a procedure in which only one data (including pre-received data or data provided to the upper layer) is allocated for each PDCP SN or each COUNT value and the others are all discarded), based on a PDCP SN or a COUNT value, on all of the plurality of items of data received from RLC layer entities for the source BS corresponding to the first bearer and the plurality of items of data received from RLC layer entities for the target BS corresponding to the second bearer, wherein the header (or data) compression procedure has been completed with respect to the plurality of items of data. Then, the 2-1 PDCP layer entity may perform a reordering procedure on all of the plurality of items of data received from RLC layer entities for the source BS corresponding to the first bearer and the plurality of items of data received from RLC layer entities for the target BS corresponding to the second bearer, in ascending order based on PDCP SNs or COUNT values, and may sequentially provide the plurality of items of data to the upper layer entity. Because one PDCP layer entity can receive data in no order from different BSs, i.e., from the first bearer or the second bearer, the PDCP layer entity may have to always perform the reordering procedure.

In order to accelerate a data processing speed, the functions of the two lower receiving PDCP layer entities may perform parallel processing of header compression or integrity protection or a ciphering procedure, based on each PDCP SN or each COUNT value. Also, the integrity protection or the ciphering procedure or the header decompression procedure may be performed by using different header (or data) compression contexts or different security keys. The integrity protection or the ciphering procedure or the decompression procedure may be performed on a plurality of items of different data by applying different header (or data) compression contexts or different security keys or different security algorithms in logically-one transmitting PDCP layer entity. Also, the functions of the lower receiving PDCP layer entity may perform out-of-sequence deciphering or integrity verification procedure on each of a plurality of items of data received without relation to order of PDCP SNs or COUNT values.

When one PDCP layer entity distinguishes layer entities for the first bearer from layer entities for the second bearer, the PDCP layer entity may distinguish the layer entities (or a first RLC layer) for the first bearer from the layer entities (or a second RLC layer entity) for the second bearer, in consideration that the layer entity for the first bearer and the layer entity for the second bearer are connected to different MAC layer entities or have different logical channel identifiers or are different RLC layer entities connected to different MAC layer entities or use different ciphering keys, and then, may perform a ciphering procedure or a deciphering procedure on UL data and DL data by using different security keys and may compress or decompress the UL data and the DL data by using different compression protocol contexts.

The 2-2 PDCP layer entity architecture (e.g., an NR PDCP layer entity for the DAPS handover method), based on the second PDCP layer entity architecture, may have characteristics below.

A function of the transmitting PDCP layer entity may serve to allocate PDCP SNs to a plurality of items of data received from its upper layer entity. Functions of the two lower transmitting PDCP layer entities 1$i$-21 and 1$i$-22 respectively for the source BS and the target BS may serve to apply, to data to be transmitted to the source BS, header (or data) compression context or security key configured with the source BS, by using a separate security key configured with each of the source BS and the target BS, and apply, to data to be transmitted to the target BS, header (or data) compression context or security key configured with the target BS, and may apply a header (or data) compression procedure when the header (or data) compression procedure is configured. When integrity protection is configured, the function of the lower transmitting PDCP layer entities 1$i$-21 and 1$i$-22 may serve to apply a ciphering procedure by applying an integrity protection procedure to a PDCP header and data (PDCP SDU), may provide the data to be transmitted to the source BS to a transmitting RLC layer entity for the first bearer, and may provide the data to be transmitted to the target BS to a transmitting RLC layer entity for the second bearer, thereby performing data transmission. In order to accelerate a data processing speed, the functions of the two lower transmitting PDCP layer entities 1$i$-21 and 1$i$-22 may serve to perform parallel processing of header compression or integrity protection or a ciphering procedure, and the functions of the two lower transmitting PDCP layer entities may serve to perform the integrity protection or the ciphering procedure by using different security keys. Also, compression or integrity protection or a ciphering procedure on a plurality of items of different data may be performed by applying different compression contexts or different security keys or different security algorithms in a logically-one transmitting PDCP layer entity.

A function of the receiving PDCP layer entity which is the functions of the lower receiving PDCP layer entities 1$i$-21 and 1$i$-22 for the source BS or the target BS may each independently perform an out-of-window data detection or duplicate detection procedure on a plurality of items of data received from each of lower layer entities, in particular, a plurality of items of data received from two RLC layer entities respectively for the source BS and the target BS, based on PDCP SNs or COUNT values. In another method, for convenience of implementation, the receiving PDCP layer entity may perform the out-of-window data detection or duplicate detection procedure on all received data, based on PDCP SNs or COUNT values, without distinguishing between the RLC layer entities. In another method, for more accurate duplicate detection, the receiving PDCP layer entity may perform the out-of-window data detection on all received data, based on PDCP SNs or COUNT values, without distinguishing between the RLC layer entities, and may independently perform the duplicate detection procedure on a plurality of items of data received from each of the RLC layer entities. In another method, when a plurality of items of data received from different BSs are overlapped each other, in order to prevent data loss for a header compression protocol, the receiving PDCP layer entity may perform the out-of-window data detection on all received data, based on PDCP SNs or COUNT values, without distinguishing between the RLC layer entities, and may perform the duplicate detection procedure on all data after a deciphering procedure or an integrity protection procedure or a header (or data) decompression procedure is received with respect to a plurality of items of data received from each of the RLC layer entities.

The sub-functions of the receiving PDCP layer entity may serve to immediately apply a deciphering procedure to a plurality of items of received data, by using separate header (or data) compression context or security key configured with each of the source BS and the target BS, and when integrity protection is configured, an integrity verification procedure may be applied to the PDCP header and the data (PDCP SDU).

In the 2-2 PDCP layer entity architecture, a reordering procedure may be performed on a plurality of items of data received from RLC layer entities for the source BS corresponding to the first bearer and a plurality of items of data received from RLC layer entities for the target BS corresponding to the second bearer, and then a header (or data) decompression procedure may be performed on the plurality of items of data received from each BS (the source BS or the target BS) in ascending order of PDCP SNs or COUNT values, by applying header (or data) compression context of each BS (the source BS or the target BS). Also, in order to distinguish between the data received from the RLC layer entities for the source BS corresponding to the first bearer and the data received from the RLC layer entities for the target BS corresponding to the second bearer, the 2-2 PDCP layer entity may define an indicator for each data, such that the UE may identify whether the data is received from the source BS or the target BS. In another method, the 2-2 PDCP layer entity may define a 1-bit indicator in a PDCP header or a SDAP header or a RLC header, such that the UE may identify whether the data is received from the source BS or the target BS. Also, the 2-2 PDCP layer entity may perform the duplicate detection procedure (a procedure in which only one data (including pre-received data or data provided to the upper layer) is allocated for each PDCP SN or each COUNT value and the others are all discarded), based on a PDCP SN or a COUNT value, on all of the plurality of items of data received from RLC layer entities for the source BS corresponding to the first bearer and the plurality of items of data received from RLC layer entities for the target BS corresponding to the second bearer, wherein the header (or data) compression procedure has been completed with respect to the plurality of items of data. Then, the 2-2 PDCP layer entity may sequentially provide, to the upper layer entity, all of the plurality of items of data received from RLC layer entities for the source BS corresponding to the first bearer and the plurality of items of data received from RLC layer entities for the target BS corresponding to the second bearer, in ascending order based on PDCP SNs or COUNT values. Because one PDCP layer entity can receive data in no order from different BSs, i.e., from the first bearer or the second bearer, the PDCP layer entity may have to always perform the reordering procedure.

In order to accelerate a data processing speed, the functions of the two lower receiving PDCP layer entities may perform parallel processing of header compression or integrity protection or a ciphering procedure, based on each PDCP SN or each COUNT value, and may perform the integrity protection or the ciphering procedure or the header decompression procedure by using different header (or data) compression contexts or different security keys. The integrity protection or the ciphering procedure or the decompression procedure may be performed on a plurality of items of different data by applying different header (or data) compression contexts or different security keys or different security algorithms in logically-one transmitting PDCP layer entity. Also, the functions of the lower receiving PDCP layer entity may perform out-of-sequence deciphering or integrity verification procedure on each of a plurality of items of data received without relation to order of PDCP SNs or COUNT values.

When one PDCP layer entity distinguishes layer entities for the first bearer from layer entities for the second bearer, the PDCP layer entity may distinguish the layer entities (or a first RLC layer entity) for the first bearer from the layer entities (or a second RLC layer entity) for the second bearer, in consideration that the layer entity for the first bearer and the layer entity for the second bearer are connected to different MAC layer entities or have different logical channel identifiers or are different RLC layer entities connected to different MAC layer entities or use different ciphering keys, and then, may perform a ciphering procedure or a deciphering procedure on UL data and DL data by using different security keys and may compress or decompress the UL data and the DL data by using different compression protocol contexts.

The disclosure provides the third PDCP layer entity architecture 1$i$-30 for performing a handover procedure. The third PDCP layer entity architecture may be applied to Embodiment 2 of the handover method for minimizing a data interruption time. Also, a PDCP layer entity function in the third PDCP layer entity architecture may be equal to the second PDCP layer entity architecture. However, the third PDCP layer entity architecture may correspond to architecture from which the first bearer for the source BS in the second PDCP layer entity architecture is released. In detail, the third PDCP layer entity architecture may have same functions as those of the second PDCP layer entity architecture but may have architecture from which the first bearer (e.g., the SDAP layer entity or the PDCP layer entity or the RLC layer entity or the MAC layer entity) for the source BS is released. Therefore, the third PDCP layer entity architecture may correspond to architecture from which QoS mapping information of the SDAP layer entity for the source BS or security key information of the PDCP layer entity for the source BS or header (or data) compression context information for the source BS or the RLC layer entity or the MAC layer entity for the source BS is released.

Figure 1J:
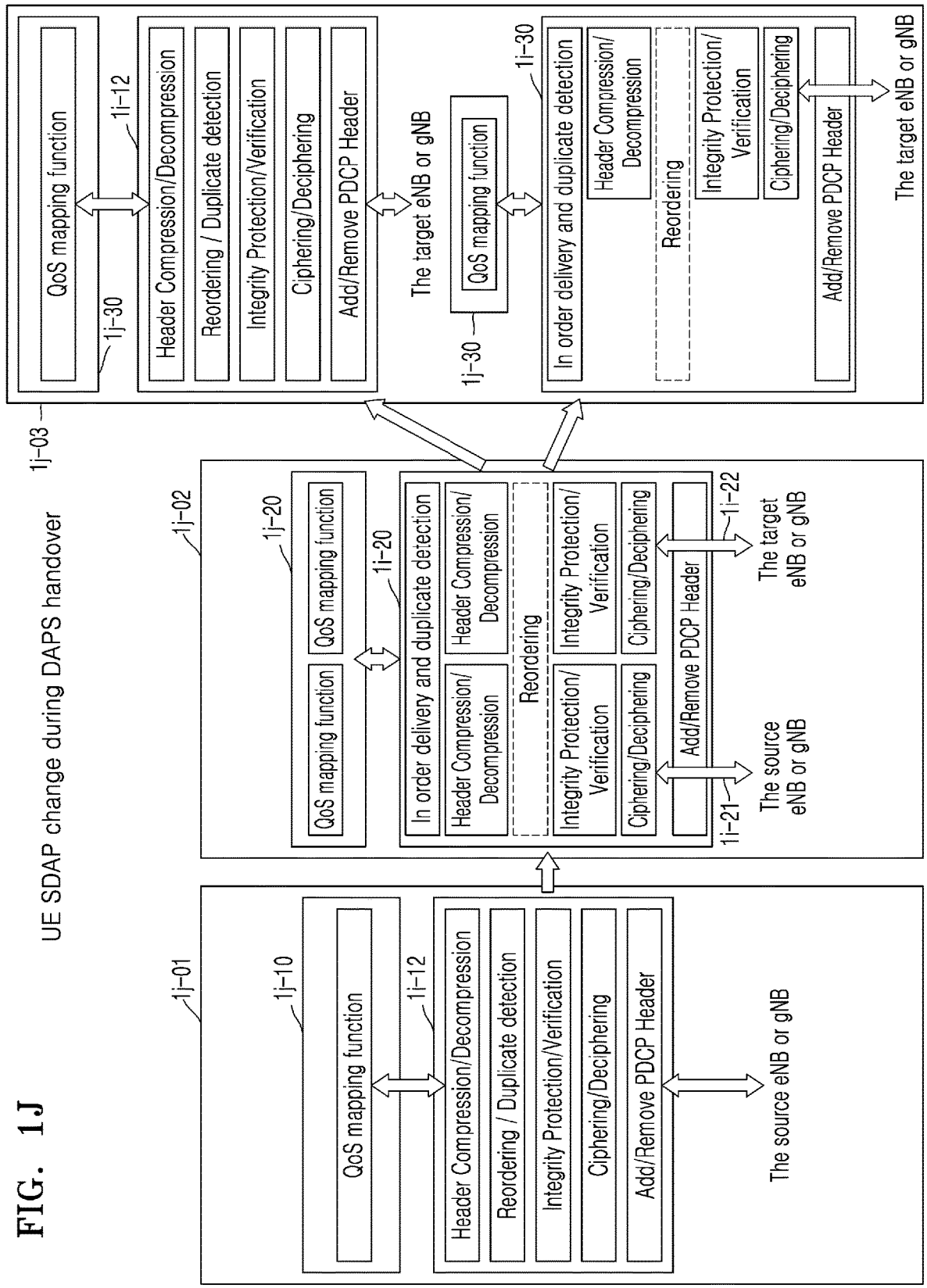
FIG. 1J is a diagram for describing architectures of an efficient Service Data Adaptation Protocol (SDAP) layer entity to be applied to a DAPS handover method and Embodiment 2 of a handover method using the architectures, according to an embodiment of the disclosure.

FIG. 1J is a diagram for describing architectures of an efficient SDAP layer entity to be applied to a DAPS handover method and Embodiment 2 of a handover method using the architectures, according to an embodiment of the disclosure.

Referring to FIG. 1J, particular architecture and functions of the efficient SDAP layer entity to be applied to the DAPS handover method that is Embodiment 2 of the handover method according to an embodiment of the disclosure are provided, and when a DAPS handover procedure is performed, different SDAP layer entity architectures may be applied to respective bearers at different time points.

For example, before the UE receives a handover command message from a BS, the UE may process and transmit or receive data by applying the first SDAP layer entity architecture and functions 1$j$-10 proposed in the disclosure to each bearer (1$j$-01). In the first SDAP layer entity architecture, the SDAP layer entity may perform data processing (e.g., a procedure of reading SDAP header information and updating mapping information or configuring a SDAP header, or routing or providing the processed data to an upper layer entity or a lower layer entity which is appropriate based on the first QoS flow and the bearer mapping information) on a plurality of items of UL data to be transmitted or a plurality of items of received DL data (e.g., a plurality of items of data received from the source BS) by maintaining and applying a first QoS flow and bearer mapping information for the source BS.

However, when the UE receives a handover command message from the BS, and the handover command message indicates the DAPS handover method proposed in the disclosure or indicates the DAPS handover method for particular bearers, the UE may process and transmit or receive data by applying the second PDCP layer entity architecture and function 1j-20 proposed in the disclosure to each bearer or bearers for which the DAPS handover method is indicated (1j-02). That is, when the UE receives the handover command message from the BS, and the handover command message indicates the DAPS handover method proposed in the disclosure or indicates the DAPS handover method for particular bearers, the UE may switch from the first SDAP layer entity architecture or function 1j-10, which is used for each bearer, to the second SDAP layer entity architecture or function 1j-20 proposed in the disclosure with respect to each bearer or a bearer for which the DAPS handover method is indicated. In another method, when the first condition proposed in the disclosure is satisfied, the UE may switch from the first SDAP layer entity architecture or function 1j-10, which is used for each bearer, to the second SDAP layer entity architecture or function 1j-20 proposed in the disclosure with respect to each bearer or a bearer for which the DAPS handover method is indicated (1j-02). Also, when the UE receives the handover command message from the BS, and the handover command message indicates the DAPS handover method proposed in the disclosure, indicates the DAPS handover method for particular bearers, or newly configures a QoS flow and bearer mapping information, the UE may switch from the first SDAP layer entity architecture or function 1j-10 to the second SDAP layer entity architecture or function 1j-20 proposed in the disclosure with respect to each bearer or a bearer for which the DAPS handover method is indicated. Also, the second SDAP layer entity architecture may be configured in such a manner that an existing first QoS flow and existing bearer mapping information for the source BS are maintained to process UL data to be transmitted to the source BS and DL data to be received from the source BS, and a second QoS flow and the bearer mapping information that are newly configured in the handover command message may be configured for the target BS, and the UE may use the configured information to process UL data to be transmitted to the target BS S and DL data to be received from the target BS. That is, in the second SDAP layer entity architecture proposed in the disclosure, the first QoS flow and the bearer mapping information for the source BS or the second QoS flow and the bearer mapping information for the target BS are maintained such that data for the source BS and data for the target BS may be separately processed. In the second SDAP layer entity architecture, a SDAP layer entity may identify whether data received from a lower layer is data received from the source BS or data received from the target BS, by a 1-bit indicator of a SDAP header or a 1-bit indicator of a PDCP header or information indicated by the PDCP layer entity. When the BS indicates the DAPS handover method with respect to each bearer to the UE by the handover command message, the BS may always indicate the DAPS handover method with respect to a default DRB, and thus, when data occurs in a new QoS flow that does not correspond to the QoS flow and the bearer mapping information when a DAPS handover procedure is performed, the BS may indicate the UE to always transmit UL data via the default bearer. When the DAPS handover method is not configured for the default bearer, UL data transmission with respect to the new QoS flow occurred in handover is unavailable such that a data interruption time may occur.

When the second condition is satisfied when the UE performs the DAPS handover method, the UE may release first bearers for the source BS with respect to the second SDAP layer entity architecture and function 1j-20 that have been applied to each bearer or a bearer for which the DAPS handover method is indicated, and may switch back to the first SDAP layer entity architecture or function 1j-10 and apply the first SDAP layer entity architecture or function 1j-10. Also, when the second condition is satisfied, the UE may switch from the second SDAP layer entity architecture and function 1j-20 to the first SDAP layer entity architecture or function 1j-10 proposed in the disclosure with respect to each bearer or a bearer for which the DAPS handover method is indicated and may maintain the second bearer or the second QoS flow and the bearer mapping information for the target BS, and before the UE releases the first bearer or the first QoS flow and the bearer mapping information for the source BS, the UE may complete data processing by applying the first QoS flow and the bearer mapping information to a plurality of items of data received from the source BS (e.g., all data received from the source BS), and then may release the first QoS flow and the bearer mapping information or the first bearer. Then, the plurality of items of processed data may be provided to the upper layer in ascending order. That is, when the second condition is satisfied, the UE may process data (e.g., a process of reading SDAP header information and updating mapping information or configuring a SDAP header, or routing or providing the processed data to an upper layer entity or a lower layer entity which is appropriate based on the first QoS flow and the bearer mapping information) by applying the first QoS flow and the bearer mapping information for the source BS to a plurality of items of data stored in the buffer (e.g., a plurality of items of data received from the source BS), and then may discard the first QoS flow and the bearer mapping information for the source BS. The SDAP layer entity may define and apply information indicated by a 1-bit indicator of a new SDAP header or a 1-bit indicator of a new PDCP header or SDAP control data (e.g., DL End marker) or the PDCP layer entity, and may identify which data is most recently received from the source BS, based on the information. Therefore, the SDAP layer entity may perform data processing on the data by applying the first QoS flow and the bearer mapping information for the source BS, the data being most recently received from the source BS, and then may discard the first QoS flow and the bearer mapping information for the source BS. Then, the SDAP layer entity may continuously maintain the second QoS flow and the bearer mapping information, and may process UL data or DL data with respect to the target BS, based on the second QoS flow and the bearer mapping information.

In FIG. 1F described above, when the UE receives the handover command message and applies bearer configuration information included in the handover command message, the UE may apply bearer configuration information using different schemes according to a type of handover indicated in the handover command message.

When the UE receives the handover command message,
if ReconfigWithSync information indicates a first handover method (e.g., Embodiment 1 of the disclosure or a normal handover method), when a default bearer is configured in SDAP layer entity configuration information configured in the handover command message, the UE may configure a default bearer for a source BS as a default bearer for a target BS which is indicated in the configuration information.

When a second QoS flow and bearer mapping information are configured in the SDAP layer entity configuration information configured in the handover command message, the UE may release a first QoS flow and bearer mapping information applied for the source BS and may apply the second QoS flow and the bearer mapping information. In another method, the UE may replace the first QoS flow and bearer mapping information applied for the source BS with the second QoS flow and the bearer mapping information.

When a data discard timer value is configured in PDCP layer entity configuration information configured in the handover command message, the UE may apply the discard timer value to a PDCP layer entity corresponding to a bearer identifier of the configuration information.

When drb-ContinueROHC indicator is configured as False in the PDCP layer entity configuration information configured in the handover command message, the UE may reset context of header compression or decompression protocol in a PDCP layer entity corresponding to a bearer identifier of the configuration information. When drb-ContinueROHC indicator is configured as True, the UE does not reset the context of header compression or decompression protocol in the PDCP layer entity corresponding to the bearer identifier of the configuration information.

When a reordering timer value is configured in the PDCP layer entity configuration information configured in the handover command message, the UE may immediately apply the reordering timer value to the PDCP layer entity corresponding to the bearer identifier of the configuration information.

When security key configuration information or security algorithm is configured in security configuration information configured in the handover command message, the UE may derive a new security key or new security configuration information by using the configuration information and release an existing security key or existing security configuration information, or may replace the existing security key or the existing security configuration information with the new security key or the new security configuration information.

When a new logical channel identifier is configured in RLC layer entity configuration information configured in the handover command message, the UE may release an existing logical channel identifier corresponding to a bearer identifier indicated in the RLC layer entity configuration information, or may replace the existing logical channel identifier with the new logical channel identifier.

When a RLC re-establishment procedure is configured in the RLC layer entity configuration information configured in the handover command message, the UE may perform the RLC re-establishment procedure on a RLC layer entity corresponding to a bearer identifier indicated in the RLC layer entity configuration information.

When the RLC layer entity configuration information configured in the handover command message is newly configured, the UE may perform the RLC re-establishment procedure on a RLC layer entity corresponding to a bearer identifier indicated in the RLC layer entity configuration information.

When a second priority with respect to a logical channel is newly configured in MAC layer entity configuration information configured in the handover command message, the UE may release a first priority corresponding to an identifier of the logical channel indicated in the configuration information, or may replace the first priority corresponding to the logical channel identifier with the newly configured second priority.

When a second prioritisedBitRate (PBR) with respect to a logical channel is newly configured in the MAC layer entity configuration information configured in the handover command message, the UE may release first prioritisedBitRate (PBR) corresponding to an identifier of the logical channel indicated in the configuration information, or may replace the first prioritisedBitRate (PBR) corresponding to the identifier of the logical channel with the newly configured second prioritisedBitRate (PBR). The prioritisedBitRate refers to a value that increases with respect to each logical channel at preset time intervals (e.g., at every TTI). When the UE receives a UL transport resource, the UE may perform a logical channel prioritization (LCP) procedure, and may transmit data with respect to the logical channel, in consideration of a priority and the prioritisedBitRate. In this regard, the higher the priority is, or the greater the value of the prioritisedBitRate is, more data may be transmitted.

When second bucketSizeDuration with respect to a logical channel is newly configured in the MAC layer entity configuration information configured in the handover command message, the UE may release first bucketSizeDuration corresponding to an identifier of the logical channel indicated in the configuration information or may perform configuration by replacing the first bucketSizeDuration corresponding to the identifier of the logical channel with the newly configured second bucketSizeDuration. In the descriptions above, bucket size duration indicates a maximum value a value of prioritisedBitRate can have when the prioritisedBitRate is accumulated.

When second available SCell information or available subcarrier spacing information or maximum PUSCH duration or logical channel group configuration information is configured in the MAC layer entity configuration information configured in the handover command message, the UE may release pre-configured first available SCell information or pre-configured available subcarrier spacing information or pre-configured maximum PUSCH duration or pre-configured logical channel group configuration information, or may perform configuration by replacing the pre-configured first available SCell information or the pre-configured available subcarrier spacing information or the pre-configured maximum PUSCH duration or the pre-configured logical channel group configuration information with the newly-configured second available SCell information or the newly-configured available subcarrier spacing information or the newly-configured maximum PUSCH duration or the newly-configured logical channel group configuration information.

When the UE receives the handover command message, when ReconfigWithSync information indicates the second handover method (e.g., Embodiment 2 or the DAPS handover method of the disclosure) or the DAPS handover method is indicated for each bearer identifier, when a default bearer is configured in SDAP layer entity configuration information configured in the handover command message, the UE may perform the DAPS handover method proposed in the disclosure, may maintain an existing default bearer for the source BS by applying the second SDAP layer entity architecture, and may configure default bearer information indicated in the configuration information as a default bearer for the target BS. In another method, when the first condition proposed in the disclosure is satisfied, the UE may switch from the existing default bearer for the source BS to the default bearer for the target BS which is indicated in the configuration information.

When a second QoS flow and bearer mapping information are configured in the SDAP layer entity configuration information configured by the handover command message, the UE may perform the DAPS handover method proposed in the disclosure, may maintain a first QoS flow and bearer mapping information for the source BS by applying the second SDAP layer entity architecture, and may apply the second QoS flow and the bearer mapping information to data for the target BS.

When a data discard timer value is configured in PDCP layer entity configuration information configured by the handover command message, the UE may perform the DAPS handover method proposed in the disclosure and may apply, by applying the second PDCP layer entity architecture, the discard timer value to a PDCP layer entity corresponding to a bearer identifier of the configuration information.

When drb-ContinueROHC indicator is configured as False in the PDCP layer entity configuration information indicated by the handover command message, the UE may perform the DAPS handover method proposed in the disclosure, and may, by applying the second PDCP layer entity architecture, changelessly use header compression or decompression protocol context for the source BS in a PDCP layer entity corresponding to a bearer identifier of the configuration information, reset header compression or decompression protocol context for the target BS, and start in an initial state (e.g., an IR state). When drb-ContinueROHC indicator is configured as True, the UE may perform the DAPS handover method proposed in the disclosure, and may, by applying the second PDCP layer entity architecture, changelessly use header compression or decompression protocol context for the source BS in a PDCP layer entity corresponding to a bearer identifier of the configuration information, and may equally apply header compression or decompression protocol context for the target BS as the header compression or decompression protocol context for the source BS. For example, the UE may copy and changelessly apply the header compression or decompression protocol context for the source BS to the header compression or decompression protocol context for the target BS. In another method, the UE may apply same header compression or decompression protocol context to the target BS or the source BS.

When a reordering timer value is configured in the PDCP layer entity configuration information configured by the handover command message, the UE may perform the DAPS handover method proposed in the disclosure, and may apply the reordering timer value to the PDCP layer entity corresponding to the bearer identifier of the configuration information, by applying the second PDCP layer entity architecture.

When security key configuration information or security algorithm is configured in security configuration information configured by the handover command message, or when an indicator indicating a new procedure is included in the PDCP layer entity configuration information, the UE may derive a new security key or new security configuration information by using the configuration information and may perform the DAPS handover method proposed in the disclosure and may maintain an existing security key or existing security configuration information for the source BS by applying the second PDCP layer entity architecture, and may configure a security key or security configuration information for the target BS as the new security key or the new security configuration information.

When a new logical channel identifier is configured in the RLC layer entity configuration information configured by the handover command message, the UE may perform the DAPS handover method proposed in the disclosure, may, by applying the second PDCP layer entity architecture, maintain an existing logical channel identifier for a RLC layer entity or a MAC layer entity for a first bearer for the source BS which corresponds to a bearer identifier indicated in the RLC layer entity configuration information, and may configure the new logical channel identifier, which is indicated in the configuration information, for a RLC layer entity or a MAC layer entity for the target BS corresponding to a second bearer.

When a RLC re-establishment procedure is configured in the RLC layer entity configuration information configured by the handover command message, the UE may perform the DAPS handover method proposed in the disclosure, and may, by applying the second PDCP layer entity architecture, perform the RLC re-establishment procedure on a RLC layer entity for a first bearer for the source BS which corresponds to a bearer identifier indicated in the RLC layer entity configuration information.

When the RLC layer entity configuration information configured in the handover command message is newlay configured, the UE may perform the DAPS handover method proposed in the disclosure, may, by applying the second PDCP layer entity architecture, maintain existing RLC configuration information for a RLC layer entity for a first bearer for the source BS which corresponds to a bearer identifier indicated in the RLC layer entity configuration information, and may configure the new RLC layer entity configuration information, which is indicated in the configuration information, for a RLC layer entity for the target BS corresponding to a second bearer.

When a second priority with respect to a logical channel is newly configured in MAC layer entity configuration information configured by the handover command message, the UE may perform the DAPS handover method proposed in the disclosure and may apply the second PDCP layer entity architecture, may maintain existing configuration information with respect to the MAC layer entity for the first bearer for the source BS which corresponds to a bearer identifier indicated above, may configure a new logical channel identifier, which is indicated in the configuration information, to the MAC layer entity for the target BS corresponding to the second bearer, and may configure a newly-configured second priority corresponding to the logical channel identifier indicated in the configuration information. In another method, when the first condition proposed in the disclosure is satisfied, the UE may apply the priority order to the MAC layer entity for the target BS corresponding to the second bearer according to each logical channel identifier.

When a second prioritisedBitRate (PBR) with respect to a logical channel is newly configured in the MAC layer entity configuration information configured by the handover command message, the UE may perform the DAPS handover method proposed in the disclosure, may apply the second PDCP layer entity architecture and maintain existing configuration information with respect to the MAC layer entity for the first bearer for the source BS which corresponds to a bearer identifier indicated above, may configure a new logical channel identifier with respect to the MAC layer entity for the target BS corresponding to the second bearer, the new logical channel identifier being indicated in the configuration information, and may configure a newly configured second prioritisedBitRate (PBR) corresponding to the new logical channel identifier indicated in the configuration information. In another method, the UE may start applying the second prioritisedBitRate to a logical channel identifier in the MAC layer entity for the target BS corresponding to the second bearer after the first condition proposed in the disclosure is satisfied (by doing so, when different handover methods are indicated for respective bearers, UL transport resources may be fairly distributed). The prioritisedBitRate refers to a value that increases with respect to each logical channel at preset time intervals (e.g., at every TTI) when the prioritisedBitRate is applied to each logical channel identifier. When the UE receives a UL transport resource, the UE may perform a LCP procedure, and may transmit data with respect to the logical channel, in consideration of a priority and the prioritisedBitRate. In this regard, the higher the priority is, or the greater the value of the prioritisedBitRate is, more data may be transmitted.

In a case where the DAPS handover method is applied in the above descriptions, when the UE has to transmit UL data via the first bearer for the source BS because the first condition proposed in the disclosure is not satisfied yet, the UE may select the MAC layer entity for the first bearer as a target for the LCP procedure with respect to only a bearer or logical channel identifiers for which the DAPS handover method (or a handover method by which data can be continuously transmitted to the source BS even after a handover command message is received) is indicated, and may perform the LCP procedure. When the UE receives a handover command message with respect to bearers or a logical channel identifier to which the DAPS handover method is not applied, the UE cannot transmit UL data to the source BS, and thus, should not select the bearers or the logical channel identifier as a target for the LCP procedure.

When second bucketSizeDuration with respect to a logical channel is newly configured in the MAC layer entity configuration information configured by the handover command message, the UE may perform the DAPS handover method proposed in the disclosure, may apply the second PDCP layer entity architecture and maintain existing configuration information with respect to the MAC layer entity for the first bearer for the source BS which corresponds to a bearer identifier indicated above, may configure a new logical channel identifier with respect to the MAC layer entity for the target BS corresponding to the second bearer, the new logical channel identifier being indicated in the configuration information, and may configure newly configured second bucketSizeDuration corresponding to the new logical channel identifier indicated in the configuration information. In another method, the UE may start applying the second bucketSizeDuration to a logical channel identifier in the MAC layer entity for the target BS corresponding to the second bearer after the first condition proposed in the disclosure is satisfied (by doing so, when different handover methods are indicated for respective bearers, UL transport resources may be fairly distributed). In the descriptions above, bucket size duration indicates a maximum value a value of prioritisedBitRate can have when the prioritisedBitRate is accumulated.

When second available SCell information or available subcarrier spacing information or maximum PUSCH duration or logical channel group configuration information is configured in the MAC layer entity configuration information configured by the handover command message, the UE may perform the DAPS handover method proposed in the disclosure, and may apply the second PDCP layer entity architecture and maintain existing configuration information with respect to the MAC layer entity for the first bearer for the source BS which corresponds to a bearer identifier indicated above, and may configure the second available SCell information or the available subcarrier spacing information or the maximum PUSCH duration or the logical channel group configuration information, which is indicated in the configuration information, with respect to the MAC layer entity for the target BS corresponding to the second bearer.

Provided is a method by which, when the UE performs Embodiment 2 (the DAPS handover method) of the efficient handover method according to an embodiment of the disclosure and fails to perform handover, the UE reconfigures a link to a source BS by rapidly falling back to the source BS by using features of the DAPS handover method proposed above. The DAPS handover method according to an embodiment of the disclosure may indicate that, even when the UE performs a handover procedure, the UE maintains a link to the source BS and thus performs data transmission or reception, and even when the UE fails to perform handover, the UE may fall back by using a previous radio link established with the source BS.

As described with reference to FIG. 1H, according to Embodiment 2 (the DAPS handover method) of the efficient handover method, even when the UE receives a handover command message from the source BS, as proposed in 1*h*-02, the UE may perform a handover procedure on the target BS while the UE maintains data transmission or reception to or from the source BS. Also, in the disclosure, the UE may fall back to the source BS when the UE fails to perform the handover procedure on the target BS.

If the UE fails to perform the handover procedure on the target BS, there has to be a method by which the UE can identify whether a radio link to the source BS is active. If the UE fails to perform the handover and performs fallback on the source BS even when a radio link to the source BS is not active, the UE fails to perform the fallback procedure on the source BS such that a long data interruption time increases and therefore significant data interruption occurs. Also, when a radio link to the source BS is active, a SRB configured between the UE and the source BS has to be maintained.

First, the disclosure proposes new timers applicable to the handover method, and proposes detailed operations of each of the timers. Also, the detailed operations of each timer may include different operations according to types of a handover method indicated by a handover command message from a BS. Also, provided is a method of releasing or maintaining a link to the source BS or configuration of a SRB according to the handover method.

In order to efficiently perform a handover procedure, the disclosure may introduce a first timer (e.g., T304) or a second timer (e.g., T310) or a third timer (e.g., T312) or a fourth timer (e.g., a timer for fallback), and may run and apply at least one of the first timer to the fourth timer to a handover procedure. According to the disclosure, the first timer (e.g., T304) or the second timer (e.g., T310) or the third timer (e.g., T312) or the fourth timer (e.g., the timer for fallback) may perform different operations below according to types of a handover method indicated by a handover command message. The first timer (e.g., T304) is a timer configured to determine whether handover has been successfully performed, the second timer (e.g., T310) is a timer configured to determine whether a radio link is active, and the third timer (e.g., T312) is an auxiliary timer configured to determine whether a radio link is active, to trigger a frequency measurement procedure, and to report a frequency measurement report. When the UE performs Embodiment 2 (the DAPS handover method) of the handover method according to an embodiment of the disclosure and then fails to perform handover, the UE performs a fallback procedure on the source BS and thus transmits a message indicating the failure of handover to the source BS. In this regard, the fourth timer (e.g., the timer for fallback) is a timer configured to determine whether the fallback procedure has been successfully performed or has failed.

Detailed operations of the first timer (e.g., T304) or the second timer (e.g., T310) or the third timer (e.g., T312) or the fourth timer (e.g., the timer for fallback) proposed in the disclosure so as to support the efficient handover method are proposed below according to the indicated types of the handover method.

1> When the UE receives an indicator indicating out-of-synchronization (out-of-sync indication) of a radio link signal from a lower layer entity (e.g., a MAC layer entity or a PHY layer entity) a preset number of times (e.g., the preset number of times may be set by a BS) and thus detects a problem of the PHY layer entity, the UE may start the second timer (e.g., T310) in a case where the first timer is not running. Then, the UE receives an indicator indicating in-synchronization (in-sync indication) of a radio link signal from the lower layer entity a preset number of times (e.g., the preset number of times may be set by the BS) or a handover procedure is triggered (is started) or an RRC connection re-establishment procedure is started, the UE stops the second timer. If the second timer expires, the UE triggers or starts the RRC connection re-establishment procedure. Alternatively, the UE transitions to an RRC inactive mode, and triggers or starts the RRC connection re-establishment procedure.

1> The UE starts the third timer when a frequency measurement procedure is triggered for a frequency measurement identifier configured for the third timer while the second timer is running. Then, when the UE receives an indicator indicating in-synchronization (in-sync indication) of a radio link signal from the lower layer entity a preset number of times (e.g., the preset number of times may be set by the BS) or a handover procedure is triggered (is started) or an RRC connection re-establishment procedure is started, the UE stops the third timer. If the third timer expires, the UE triggers or starts the RRC connection re-establishment procedure. Alternatively, the UE transitions to an RRC inactive mode, and triggers or starts the RRC connection re-establishment procedure.

1> If the UE receives a handover command message (an RRCReocnfiguartion message including mobility indication (MobilityControl info or ReconfigurationWithSync) or handover indication) from the BS and the handover command message indicates a first handover method (e.g., Embodiment 1 or a normall handover method), 2> according to the disclosure, when the UE receives the handover command message (the RRCReocnfiguartion message including mobility indication (MobilityControl info or ReconfigurationWithSync) or handover indication), the UE triggers a handover procedure and starts the first timer.

2> When the UE triggers the handover procedure, the UE releases a SRB (e.g., SRB1) configured for the source BS, and configures the SRB (e.g., SRB1) for the target BS, based on configuration information configured in the handover command message.

2> When the UE triggers the handover procedure, the UE may stop the second timer if the second timer is running. While the first timer is running, even when the condition (the indicator indicating out-of-synchronization of a radio link signal is received the preset number of times from the lower layer entity) for starting the second timer is satisfied, the UE does not start the second timer. That is, when the first timer is running, the UE does not use the second timer.

2> When the UE triggers the handover procedure, the UE may stop the third timer if the third timer is running. Then, only while the second timer is running, the UE may start the third timer when the condition (when the frequency measurement procedure is triggered for the frequency measurement identifier configured for the third timer) for starting the third timer is satisfied. That is, because the second timer is not used while the first timer is running, the third timer is not used either.

2> If the UE successfully performs the handover procedure or successfully completes a random access procedure with respect to the target BS, the UE stops the first timer.

2> If the first timer expires (e.g., if the handover procedure with respect to the target BS fails), the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message).

1> If the UE receives a handover command message (an RRCReocnfiguartion message including mobility indication (MobilityControl info or ReconfigurationWithSync) or handover indication) from the BS and the handover command message indicates a second handover method (e.g., Embodiment 2 or the DAPS handover method) (or this may be extensively applied to a case where a conditional handover method is also indicated), 2> according to the disclosure, when the UE receives the handover command message (the RRCReocnfiguartion message including mobility indication (MobilityControl info or ReconfigurationWithSync) or handover indication), the UE triggers a handover procedure and starts the first timer. If the conditional handover method is also indicated, the UE may start the first timer when the UE selects a cell from among a plurality of target cells and starts a handover procedure or performs a random access procedure.

2> In a case where the UE triggers the handover procedure, when the UE starts the DAPS handover method, the UE maintains or suspends a SRB (e.g., SRB1) configured for the source BS, and configures the SRB (e.g., SRB1) for the target BS, based on configuration information configured in the handover command message. In another method, in a case where the UE triggers the handover procedure, when the UE starts the DAPS handover method, the UE may maintain or suspend a SRB (e.g., SRB1) configured for the source BS, may reset window state variables by re-establishing a PDCP layer entity or a RLC layer entity for the SRB corresponding to the source BS, may stop a timer, may indicate a plurality of items of stored data (PDCP SDU or PDCP PDU) to be discarded (this may be performed when a fallback procedure proposed in the disclosure is triggered), and may configure the SRB (e.g., SRB1) for the target BS, based on configuration information configured in the handover command message. In another method, the UE may apply the second PDCP layer entity architecture proposed in the disclosure to the SRB, thereby configuring a first bearer for the source BS and configuring a second bearer for the target BS. In another method, when the UE applies the second PDCP layer entity architecture to the SRB, the UE may reset window state variables by re-establishing a PDCP layer entity or a RLC layer entity for the first bearer, may stop a timer, and may indicate a plurality of items of stored data (PDCP SDU or PDCP PDU) to be discarded (this may be performed when a fallback procedure proposed in the disclosure is triggered).

2> In a case where the UE triggers the handover procedure, when the UE starts the DAPS handover method, the UE may not stop the second timer for the source BS even when the second timer is running. When the first timer is running (or even when the first timer is not running), if the condition (the indicator indicating out-of-synchronization of a radio link signal is received the preset number of times from the lower layer) for starting the second timer is satisfied, the UE starts the second timer. The second timer may be operated with respect to a radio link between the UE and the source BS. In another method, two second timers may be operated, such that one second timer may be operated with respect to a radio link between the UE and the source BS, and the other second timer may be operated with respect to a radio link between the UE and the target BS. That is, even when the first timer is running, the UE uses the second timer with respect to a radio link to the source BS or the target BS. However, even when the second timer expires, if the first timer does not expire but is running, the UE does not trigger an RRC connection re-establishment procedure. That is, in detail, even when the second timer for the source BS expires or a radio link failure (RLF) occurs, if the first timer does not expire but is running or the random access procedure is being performed on the target BS or the handover procedure is being performed on the target BS, the UE may not trigger the RRC connection re-establishment procedure may release the radio link to the source BS, may not release RRC configuration information (e.g., bearer configuration information, or the like) configured by the source BS and may reuse the RRC configuration information when the RRC connection re-establishment procedure is triggered at a later time. Also, when the first timer does not expire but is running even when the second timer expires, the UE may not trigger the RRC connection re-establishment procedure and the source BS may report source link failure to the target BS, or the UE may release a link to the source BS (e.g., the UE may release first bearers for the source BS) or may suspend the first bearers for the source BS. However, when the second timer expires, if the first timer is expired or is stopped or is not running because the first timer is not started, the UE may trigger the RRC connection re-establishment procedure. The reason why the second timer is operated even when the handover procedure is performed is to allow the UE to perform a fallback procedure when a radio link to the source BS is active when handover failure occurs while the radio link to the source BS is monitored. When the second timer for the target BS expires or a radio link to the target BS fails, if the first timer is expired or is stopped or is not running because the first timer is not started, or the random access procedure with respect to the target BS has been successfully performed, the RRC connection re-establishment procedure may be triggered.

2> In a case where the UE triggers the handover procedure, when the UE triggers the DAPS handover method, the UE may not stop the third timer for the source BS even when the third timer is running. Then, only while the second timer is running, the UE may start the third timer when the condition (when the frequency measurement procedure is triggered for the frequency measurement identifier for which the third timer is configured) for starting the third timer is satisfied. That is, because the UE uses the second timer even when the first timer is running, the UE may also use the third timer. The third timer may be operated with respect to a radio link between the UE and the source BS. In another method, two third timers may be operated, such that one third timer may be operated with respect to a radio link between the UE and the source BS, and the other third timer may be operated with respect to a radio link between the UE and the target BS. That is, even when the first timer is running, the third timer may be used with respect to a radio link to the source BS or the target BS. However, even when the third timer expires, if the first timer does not expire but is running, the UE may not trigger an RRC connection re-establishment procedure. Also, when the first timer does not expire but is running even when the third timer expires, the UE may not trigger the RRC connection re-establishment procedure and the source BS may report source link failure to the target BS, or the UE may release a link to the source BS (e.g., the UE may release first bearers for the source BS) or may suspend the first bearers for the source BS. However, when the third timer expires, if the first timer is expired or is stopped or is not running because the first timer is not started, the UE may trigger the RRC connection re-establishment procedure. The reason why the third timer is operated even when the handover procedure is performed is to allow the UE to perform a fallback procedure and to report a frequency measurement result in the fallback procedure when a radio link to the source BS is active when handover failure occurs while the radio link to the source BS is monitored.

2> When the UE successfully completes the handover procedure with respect to the target BS, the UE stops the first timer.

2> When the first timer expires (e.g., when the handover procedure to the target BS fails) or when a maximum re-transmission number of times for a RLC layer entity with respect to the target BS exceeds or when the UE receives the handover command message but configuration information of the handover command message exceeds capability of the UE or when an error occurs in application of the configuration information such that the handover fails or when a problem occurs in a random access to the target BS and the UE continuously attempts a random access procedure but the first timer expires and thus the UE fails to perform the handover procedure or when the UE runs the second timer or the third timer for the target BS but the second timer or the third timer expires before the handover procedure is completed or when T304 timer stops or expires and the UE determines the handover procedure to have failed, 3> if the second timer or the third timer for a radio link between the UE and the source BS has not expired (or if the second timer or the third timer for a radio link between the UE and the source BS is not started or is running) or if a radio link between the UE and the source BS is active, 4> the UE may determine that the radio link between the UE and the source BS is active, and may perform a fallback procedure proposed in the disclosure.

4> When the UE starts the fallback procedure, if a SRB (e.g., SRB1 or a MAC layer entity, a RLC layer entity, or a PDCP layer entity for SRB1) configured for the source BS has been suspended, the UE may resume or newly configure the SRB and may perform the fallback procedure on the SRB (e.g., SRB1). In another method, when the second PDCP layer entity architecture proposed in the disclosure is applied to the SRB, the UE may perform the fallback procedure via the first bearer for the source BS and may release the second bearer for the target BS. For example, the UE may switch UL data transmission to the first bearer for the source BS, may indicate a RLC layer entity or a MAC layer entity for the first bearer of existence of data to be transmitted, and may transmit a handover failure report message for the fallback procedure via the first bearer.

4> In the above, the fallback procedure refers to a procedure in which the UE configures a message reporting handover failure and reports the handover failure to the source BS via the SRB (e.g., SRB1) configured for the source BS. When the UE transmits the message reporting handover failure to the source BS, the UE may also report a result of frequency measured by the UE and thus may support a fast recovery of a link to the source BS. In another method, the UE may define and transmit MAC control information (e.g., the UE may indicate existence of data to be transmitted or may define and indicate a special value in new MAC control information or a buffer status report, thereby indicating the handover failure) or RLC control information or PDCP control information, and thus, may indicate the handover failure to the source BS. In another method, the UE may transmit an RRC connection re-establishment request message via the SRB (e.g., SRB0 or SRB1) for the source BS. In another method, in the above, the fallback procedure may refer to a procedure in which, when the handover fails, the UE releases the second bearer for the target BS in the second PDCP layer entity architecture of each bearer or a bearer configured with the DAPS handover method, or switches to the first PDCP layer entity architecture, and then resumes data transmission or reception via the first bearer for the source BS, and the UE may indicate the MAC layer entity for the first bearer of existence of data to be transmitted, may request scheduling or report data to be transmitted (e.g., the buffer status report) to the source BS or may transmit a new MAC CE or RLC control data or PDCP control data to the source BS, thereby indicating, to the source BS, that the UE is to fall back to the source BS and resume data transmission. Then, the UE may newly configure or resume a SRB for the source BS. Also, when handover fails, the fallback procedure may be performed for each bearer. Because bearers that are not configured with the DAPS handover method do not have the second PDCP layer entity architecture, the UE may release, from the MAC layer entity for the target BS, a PDCP layer entity or a RLC layer entity or bearer configuration information or logical channel identifier information, which is previously configured and then is reconfigured in configuration information of a handover command message, or may switch to and configure the MAC layer entity for the source BS, and may resume data transmission or reception to or from the source BS via each bearer. This is because, when the UE receives the handover command message, the UE may apply the bearer configuration information configured in the handover command message to the MAC layer entity for the target BS corresponding to the bearer, the bearer not being configured with the DAPS handover method, and may switch a link of the PDCP layer entity or the RLC layer entity for the bearer not configured with the DAPS handover method from the MAC layer entity for the source BS to the MAC layer entity for the target BS. For example, when the UE receives the handover command message, the upper layer entity (e.g., the RRC layer entity) of the UE may indicate the MAC layer entity for the source BS to perform MAC reconfiguration by using configuration information of a current MAC layer entity, the configuration information excluding configuration information related to the bearer for which the DAPS handover method is not indicated, or the upper layer entity (e.g., the RRC layer entity) of the UE may indicate the MAC layer entity for the source BS to perform MAC reconfiguration by using configuration information of a current MAC layer entity, the configuration information only including configuration information related to the bearer for which the DAPS handover method is indicated. That is, because, when the UE receives the handover command message, the UE can release configuration information of the PDCP layer entity or the RLC layer entity or the MAC layer entity for the bearer not configured with the DAPS handover method from the MAC layer entity for the source BS, and can apply to the MAC layer entity for the target BS or perform connection according to bearer configuration for the target BS, and therefore, if the UE performs the fallback procedure, the UE has to reconfigure the bearer not configured with the DAPS handover method to the MAC layer entity for the source BS. For example, when the UE performs the fallback procedure, the upper layer entity (e.g., the RRC layer entity) of the UE may indicate the MAC layer entity for the source BS to perform MAC reconfiguration by using configuration information of a current MAC layer entity, the configuration information including configuration information related to the bearer for which the DAPS handover method is not indicated and configuration information related to the bearer for which the DAPS handover method is indicated. Alternatively, when the fallback procedure is performed, the UE may reconfigure or recover bearer configuration (e.g., PDCP layer entity configuration information or RLC layer entity configuration information or MAC layer entity configuration information or PHY layer entity configuration information) prior to reception of the handover command message, and may apply them to bearers (PDCP layer entity configuration information or RLC layer entity configuration information or MAC layer entity configuration information or PHY layer entity configuration information for SRB or AM DRB or UM DRB) for the source BS.

4> In the fallback procedure, when the UE transmits the handover failure report message (e.g., the RRC message or the MAC CE or the RLC control data or the PDCP control data proposed above) to the source BS, the UE may start the fourth timer. When the UE receives an indication or a message from the source BS, in response to the handover failure report message transmitted by the UE, the UE may stop the fourth timer. However, when the fourth timer expires or a response message is not received until the fourth timer expires, the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message). When the UE triggers the RRC connection re-establishment procedure due to expiry of the fourth timer, the UE may stop the second timer or the third timer if the second timer or the third timer is running.

u 3> when the second timer or the third timer for a radio link between the UE and the source BS or the target BS expires or a radio link between the UE and the source BS or the target BS is not active, l 4> the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message).

n 2> When the UE performs the DAPS handover procedure, if the second condition proposed in the disclosure is satisfied, the UE may release a link to the source BS or may release a SRB for the source BS and may stop and reset the second timer or the third timer for the source BS if the second timer or the third timer is running. Only when the UE stops the second timer or the third timer, the UE can prevent an unnecessary RRC connection re-establishment procedure due to expiry of the second timer or the third timer. Because that the second condition is satisfied may mean that the handover procedure is successfully performed, expiry of the second timer or the third timer due to stop of the first timer may trigger the unnecessary RRC connection re-establishment procedure. In another method, when the first condition proposed in the disclosure is satisfied or the handover procedure is successfully performed, the UE may release the SRB for the source BS, or may stop and reset the second timer or the third timer for the source BS if the second timer or the third timer is running. Only when the UE stops the second timer or the third timer, the UE can prevent an unnecessary RRC connection re-establishment procedure due to expiry of the second timer or the third timer. Because that the first condition is satisfied may mean that the handover procedure is successfully performed, expiry of the second timer or the third timer due to stop of the first timer may trigger the unnecessary RRC connection re-establishment procedure.

According to the method proposed in the disclosure, when the UE determines occurrence of the handover failure and performs the fallback procedure as the proposed condition is satisfied, the UE adds information indicating the occurrence of the handover failure to an RRC message (e.g., a ULInformationTransferMRDC message or a FailureInformation message) and transmits the RRC message via SRB1 to which the second PDCP layer entity architecture is applied or SRB1, thereby allowing the source BS to identify the handover failure of the UE. When the source BS detects the handover failure of the UE, the source BS may configure and transmit an RRC message (e.g., an RRCReconfiguration message or an RRCRelease message) to the UE, in response thereto, and when the UE receives the RRCReconfiguration message (the RRC message received via SRB1 to which the second PDCP layer entity architecture is applied or SRB1) as the RRC message in response to the handover failure report, the UE may apply and complete configuration information thereof and may transmit, in response thereto, an RRCReconfigurationComplete message to the source BS via SRB1 to which the second PDCP layer entity architecture is applied or SRB1, and if the RRCReconfiguration message indicates handover or access to another cell, the UE may complete a random access procedure with respect to the cell and may transmit an RRCReconfigurationComplete message via SRB1. However, when the UE receives the RRCRelease message as the RRC message in response to the handover failure report, the UE may transition to an RRC idle mode or may transition to an RRC inactive mode according to configuration information indicated by the RRCRelease message, and may not transmit, to the BS, an additional RRC message in response to the RRC message.

FIG. 1K is a flowchart illustrating operations of a UE according to an embodiment of the disclosure.

Referring to FIG. 1K, a UE 1k-01 may perform data transmission or reception to or from a source BS via each bearer by using a first PDCP layer entity architecture. However, when a handover command message received by the UE 1k-01 indicates the DAPS handover method of Embodiment 2 proposed in the disclosure or indicates the DAPS handover method for each bearer, the UE 1*k*-01 may switch to a second PDCP layer entity architecture for each bearer or bearers for which the DAPS handover method is indicated, with respect to a target BS indicated by the handover command message, may configure and establish protocol layer entities for a second bearer, and even when the UE 1*k*-01 performs a random access procedure on the target BS via the established protocol layer entities (1*k*-10 and 1*k*-15), the UE 1*k*-01 may continuously perform data transmission or reception (UL data transmission and DL data reception) to or from a source BS by using protocol layer entities for a first bearer (1*k*-20).

If the first condition is satisfied (1*k*-25), the UE 1*k*-01 may discontinue UL data transmission to the source BS via the protocol layer entities for the first bearer, and may switch the UL data transmission and thus may transmit UL data to the target BS via the protocol layer entities for the second bearer, and may continuously receive DL data from the source BS and the target BS via the protocol layer entities for the first and second bearers (1*k*-30). Also, a PDCP layer entity for the second bearer may continuously perform data transmission or reception to or from the target BS without interruption by using data to be transmitted or received or SN information or information such as header compression and decompression context, which is stored in a PDCP layer entity for the first bearer. If the first condition is not satisfied, the UE 1*k*-01 may continuously check the first condition while continuously performing an ongoing procedure (1*k*-35).

Also, if the second condition is satisfied, the UE 1*k*-01 may discontinue DL data reception from the source BS via the protocol layer entities for the first bearer (1*k*-45). Also, the PDCP layer entity for the second bearer may continuously perform data transmission or reception to or from the target BS without interruption by using data to be transmitted or received or SN information or information such as header compression and decompression context, which is stored in a PDCP layer entity for the first bearer.

If the second condition is not satisfied, the UE 1*k*-01 may continuously check the second condition while continuously performing an ongoing procedure (1*k*-50).

A PDCP layer entity according to a particular embodiment of the disclosure may perform different procedures according to types of handover indicated by a handover command message received by a UE.

If a handover type indicated by the handover command message the UE receives from a source BS is handover of Embodiment 1 (e.g., a normal handover method), the UE may perform a PDCP re-establishment procedure on the PDCP layer entity for each bearer.

If a handover type indicated by the handover command message the UE receives from the source BS is handover of Embodiment 2 (or is indicated for each bearer), the UE may perform procedures, which are proposed in the disclosure, for each bearer (or for a bearer for which Embodiment 2 is indicated) when the first condition is satisfied.

Also, when the source BS indicates, to the UE, handover to which embodiments proposed in the disclosure are applied, the source BS may start data forwarding to the target BS when a third condition below is satisfied. The third condition may mean that one or more conditions among conditions below are satisfied.

Figure 1L:
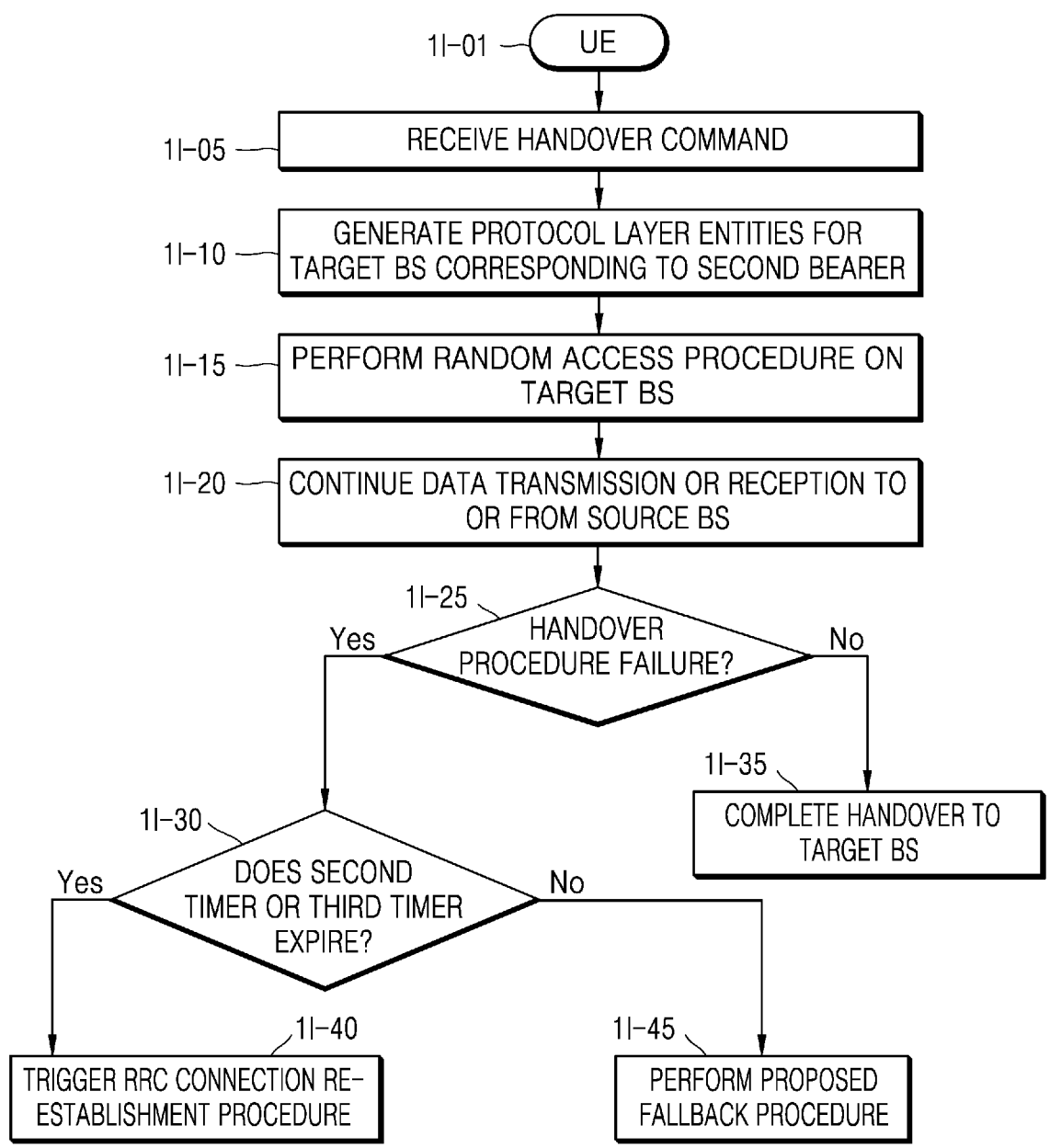
FIG. 1L is a flowchart illustrating operations of a UE that performs a fallback procedure when handover fails in a DAPS handover method according to an embodiment of the disclosure.

In a case where the source BS receives, from the target BS, an indication indicating that the UE successfully completed handover In a case where the source BS transmits a handover command message to the UE In a case where the source BS transmits the handover command message to the UE and identifies successful delivery (HARQ ACK or NACK, or RLC ACK or NACK) of the handover command message In a case where the source BS receives, from the UE, an indication (e.g., an RRC message (e.g., an RRCReconfiguration message)) indicating that a link to the source BS is to be released, or a MAC CE or an RLC control PDU or PDCP control PDU In a case where the source BS transmits the handover command message to the UE and starts a certain timer, and then the timer expires In a case where acknowledgement (HARQ ACK or NACK, or RLC ACK or NACK) with respect to successful delivery of DL data is not received from the UE for a certain time FIG. 1L is a flowchart illustrating operations of a UE that performs a fallback procedure when handover fails in a DAPS handover method according to an embodiment of the disclosure.

Referring to FIG. 1L, the UE 1*l*-05 may perform data transmission or reception to or from a source BS via each bearer by using the first PDCP layer entity architecture. However, when a handover command message received by the UE 1*l*-05 indicates the DAPS handover method of Embodiment 2 proposed in the disclosure or indicates the DAPS handover method for each bearer, the UE 1*l*-05 may switch to a second PDCP layer entity architecture for each bearer or bearers for which the DAPS handover method is indicated, with respect to a target BS indicated in the message, and may configure and establish protocol layer entities for a second bearer. Also, when the UE 1*l*-05 performs a random access procedure on the target BS (1*l*-10 and 1*l*-15) via the establish protocol layer entities, the UE 1*l*-05 may continuously perform data transmission or reception (UL data transmission and DL data reception) to or from the source BS via protocol layer entities for a first bearer (1*l*-20).

When the UE 1*l*-05 successfully completes a handover procedure (1*l*-35), the UE 1*l*-05 ends the handover procedure according to Embodiment 2 (the DAPS handover method) of the handover method proposed in the disclosure.

However, when the UE 1*l*-05 fails in the handover procedure (1*l*-25) (e.g., if the first timer expires in a case above (e.g., if the handover procedure to the target BS fails) or when a maximum number of retransmission exceeds in a RLC layer entity or when the UE 1*l*-05 receives the handover command message but configuration information of the handover command message exceeds capability of the UE or when an error occurs in application of the configuration information such that the handover fails or when a problem occurs in a random access to the target BS such that the handover procedure fails or when the second timer or the third timer is running for the target BS and then the second timer or the third timer expires before the handover procedure is completed such that the UE 1*l*-05 stops or expires T304 timer and determines failure of the handover procedure), when the second timer or the third timer for a radio link between the UE and the source BS has not expired (alternatively, when the second timer or the third timer for a radio link between the UE and the source BS is not started or is running) (1*l*-40) or when a radio link between the UE and the source BS is active, the UE may determine that the radio link between the UE and the source BS is active and may perform a fallback procedure proposed in the disclosure (1*l*-45). When the second timer or the third timer for the radio link between the UE and the source BS expires or a radio link between the UE and the source BS is not active (1*l*-30), the UE performs an RRC connection re-establishment procedure (the UE may release a link to the BS, and may perform an RRC connection procedure from the start, i.e., may perform a cell selection or reselection procedure, perform a random access procedure, and transmit an RRC connection re-establishment request message) (1*l*-45).

Figure 1M:
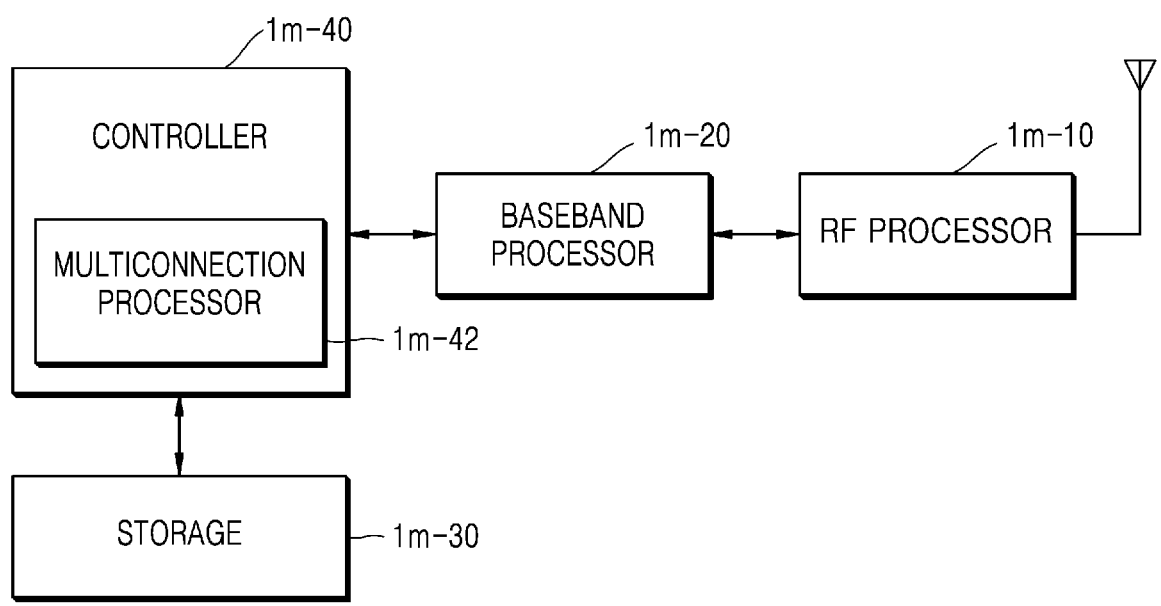
FIG. 1M is a block diagram illustrating a configuration of a UE according to an embodiment of the disclosure.

FIG. 1M is a block diagram illustrating a configuration of a UE according to an embodiment of the disclosure.

Referring to FIG. 1M, the UE may include a radio frequency (RF) processor 1*m*-10, a baseband processor 1*m*-20, a storage 1*m*-30, and a controller 1*m*-40.

The RF processor 1*m*-10 performs functions for transmitting and receiving signals through wireless channels, e.g., band conversion and amplification of the signals. That is, the RF processor 1*m*-10 up-converts a baseband signal provided from the baseband processor 1*m*-20, into an RF band signal and then transmits the RF band signal through an antenna, and down-converts an RF band signal received through the antenna, into a baseband signal. For example, the RF processor 1*m*-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1M, the UE may include a plurality of antennas. Also, the RF processor 1*m*-10 may include a plurality of RF chains. Furthermore, the RF processor 1*m*-10 may perform beamforming. For the beamforming, the RF processor 1*m*-10 may adjust phases and intensities of respective signals that are transmitted or received through a plurality of antennas or antenna elements. Also, the RF processor 1*m*-10 may perform a MIMO operation and may receive a plurality of layers in the MIMO operation. The RF processor 1*m*-10 may perform receive beam sweeping by appropriately configuring the plurality of antennas or antenna elements, or may adjust a direction and a beam width of a received beam to coordinate with a transmit beam, under the control of the controller.

The baseband processor 1*m*-20 performs conversion between a baseband signal and a bit string based on physical layer specifications of a system. For example, for data transmission, the baseband processor 1*m*-20 generates complex symbols by encoding and modulating a transmit bit string. For data reception, the baseband processor 1*m*-20 reconstructs a received bit string by demodulating and decoding a baseband signal provided from the RF processor 1*m*-10. For example, according to an OFDM scheme, for data transmission, the baseband processor 1*m*-20 generates complex symbols by encoding and modulating a transmit bit string, maps the complex symbols to subcarriers, and then configures OFDM symbols by performing inverse fast Fourier transformation (IFFT) and inserting a cyclic prefix (CP). For data reception, the baseband processor 1*m*-20 segments a baseband signal provided from the RF processor 1*m*-10, into OFDM symbol units, reconstructs signals mapped to subcarriers by performing fast Fourier transformation (FFT) calculation, and then reconstructs a received bit string by demodulating and decoding the signals.

The baseband processor 1*m*-20 and the RF processor 1*m*-10 transmit and receive signals in a manner described above. Accordingly, the baseband processor 1*m*-20 and the RF processor 1*m*-10 may also be called a transmitter, a receiver, a transceiver, or a communicator. At least one of the baseband processor 1*m*-20 or the RF processor 1*m*-10 may include a plurality of communication modules to support a plurality of different radio access technologies. At least one of the baseband processor 1*m*-20 and the RF processor 1*m*-10 may include different communication modules to process signals of different frequency bands. For example, the different radio access technologies may include an LTE network, a NR network, or the like. The different frequency bands may include a super-high frequency (SHF) (e.g., 2.5 GHz or 5 GHz) band and a millimeter wave (mmWave) (e.g., 60 GHz) band.

The storage 1*m*-30 may store basic programs, application programs, and data, e.g., configuration information, for operations of the UE. The storage 1*m*-30 may provide the stored data upon request by the controller 1*m*-40.

The controller 1*m*-40 controls overall operations of the UE. For example, the controller 1*m*-40 transmits and receives signals through the baseband processor 1*m*-20 and the RF processor 1*m*-10. Also, the controller 1*m*-40 records or reads data on or from the storage 1*m*-40. To this end, the controller 1*m*-40 may include at least one processor. For example, the controller 1*m*-40 may include a communication processor (CP) for controlling communications and an application processor (AP) for controlling an upper layer such as an application program.

Figure 1N:
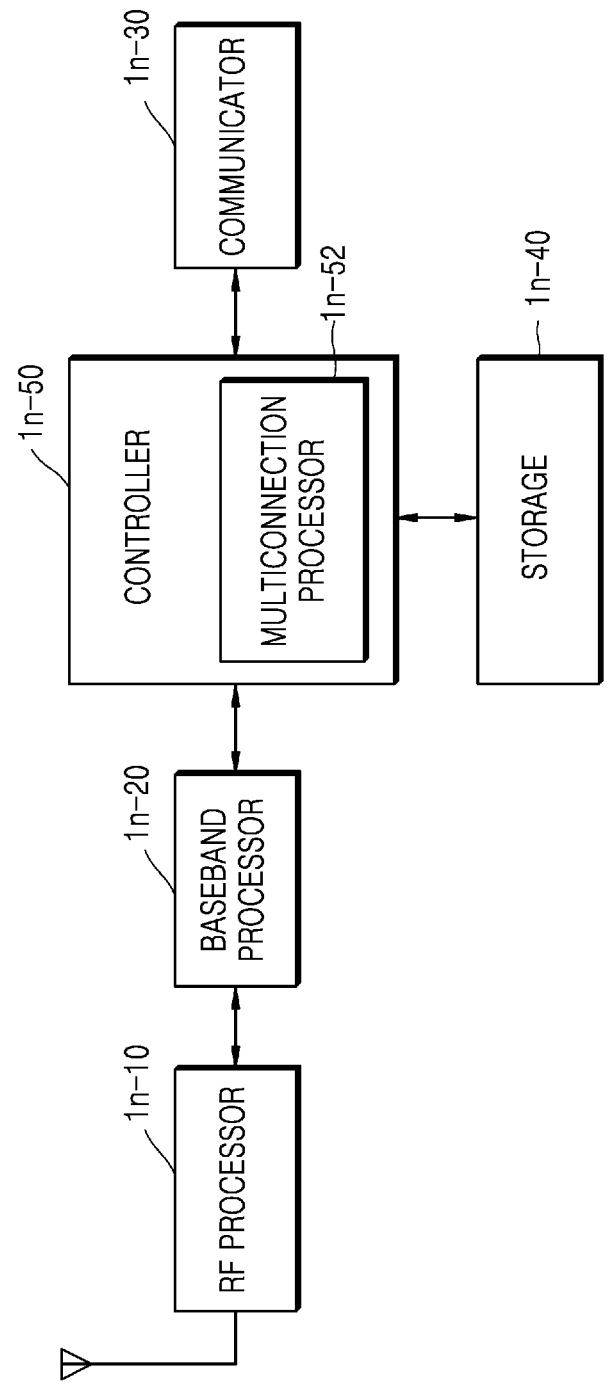
FIG. 1N is a block diagram illustrating a configuration of a network entity according to an embodiment of the disclosure.

FIG. 1N is a block diagram illustrating a configuration of a network entity according to an embodiment of the disclosure.

In particular, FIG. 1N illustrates a configuration of a Tx/Rx Point (TRP) in a wireless communication system to which an embodiment of the disclosure is applicable.

As illustrated in FIG. 1N, the TRP includes an RF processor 1*n*-10, a baseband processor 1*n*-20, a backhaul communicator 1*n*-30, a storage 1*n*-40, and a controller 1*n*-50.

The RF processor 1*n*-10 performs functions for transmitting and receiving signals through wireless channels, e.g., band conversion and amplification of the signals. That is, the RF processor 1*n*-10 up-converts a baseband signal provided from the baseband processor 1*n*-20, into an RF band signal and then transmits the RF band signal through an antenna, and down-converts an RF band signal received through the antenna, into a baseband signal. For example, the RF processor 1*n*-10 may include a transmit filter, a receive filter, an amplifier, a mixer, an oscillator, a DAC, an ADC, or the like. Although only one antenna is illustrated in FIG. 1N, the first access node may include a plurality of antennas. Also, the RF processor 1*n*-10 may include a plurality of RF chains. Furthermore, the RF processor 1*n*-10 may perform beamforming. For the beamforming, the RF processor 1*n*-10 may adjust phases and intensities of respective signals that are transmitted or received through a plurality of antennas or antenna elements. The RF processor may perform a DL MIMO operation by transmitting one or more layers.

The baseband processor 1*n*-20 performs conversion between a baseband signal and a bin string based on physical layer specifications of a first radio access technology. For example, for data transmission, the baseband processor 1*n*-20 generates complex symbols by encoding and modulating a transmit bin string. For data reception, the baseband processor 1*n*-20 reconstructs a received bin string by demodulating and decoding a baseband signal provided from the RF processor 1*n*-10. For example, according to an OFDM scheme, for data transmission, the baseband processor 1*n*-20 generates complex symbols by encoding and modulating a transmit bin string, maps the complex symbols to subcarriers, and then configures OFDM symbols by performing IFFT calculation and inserting a CP. For data reception, the baseband processor 1*n*-20 segments a baseband signal provided from the RF processor 1n-10, into OFDM symbol units, reconstructs signals mapped to subcarriers by performing FFT calculation, and then reconstructs a received bin string by demodulating and decoding the signals. The baseband processor 1n-20 and the RF processor 1n-10 transmit and receive signals as described above. Accordingly, the baseband processor 1n-20 and the RF processor 1n-10 may also be called a transmitter, a receiver, a transceiver, a communicator, or a wireless communicator.

The communicator 1n-30 provides an interface for communicating with other nodes in a network.

The storage 1n-40 may store basic programs, application programs, and data, e.g., configuration information, for operations of the TRP. In particular, the storage 1n-40 may store, for example, information about bearers assigned for a connected UE and measurement results reported from the connected UE. The storage 1n-40 may store criteria information used to determine whether to provide or release multi-connection to or from the UE. The storage 1n-40 provides the stored data, in response to a request by the controller 1n-50.

The controller 1n-50 controls overall operations of the TRP. For example, the controller 1n-50 transmits and receives signals through the baseband processor 1n-20 and the RF processor 1n-10 or the backhaul communicator 1n-30. The controller 1n-50 records or reads data on or from the storage 1n-40. To this end, the controller 1n-50 may include at least one processor.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, configuration elements included in the disclosure are expressed in a singular or plural form according to the embodiments of the disclosure. However, the singular or plural form is appropriately selected for convenience of descriptions and the disclosure is not limited thereto. As such, a configuration element expressed in a plural form may also be configured as a single element, and a configuration element expressed in a singular form may also be configured as plural elements.

The embodiments of the disclosure described with reference to the present specification and the drawings are merely illustrative of specific examples to easily facilitate description and understanding of the disclosure, and are not intended to limit the scope of the disclosure. That is, it will be understood by one of ordinary skill in the art that other modifications based on the technical ideas of the disclosure are feasible. Also, the embodiments of the disclosure may be combined to be implemented, when required. For example, the BS and the UE may be operated in a manner that portions of an embodiment of the disclosure are combined with portions of another embodiment of the disclosure. Also, modifications based on the technical scope of the embodiments of the disclosure may be applied to various systems such as a FDD LTE system, a TDD LTE system, a 5G or NR system, or the like.

The invention claimed is:

1. A method performed by a user equipment (UE) in a wireless communication system, the method comprising:
   receiving, from a source base station, a message including reconfiguration with sync;
   starting a first timer;
   in case that a dual active protocol stack (DAPS) bearer is configured based on the message, establishing a radio link control (RLC) entity for a target base station and suspending a signaling radio bearer (SRB) for the source base station;
   in case that the first timer expires and a radio link between the UE and the source base station is active, releasing the RLC entity for the target base station, resuming the suspended SRB for the source base station, and transmitting a DAPS handover failure report to the source base station; and
   in case that the first timer expires and the radio link between the UE and the source base station is not active, performing a radio resource control (RRC) re-establishment procedure.

2. The method of claim 1, further comprising:
   in case that a condition for starting a third timer is satisfied, starting the third timer while a second timer is running.

3. The method of claim 2, wherein the first timer is a T304 timer, the second timer is a T310 timer, and the third timer is a T312 timer.

4. The method of claim 1, further comprising:
   in case that the DAPS bearer is configured and out-of-sync indications are received from lower layer entities and the first timer is running, starting a second timer for the source base station.

5. The method of claim 4, further comprising:
   in case that in-sync indications are received from the lower layer entities while the second timer is running, stopping the second timer and stopping a third timer if running.

6. The method of claim 5, wherein the first timer is a T304 timer, the second timer is a T310 timer, and the third timer is a T312 timer.

7. The method of claim 1,
   wherein the RRC re-establishment procedure is performed in case that a third timer expires.

8. A user equipment (UE) in a wireless communication system, the UE comprising:
a transceiver; and
at least one processor coupled with the transceiver,
wherein the at least one processor is configured to:
receive, from a source base station, a message including reconfiguration with sync,
start a first timer,
in case that a dual active protocol stack (DAPS) bearer is configured based on the message, establish a radio link control (RLC) entity for a target base station and suspend a signaling radio bearer (SRB) for the source base station,
in case that the first timer expires and a radio link between the UE and the source base station is active, release the RLC entity for the target base station, resume the suspended SRB for the source base station, and transmit a DAPS handover failure report to the source base station, and
in case that the first timer expires and the radio link between the UE and the source base station is not active, perform a radio resource control (RRC) re-establishment procedure.

9. The UE of claim 8, wherein the at least one processor is further configured to:
in case that a condition for starting a third timer is satisfied, start the third timer while a second timer is running.

10. The UE of claim 9, wherein the first timer is a T304 timer, the second timer is a T310 timer, and the third timer is a T312 timer.

11. The UE of claim 8, wherein the at least one processor is further configured to:
in case that the DAPS bearer is configured and out-of-sync indications are received from lower layer entities and the first timer is running, start a second timer for the source base station.

12. The UE of claim 11, wherein the at least one processor is further configured to:
in case that in-sync indications are received from the lower layer entities while the second timer is running, stop the second timer and stop a third timer if running.

13. The UE of claim 12, wherein the first timer is a T304 timer, the second timer is a T310 timer, and the third timer is a T312 timer.

14. The UE of claim 8, wherein the RRC re-establishment procedure is performed in case that a third timer expires.

15. A method performed by a source base station in a wireless communication system, the method comprising:
transmitting, to a user equipment (UE), a message including reconfiguration with sync,
wherein a first timer is started at the UE,
wherein in case that a dual active protocol stack (DAPS) bearer is configured based on the message, a radio link control (RLC) entity for a target base station is established at the UE and a signaling radio bearer (SRB) for the source base station is suspended at the UE,
wherein in case that the first timer expires and a radio link between the UE and the source base station is active, the RLC entity for the target base station is released at the UE, the suspended SRB for the source base station is resumed at the UE, and a DAPS handover failure report is transmitted to the source base station at the UE, and
wherein in case that the first timer expires and the radio link between the UE and the source base station is not active, a radio resource control (RRC) re-establishment procedure is performed at the UE.

16. A source base station in a wireless communication system, the source base station comprising:
a transceiver; and
at least one processor coupled with the transceiver and configured to:
transmit, to a user equipment (UE), a message including reconfiguration with sync,
wherein a first timer is started at the UE,
wherein in case that a dual active protocol stack (DAPS) bearer is configured based on the message, a radio link control (RLC) entity for a target base station is established at the UE and a signaling radio bearer (SRB) for the source base station is suspended at the UE,
wherein in case that the first timer expires and a radio link between the UE and the source base station is active, the RLC entity for the target base station is released at the UE, the suspended SRB for the source base station is resumed at the UE, and a DAPS handover failure report is transmitted to the source base station at the UE, and
wherein in case that the first timer expires and the radio link between the UE and the source base station is not active, a radio resource control (RRC) re-establishment procedure is performed at the UE.

* * * * *